Dec. 19, 1939.  B. L. GREEN  2,183,559
TRANSMITTING APPARATUS
Filed Jan. 10, 1935  27 Sheets-Sheet 8

BUFORD L. GREEN
Inventor.
Attorney

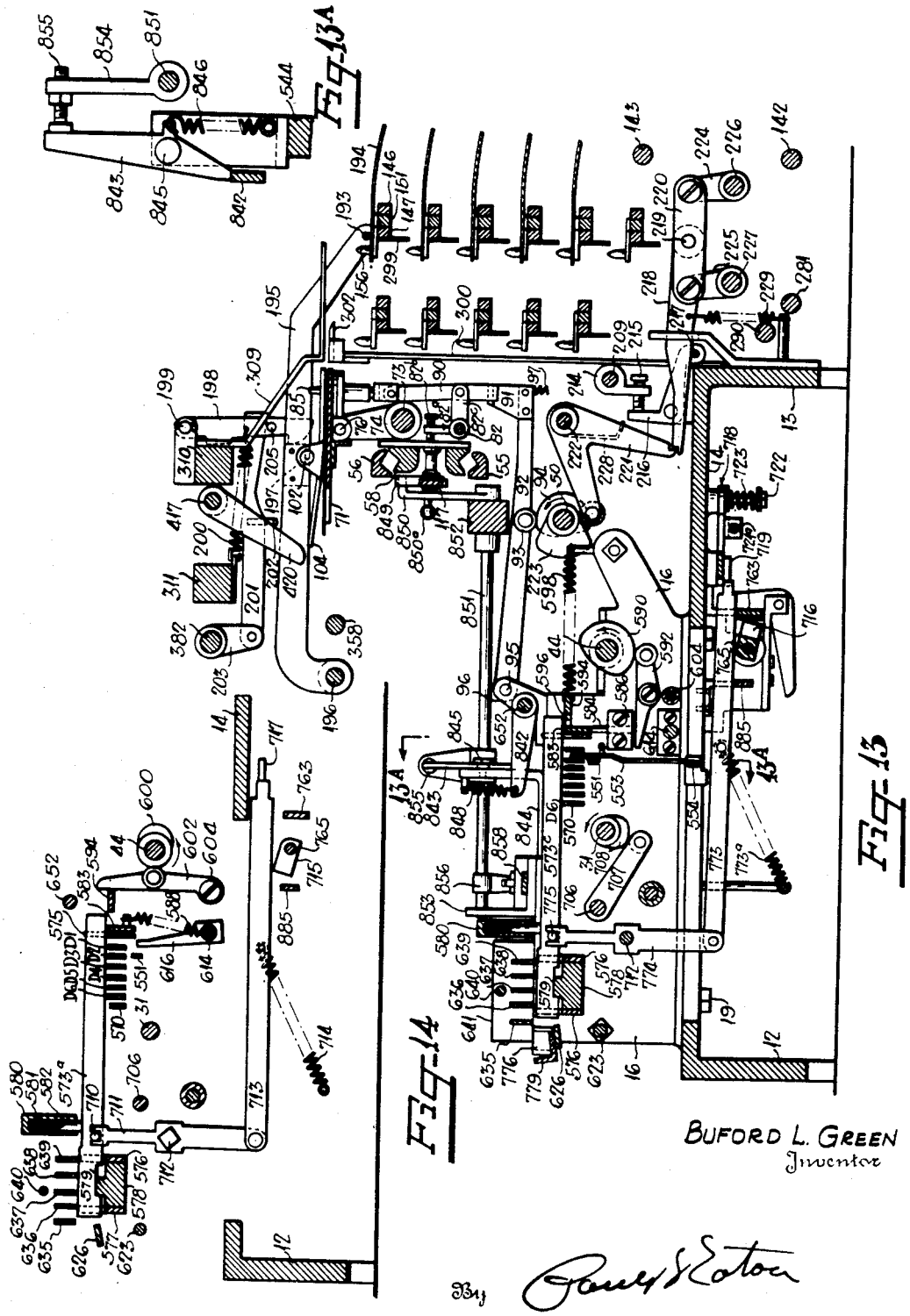

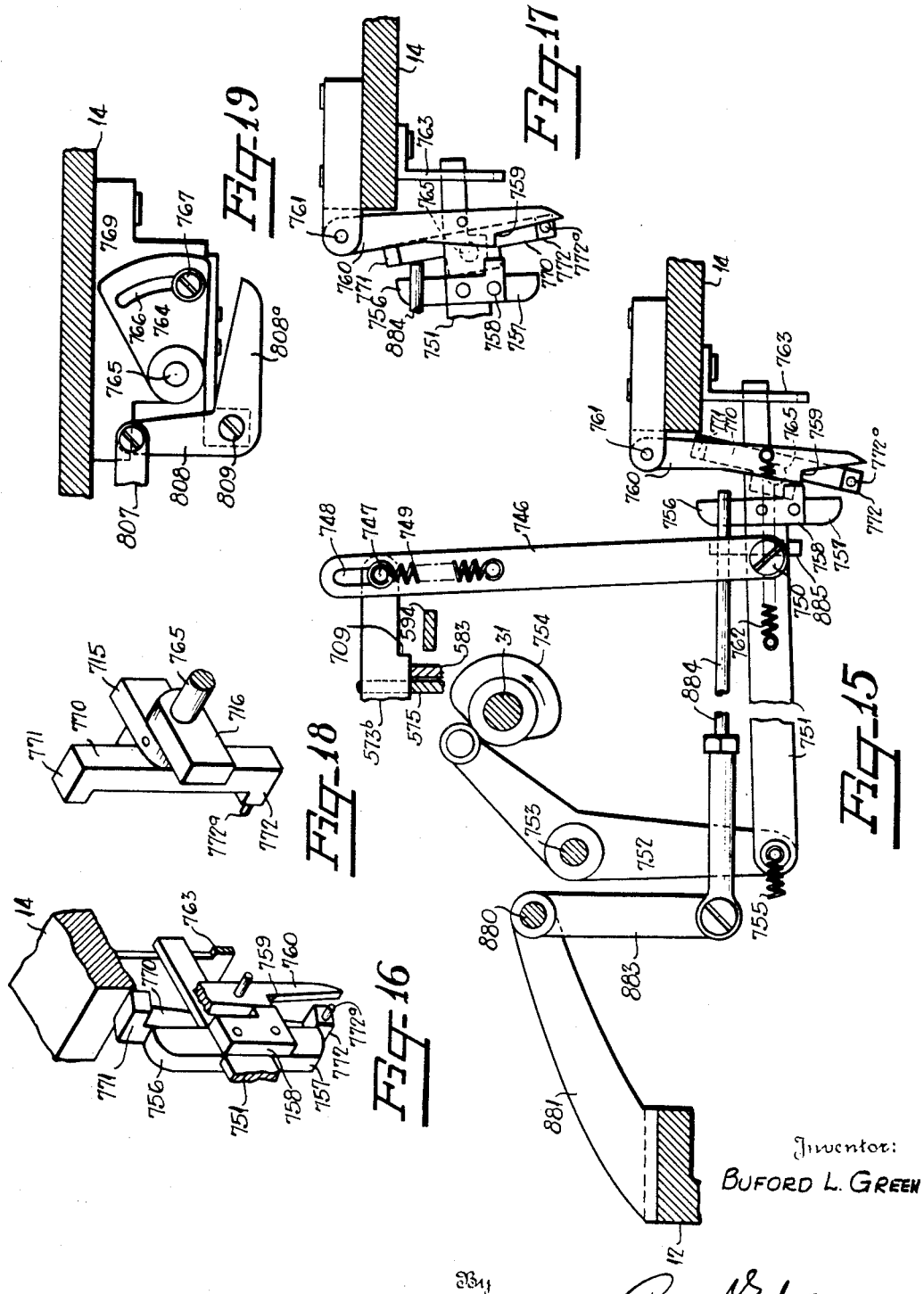

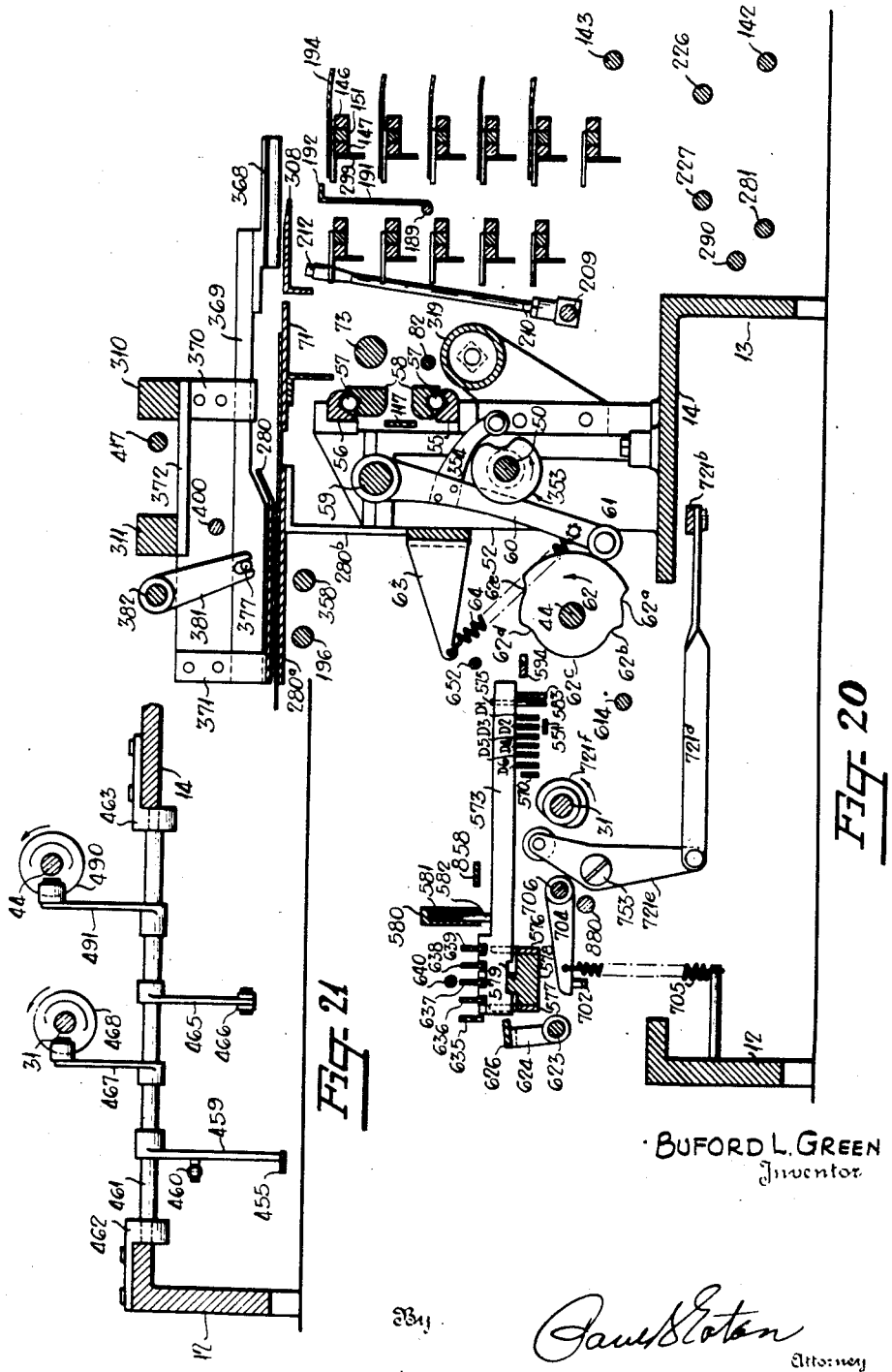

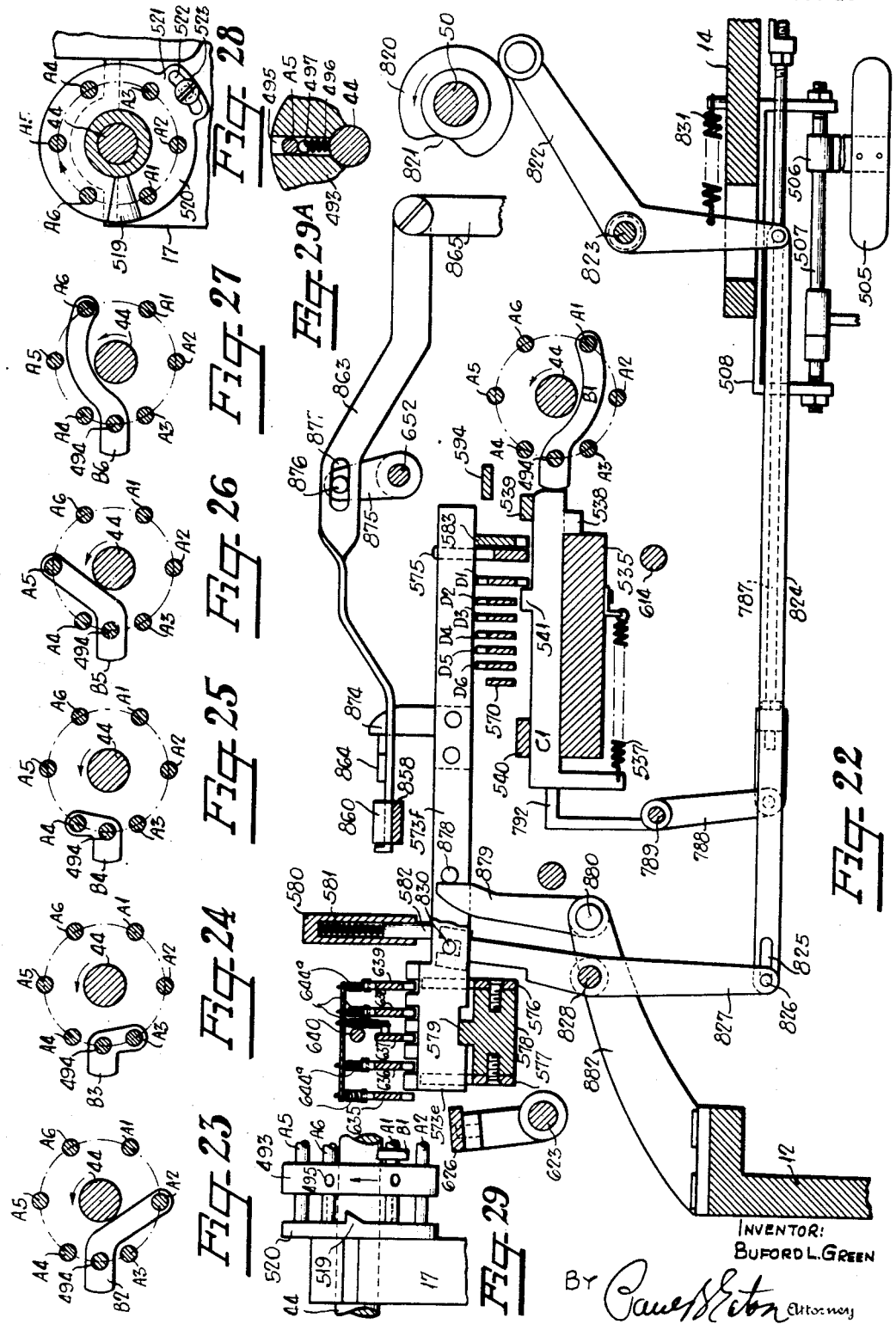

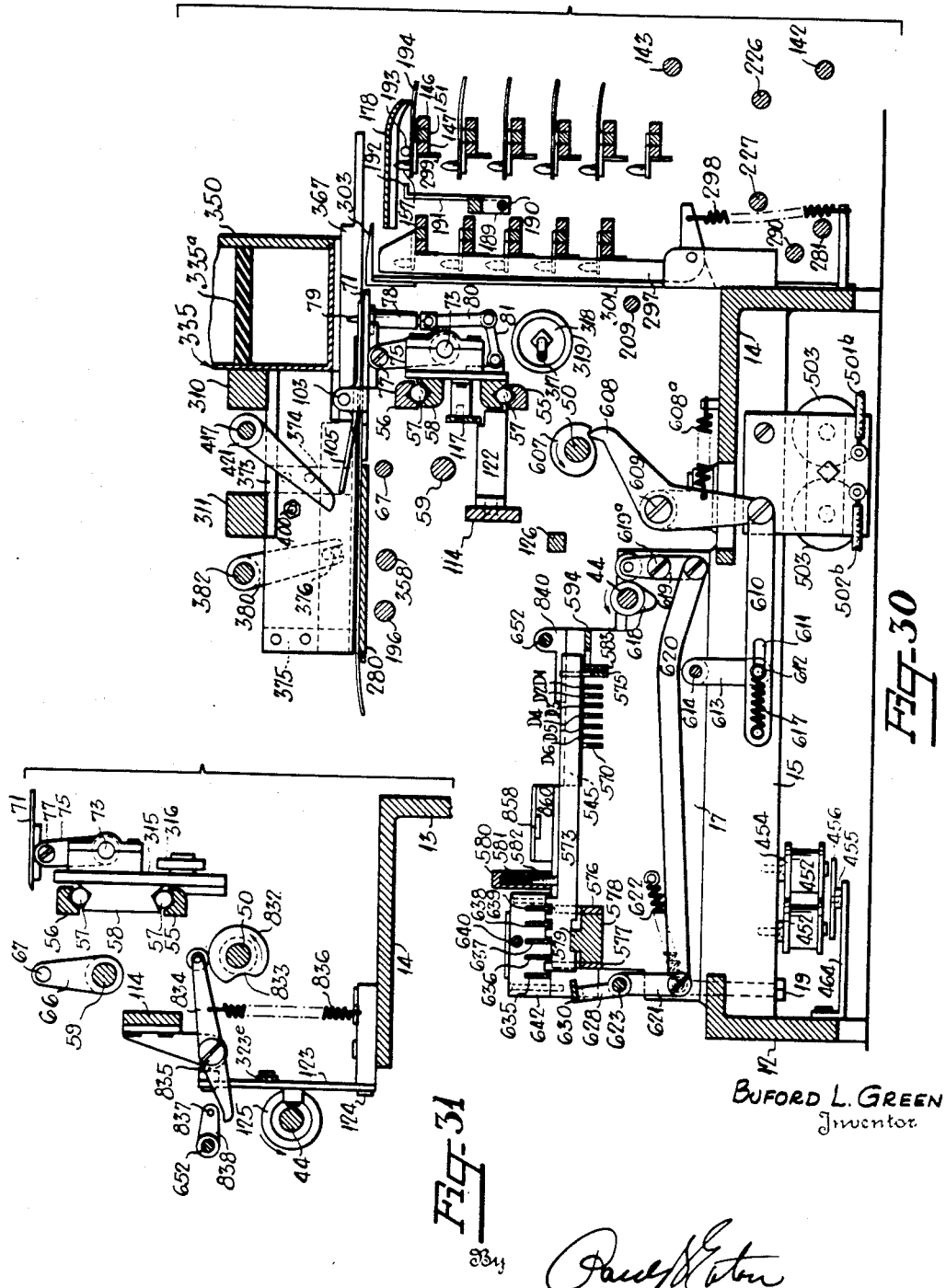

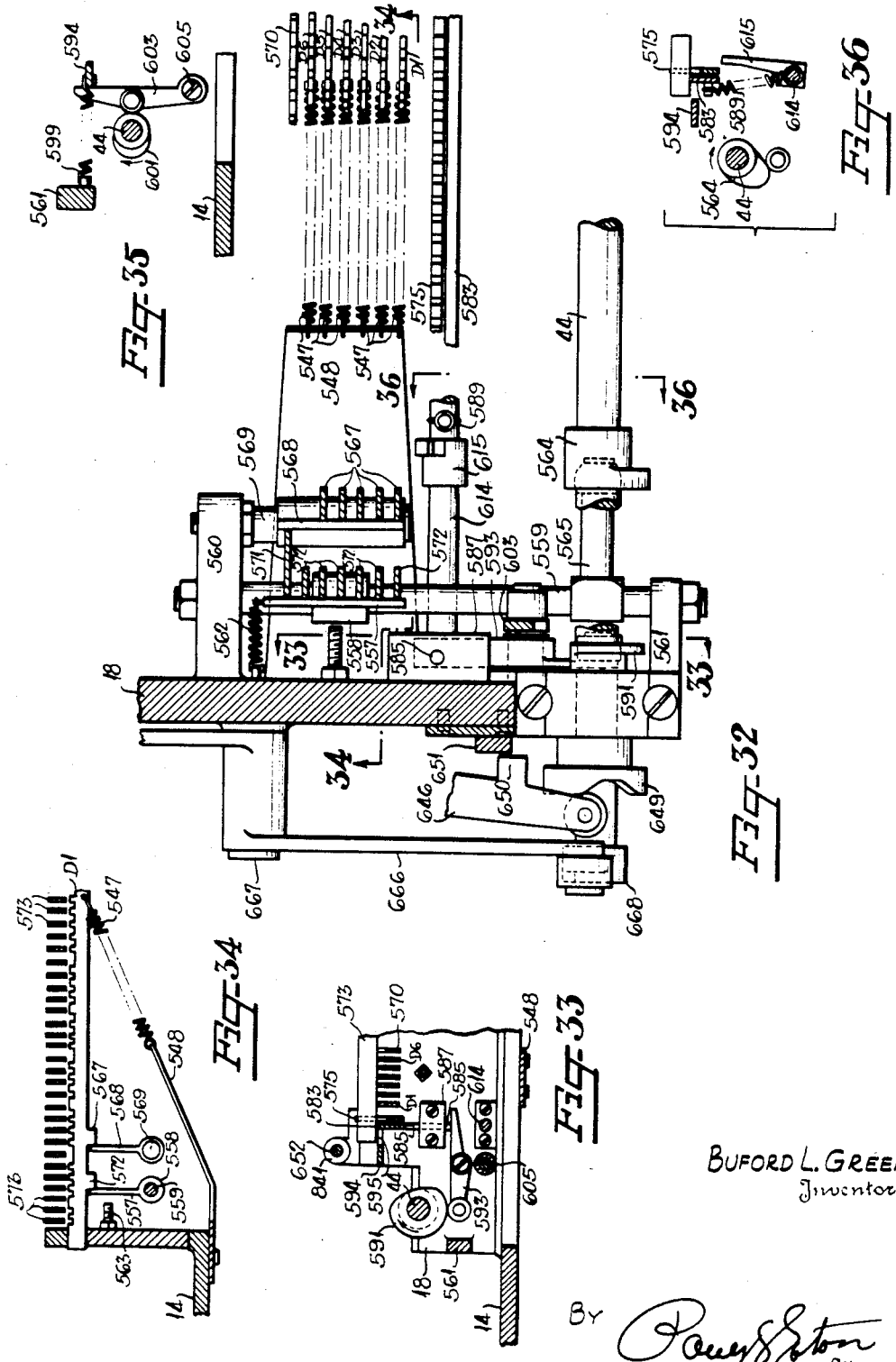

Dec. 19, 1939.　　　　B. L. GREEN　　　2,183,559
TRANSMITTING APPARATUS
Filed Jan. 10, 1935　　　27 Sheets-Sheet 19
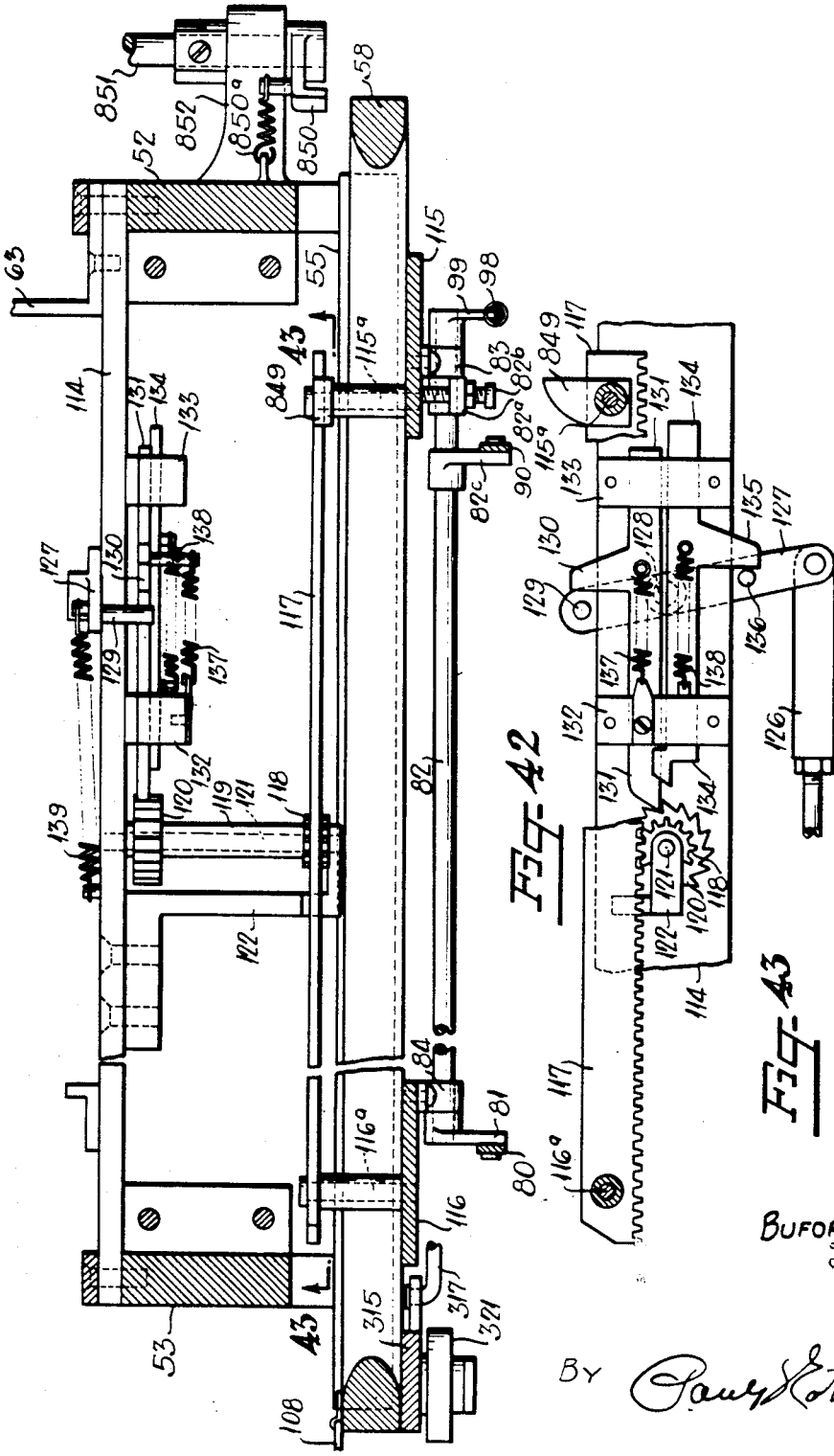
Buford L. Green
Inventor
By Paul S. Eaton
Attorney Dec. 19, 1939.   B. L. GREEN   2,183,559
TRANSMITTING APPARATUS
Filed Jan. 10, 1935   27 Sheets-Sheet 20
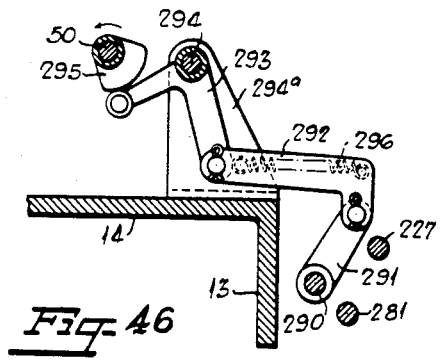
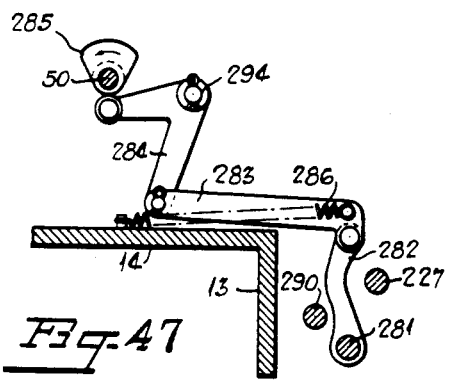
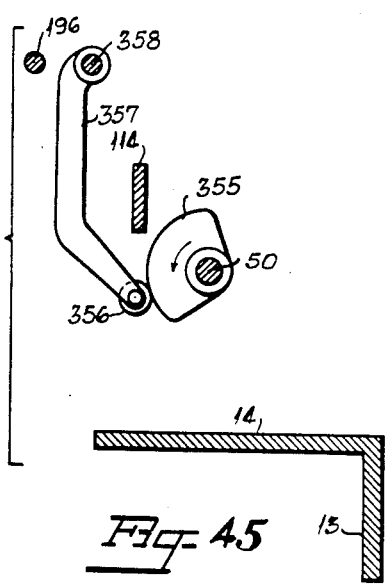
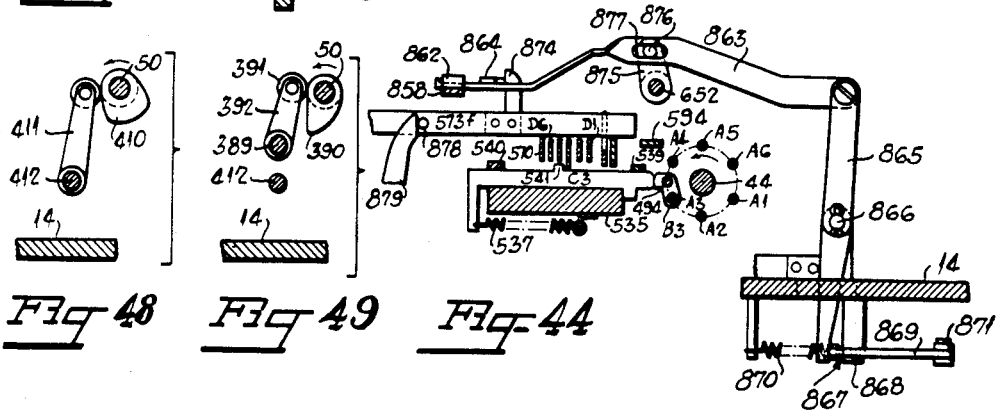
BUFORD L. GREEN
Inventor
By *[signature]*
Attorney

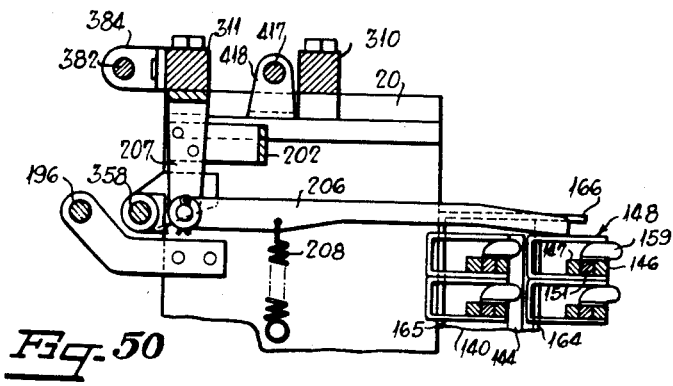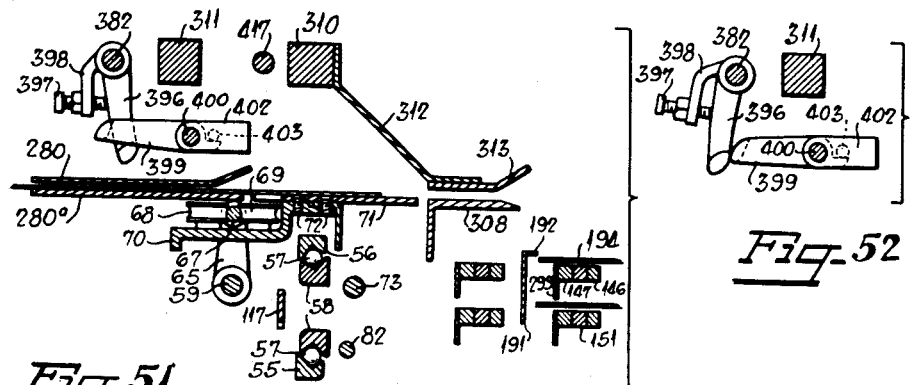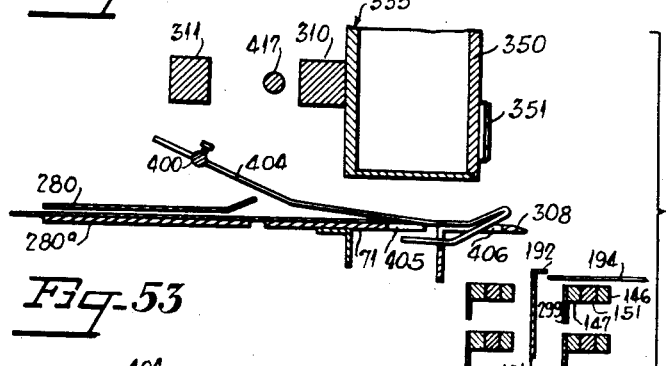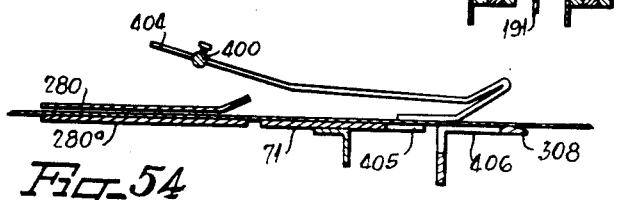

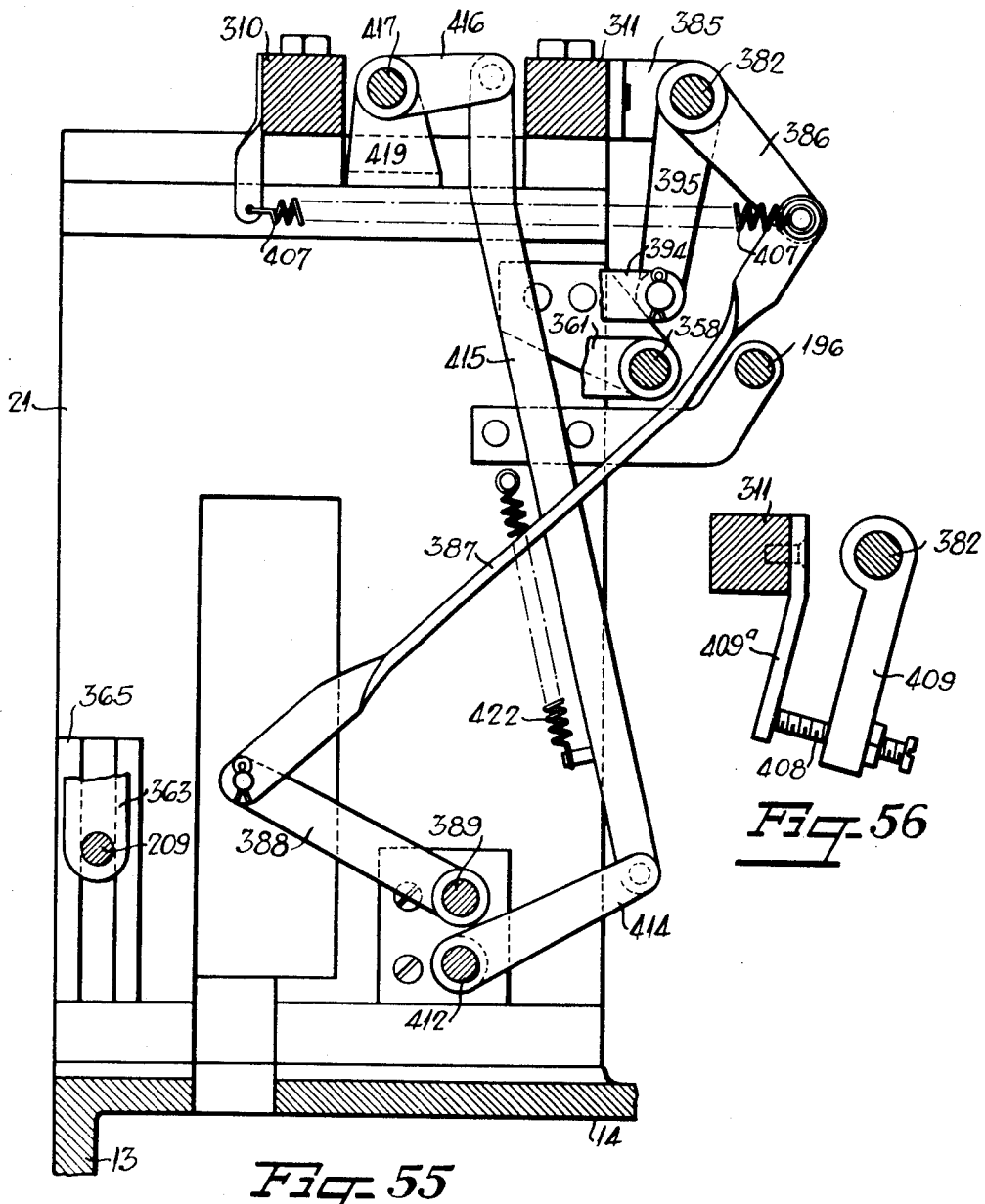

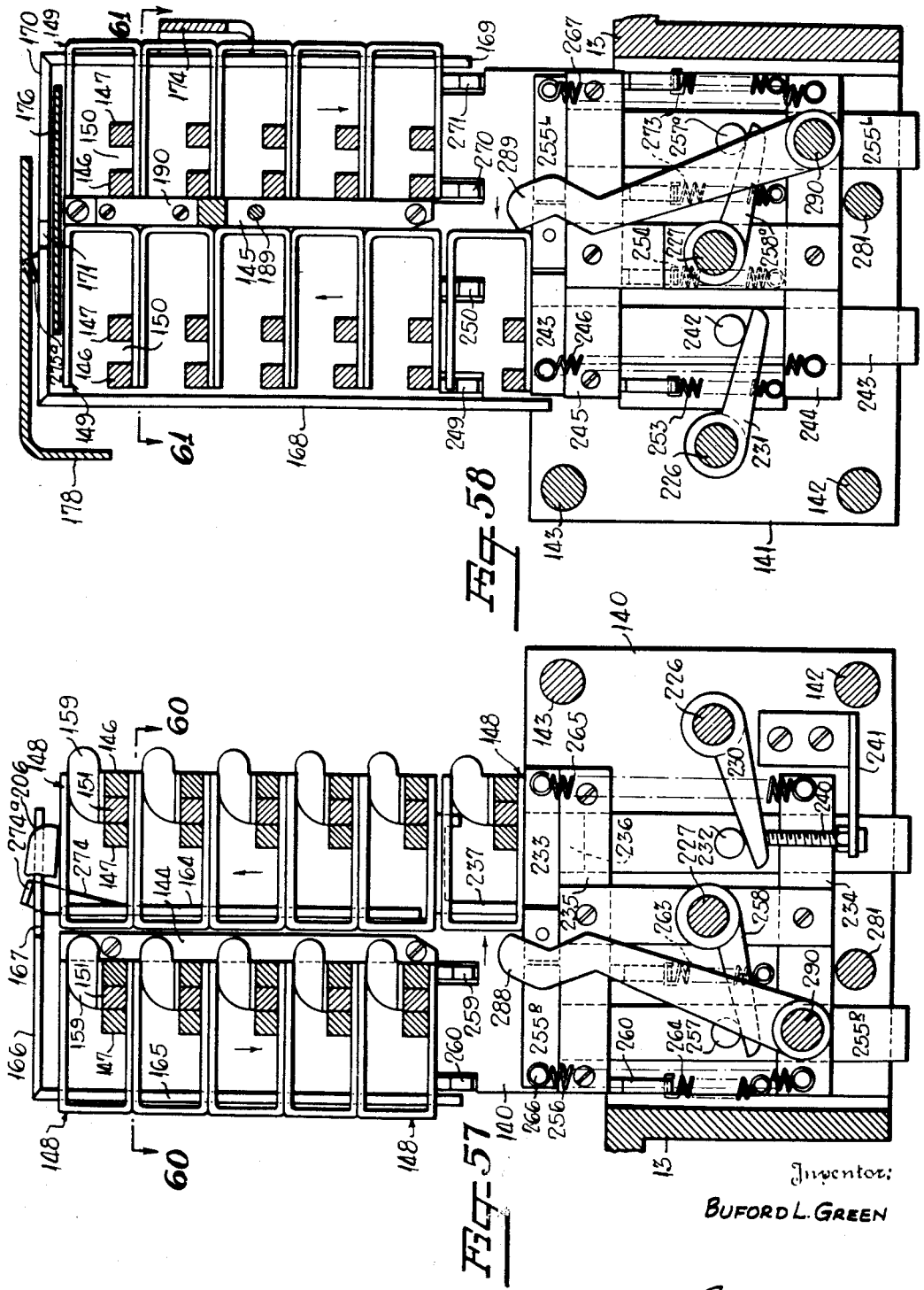

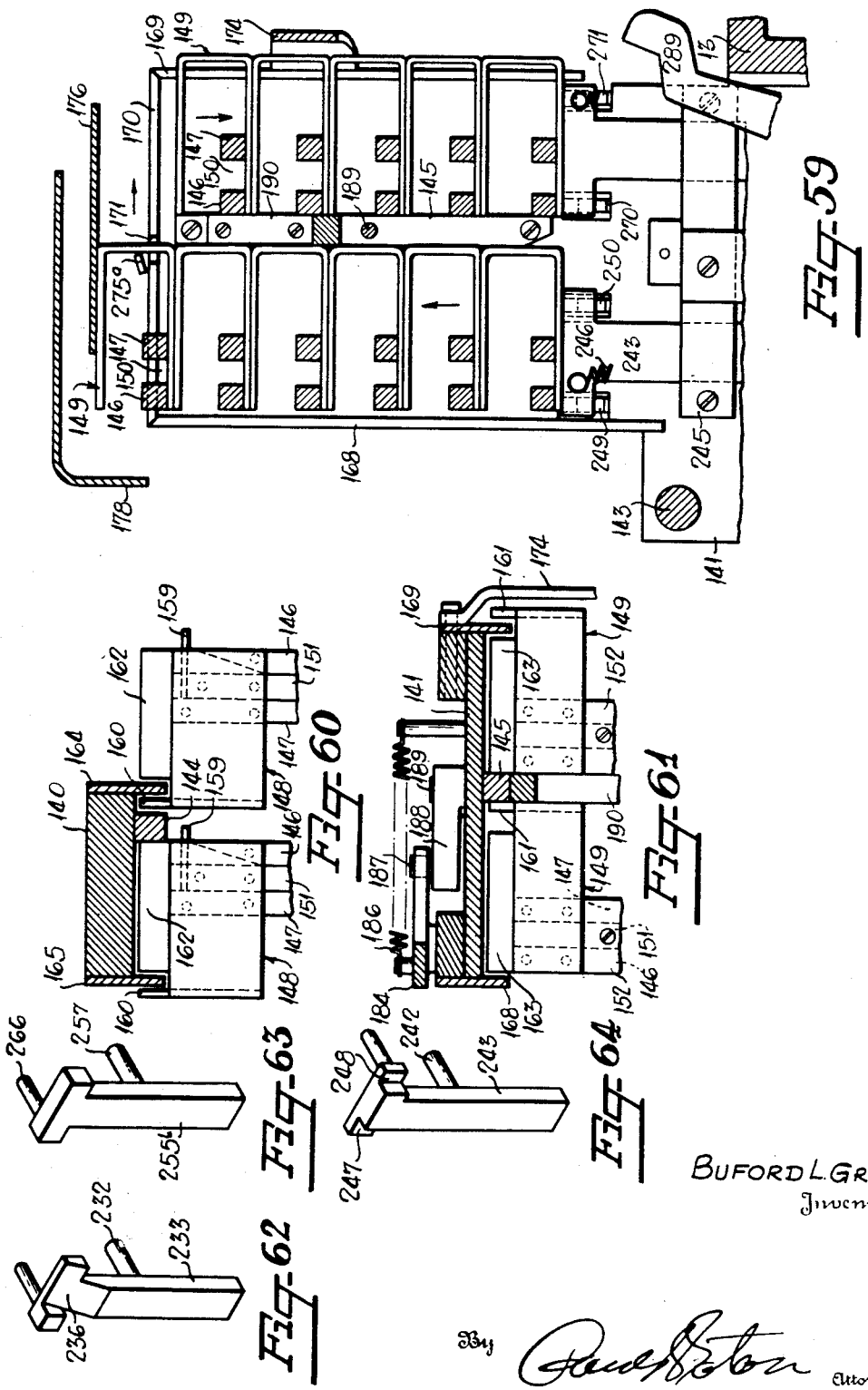

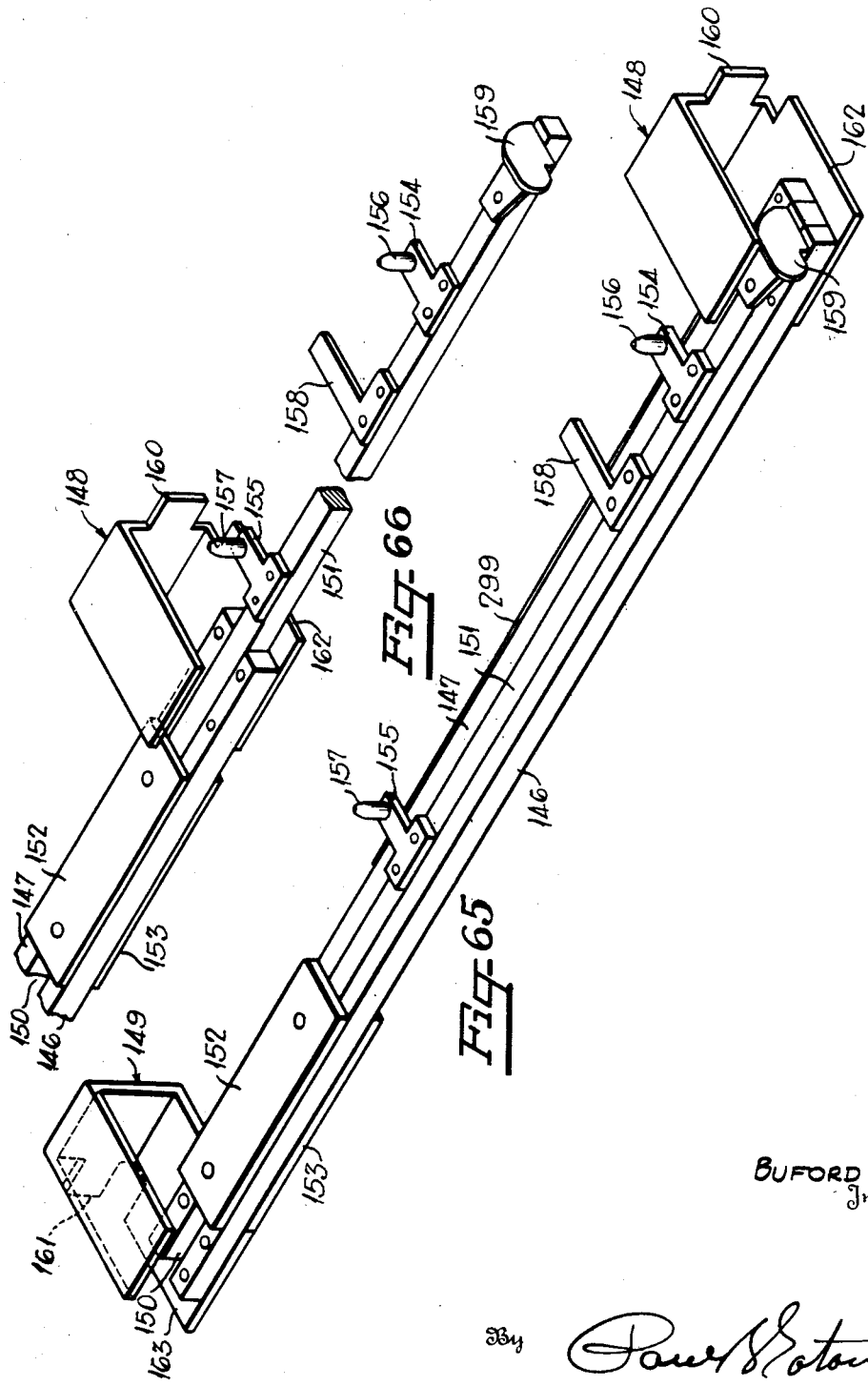

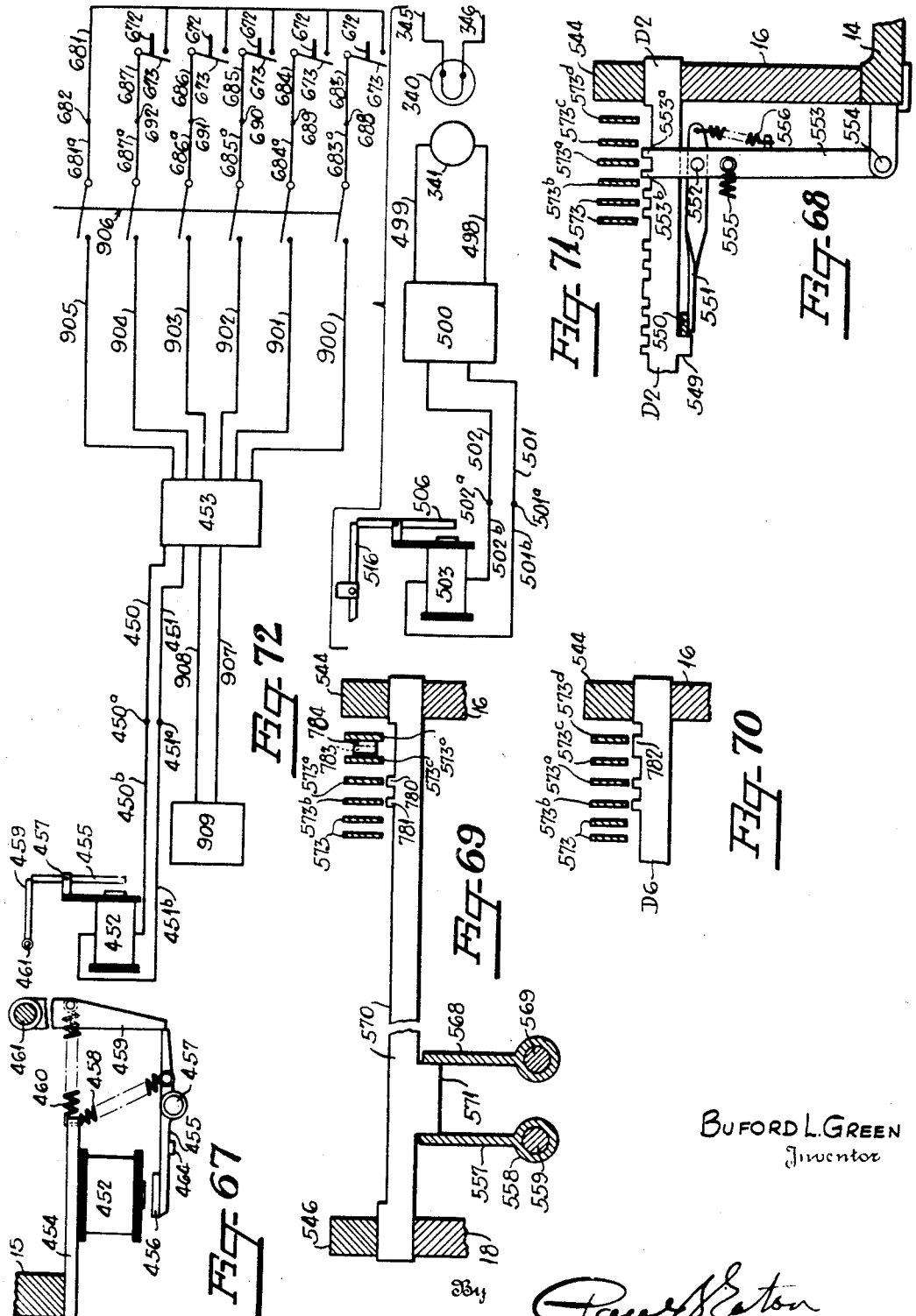

Dec. 19, 1939.　　　　　B. L. GREEN　　　　　2,183,559
TRANSMITTING APPARATUS
Filed Jan. 10, 1935　　　27 Sheets-Sheet 27

BUFORD L. GREEN
Inventor

UNITED STATES PATENT OFFICE 2,183,559

TRANSMITTING APPARATUS

Buford L. Green, Charlotte, N. C.

Application January 10, 1935, Serial No. 1,148

52 Claims. (Cl. 178—17)

This invention relates to a telegraphic transmitter adapted to be operated by impulses derived from the scanning of printed photo-electric cell controls to operate a character reproducing machine such as a telegraphic printer.

It is an object of this invention to provide a telegraphic transmitter for operation of character reproducing machines such as telegraphic typewriters, the transmitter being controlled by a printed control sheet having photo-electric cell controls thereon and the mechanism being provided with a photo-electric cell and a source of light with means for scanning the photo-electric cell controls on the control sheet for delivering a succession of impulses which after passing through suitable instrumentalities and mechanisms, are adapted to operate a character reproducing machine such as a telegraphic printer. The sheet produced by the printer can be inserted into a mechanism for automatically operating typecasting, typesetting machines and the like, said control sheet being especially adaptable to the mechanism shown in my co-pending patent applications 404,331 and 517,171. The copy produced by the printer operated by the mechanism herein shown and described, not only can be used in a typesetting machine but also can be re-inserted in a machine as shown and described in this application for producing copy on other printers, which copy can be used in transmitting machines similar to the herein disclosed apparatus for transmitting over wires to points remote from the transmitting apparatus.

The above described use would be advantageous where several circuits were in operation so that the proper number of copies could be reproduced automatically by the herein disclosed apparatus in combination with a suitable printer or printers. It is of course evident that a plurality of printers can be connected to the herein disclosed and described apparatus, all of said telegraphic printers being operated simultaneously either at one point or at many points remotely removed from each other.

It is another object of this invention to provide a telegraphic transmitter operated by a printed control sheet having photo-electric cell controls thereon together with means for feeding copies of control sheets to the apparatus, said apparatus having a plurality of means for holding a plurality of control sheets and means for automatically feeding the control sheet into the apparatus in succession.

In it is still another object of this invention to provide a six impulse transmitter for actuation of a five impulse telegraphic printer so that the sixth impulse in a cell control can be employed for transmitting a shift impulse ahead of the selection made by selected ones of the other five impulses so that a single set of cell controls can be employed for the double purpose of selecting a character and transmitting a shift impulse into the printer ahead of the transmission of the signal for the character so as to operate the shift mechanism of the printer in advance of its being actuated by the impulses for the printing of the character.

It is still another object of this invention to provide a transmitting mechanism for transmitting electric impulses to a telegraphic printer for controlling the same, said mechanism being so designed that when the first character in a line of code symbols on the control sheet is blotted out that suitable impulses will be transmitted to the telegraphic printer so that the blot out signal produced by the scanning of the blotted out characters at the beginning of the line in the transmitter will not affect the printer but will cause the moving of the control sheet in the transmitter to new line position.

It is still another further object of this invention to provide a transmitter for transmitting electrical impulses for actuation of a telegraphic printer in which a printed control record is employed with scanning means having a photo-electric cell for scanning the control record and delivering impulses through a plurality of selectors to transmit impulses to the printer.

It is still a further object of this invention to provide a transmitter for transmitting electric impulses for controlling a telegraphic printer, said transmitter having a printed control record provided with code characters to be reproduced by the telegraphic printer, said code characters comprising six cell controls with the first five of the cell controls being employed for the selection of the character and the sixth cell control is employed for actuating the shift mechanism of the printer when the sixth cell control and one or more other cell controls is employed for transmitting impulses.

It is still another object of this invention to provide a transmitting mechanism for actuating a telegraphic printer in which when a shift impulse is transmitted to the printer, that immediately after the character is printed by the printer, automatic means are brought into place to move the carriage mechanism of the printer to unshift position after the character has been printed provided the next occurring character to be transmitted to the printer is not also a character to be printed on the shift side of the printer.

This application is a continuation in part of my co-pending patent applications Serial Numbers 404,331 and 517,171.

The herein shown and described mechanism is adapted to deliver impulses to a distributor mechanism similar to that shown in the patent to Rainey No. 1,311,915 and after passing through such distributor, the impulses are transmitted to a telegraphic printer such as disclosed in the patent to Krum No. 1,665,594, and therefore a detailed description and showing of these mechanisms is not deemed necessary.

It is still a further object of this invention to provide mechanism for controlling the actuation of character reproducing machines in which a control record is scanned to control the actuation of character reproducing machines, said mechanism having means associated therewith for holding a plurality of control records in stationary position, together with means automatically controlled by the preceding control record in the apparatus for moving a new control record into the apparatus, upon completion of the scanning of the preceding control record.

Some of the objects of the invention having been stated other objects will appear as the description proceeds when taken in connection with the accompanying drawings, in which:

Figure 6A is a top sectional plan view of the right-hand portion of the machine and being taken along the line 6A—6A in Figure 4;

Figure 9A is a vertical sectional view taken along line 9A—9A in Figure 9 showing means for adjusting the alining pin in the carriage;

Figure 13 is a vertical sectional view taken along the line 13—13 in Figures 2, 12, and 6A;

Figure 13A is a vertical sectional view taken along line 13A—13A in Figure 13;

Figure 14 is a vertical sectional view taken along the line 14—14 in Figures 6A and 12;

Figure 15 is a vertical sectional detail view of parts of the automatic shifting mechanism and being taken along the line 15—15 in Figures 6A and 12;

Figure 16 is an isometric view of the lower right-hand portion of Figure 15 and showing a portion of the automatic shifting selector;

Figure 17 is an elevation similar to the lower right-hand portion of Figure 15, showing the parts in a different position;

Figure 18 is an isometric detail of a portion of Figure 16;

Figure 19 is a detail partly in section and taken along line 19—19 in Figure 12;

Figure 20 is a longitudinal vertical sectional view taken along the line 20—20 in Figure 6A;

Figure 21 is a longitudinal vertical sectional view taken along the line 21—21 in Figure 11, showing the clutch re-setting mechanism;

Figure 22 is a longitudinal vertical sectional view taken along the line 22—22 in Figure 6A and showing portions of the various selecting mechanisms;

Figure 23 is a vertical sectional view taken along the line 23—23 in Figure 11;

Figure 24 is a vertical sectional view taken along the line 24—24 in Figure 11;

Figure 25 is a vertical sectional view taken along the line 25—25 in Figure 11;

Figure 26 is a vertical sectional view taken along the line 26—26 in Figure 11;

Figure 27 is a vertical sectional view taken along the line 27—27 in Figure 11;

Figure 28 is a vertical sectional view taken along the line 28—28 in Figure 11;

Figure 29 is an elevation looking at the left-hand side of Figure 28;

Figure 29A is a detail sectional view taken along the line 29A—29A in Figure 11;

Figure 30 is a longitudinal vertical sectional view taken along the line 30—30 in Figures 2 and 6;

Figure 31 is a longitudinal vertical sectional view taken along the line 31—31 in Figure 6 showing a portion of the carriage supporting means and automatic latching means for a fixed impulse at the beginning of each line;

Figure 32 is a sectional plan view taken along the line 32—32 in Figure 1;

Figure 33 is a longitudinal vertical sectional view taken along the line 33—33 in Figure 32 and showing a portion of the restoring means for one of the selecting mechanisms; an identical structure to Figure 33 being shown in the lower central portion of Figure 13, there being duplicate mechanisms of this type on each side of the machine;

Figure 34 is a transverse vertical sectional view taken along line 34—34 in Figure 32 and showing a portion of one of the selecting mechanisms;

Figure 35 is a vertical longitudinal sectional view taken along the line 35—35 in Figure 6 showing a portion of the striking bail for moving the selector and the means for operating the same, the twin counter-part of this mechanism being shown in the upper right-hand portion of Figure 14;

Figure 36 is a longitudinal, vertical, sectional view taken along the line 36—36 in Figure 32, and showing the locking out means for a part of the selecting mechanism, the twin counter-part of this mechanism being shown in Figure 14;

Figure 1:
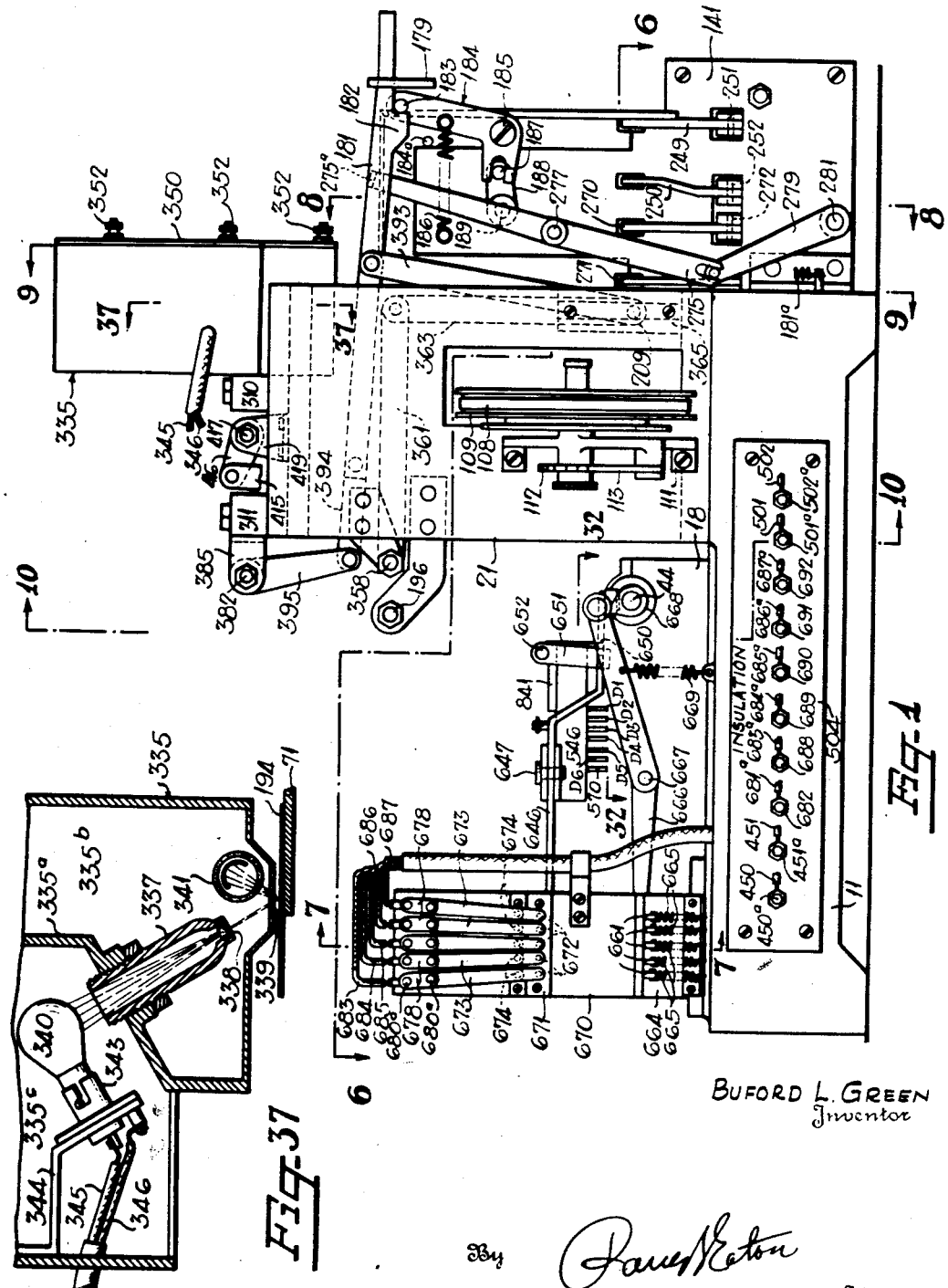
Figure 1 is a side elevation of the apparatus, showing the left-hand side thereof.
Figure 2:
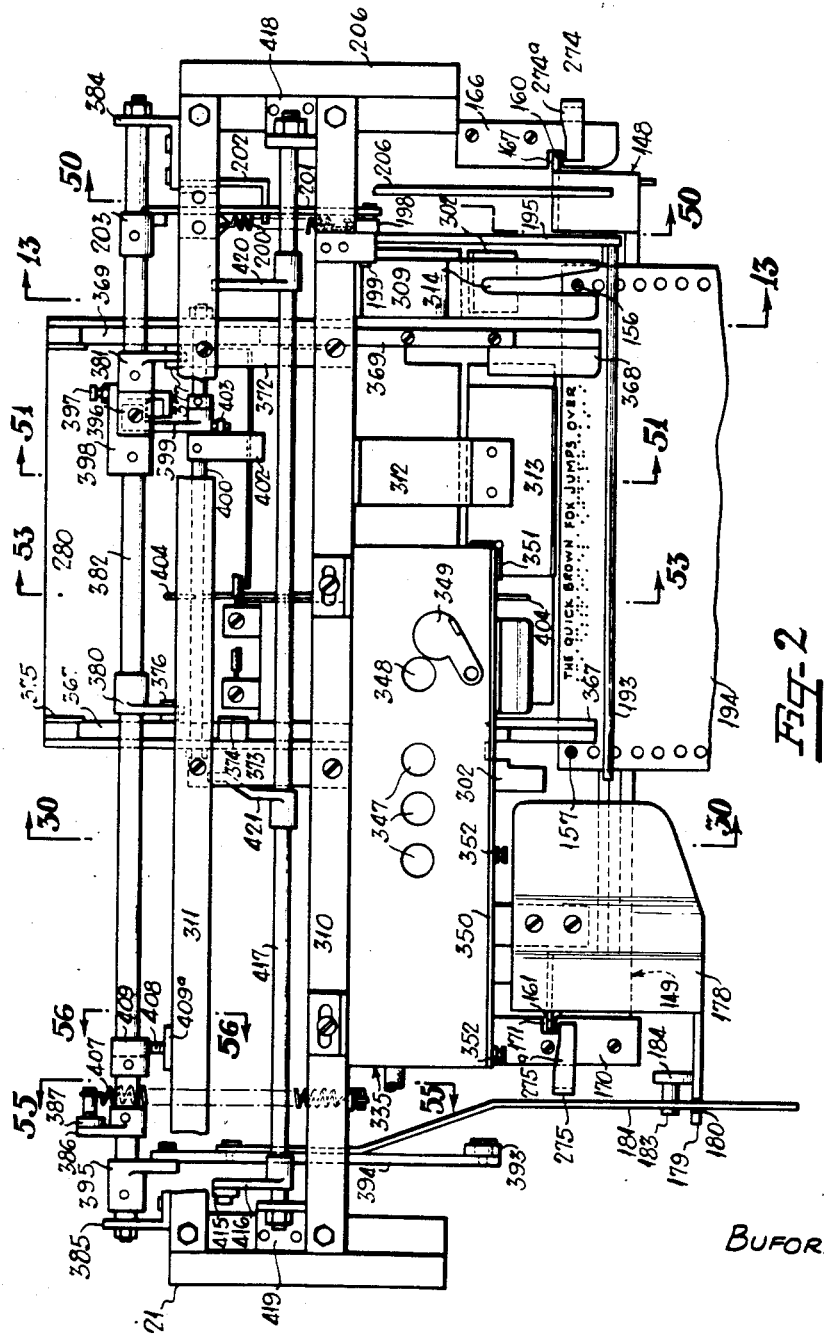
Figure 2 is a top plan view of the right-hand portion of Figure 1.
Figure 3:
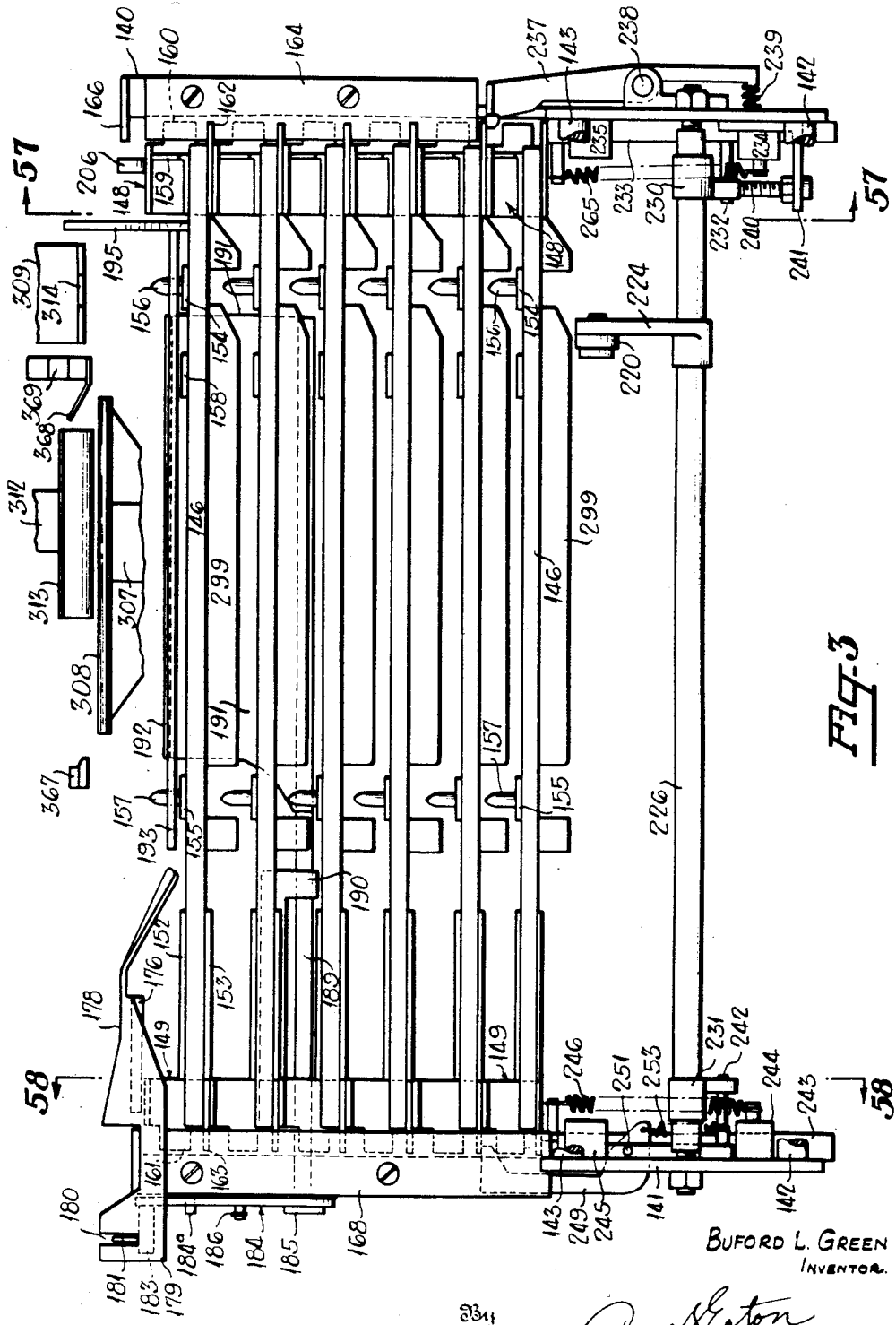
Figure 3 is a front elevation of the machine, looking at the right-hand portion of Figure 1, showing the control sheet feeding mechanism.
Figure 4:
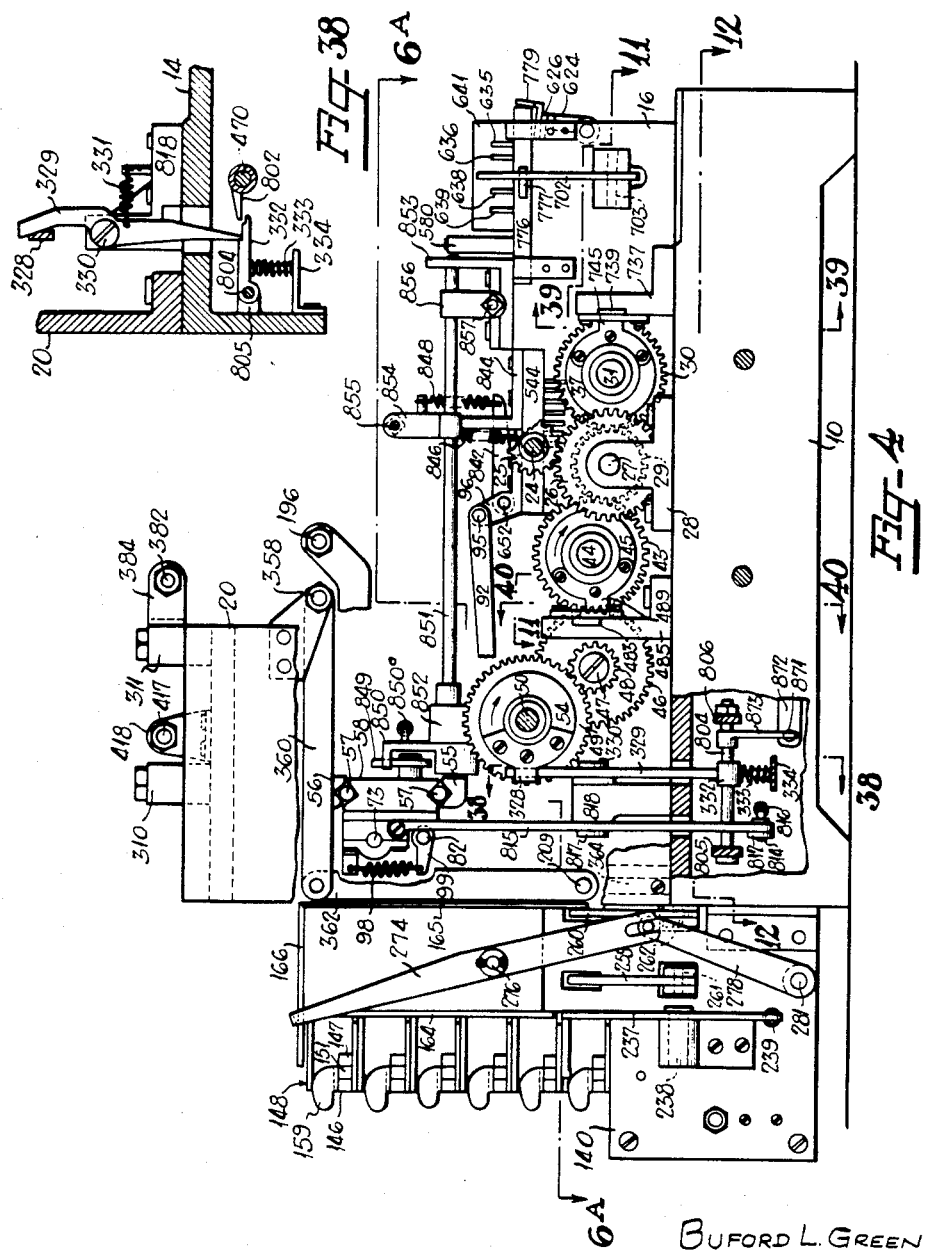
Figure 4 is an elevation showing the reverse side to that shown in Figure 1.
Figure 5:
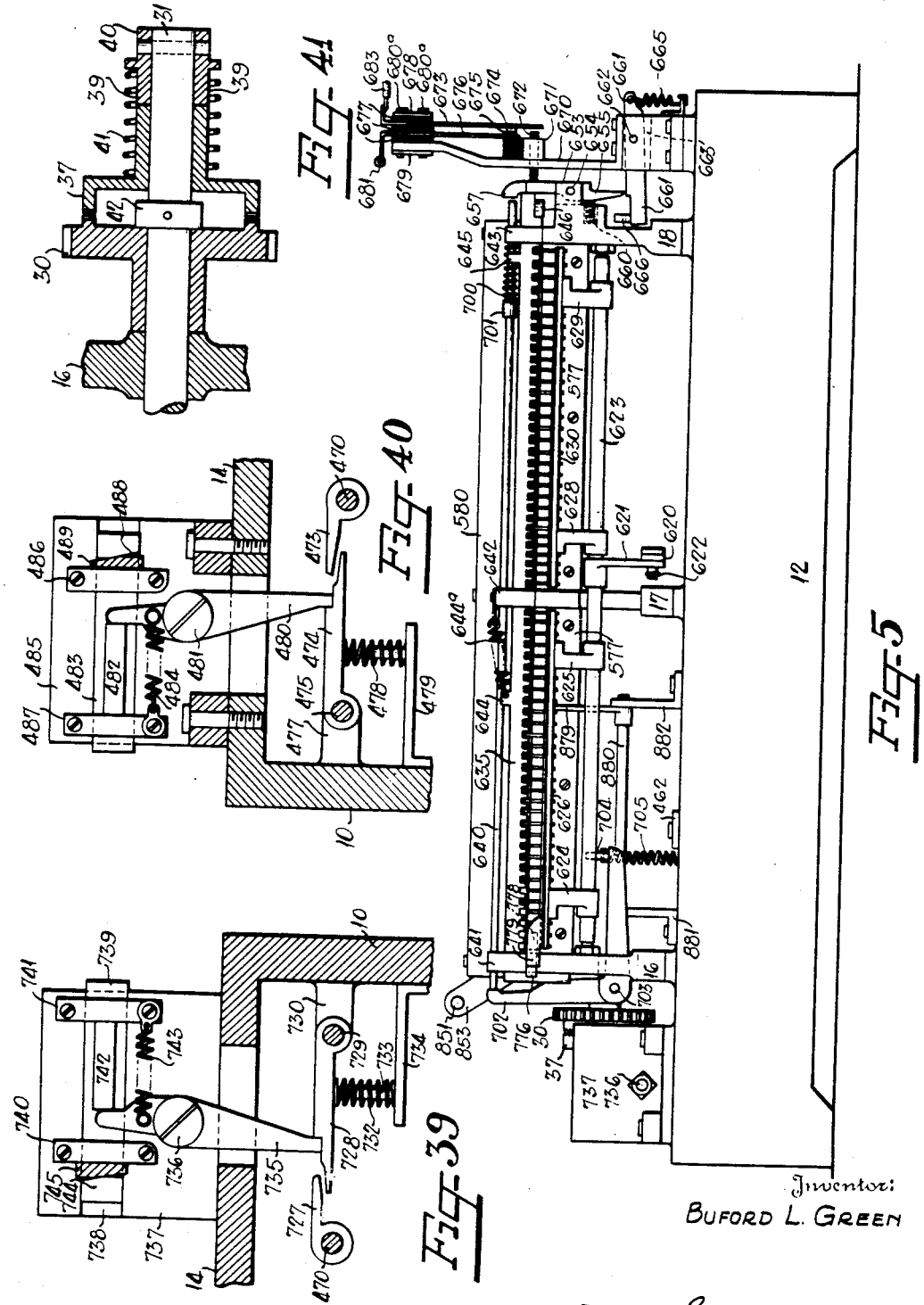
Figure 5 is an elevation of the rear end of the machine and looking at the left-hand end of Figure 1.
Figure 6:
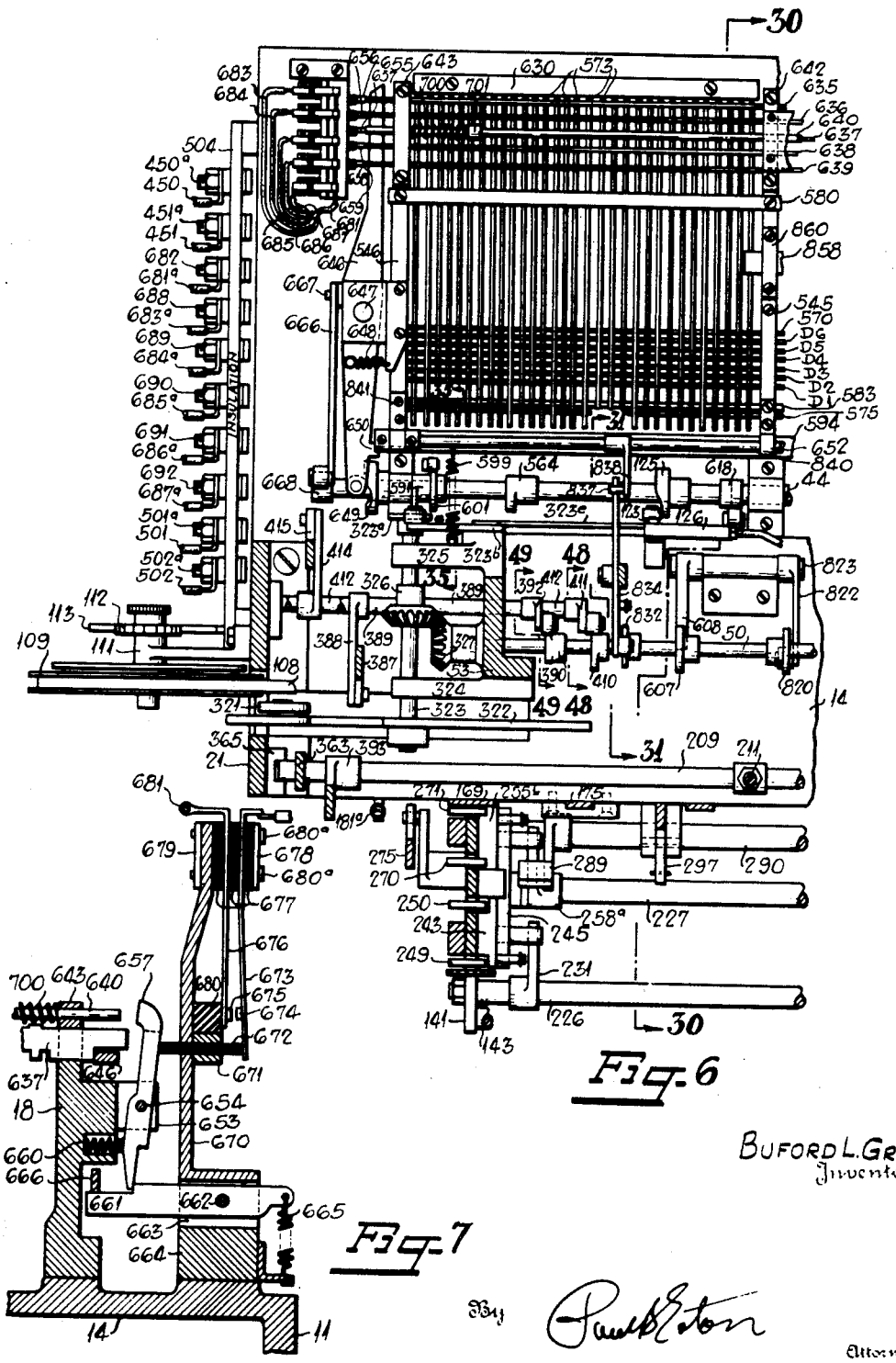
Figure 6 is a top sectional plan view of the left-hand portion of the machine and taken along line 6—6 in Figure 1.
Figure 9:
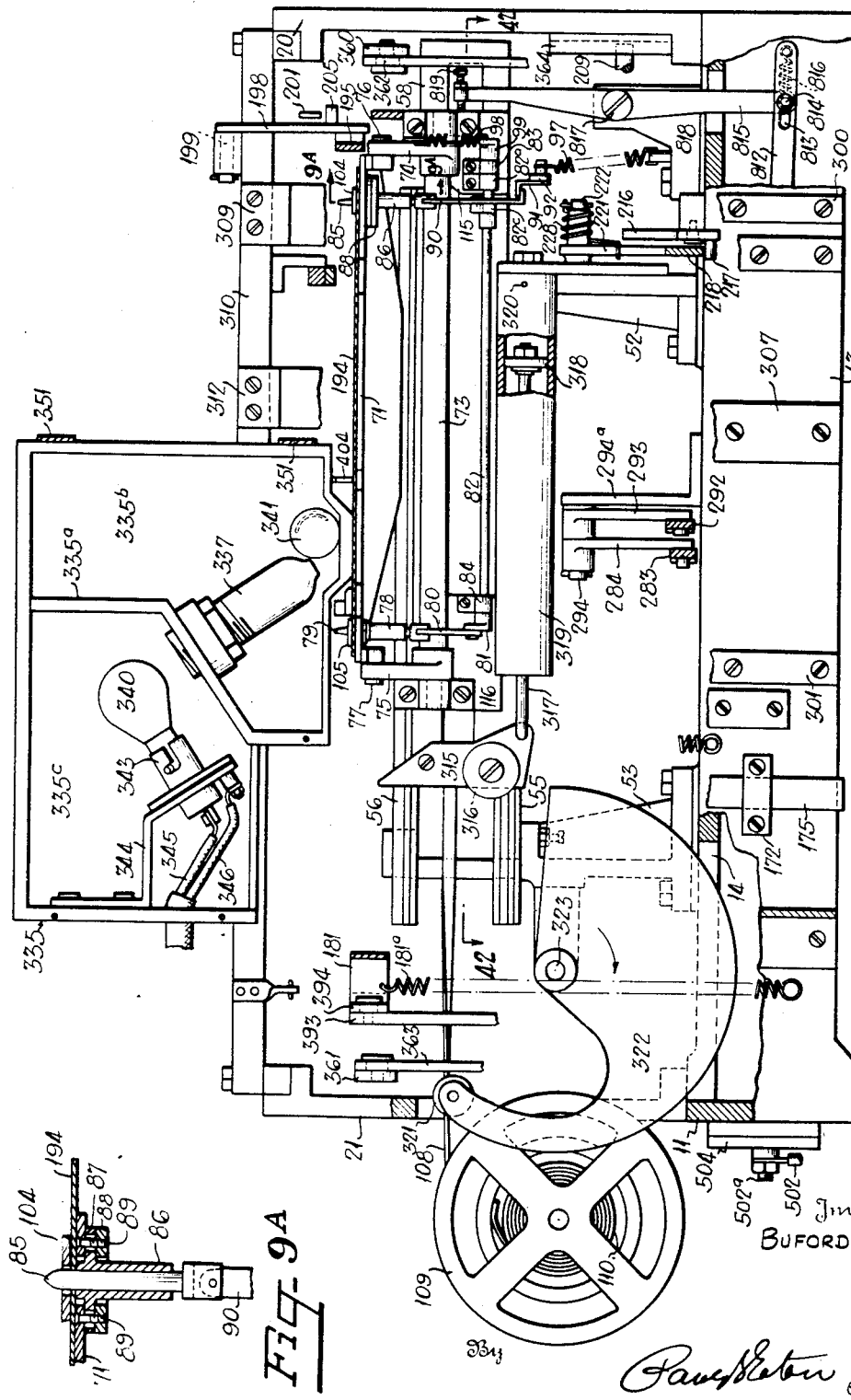
Figure 9 is a vertical sectional view taken along line 9—9 in Figure 1 with the paper feeding mechanism removed.
Figure 11:
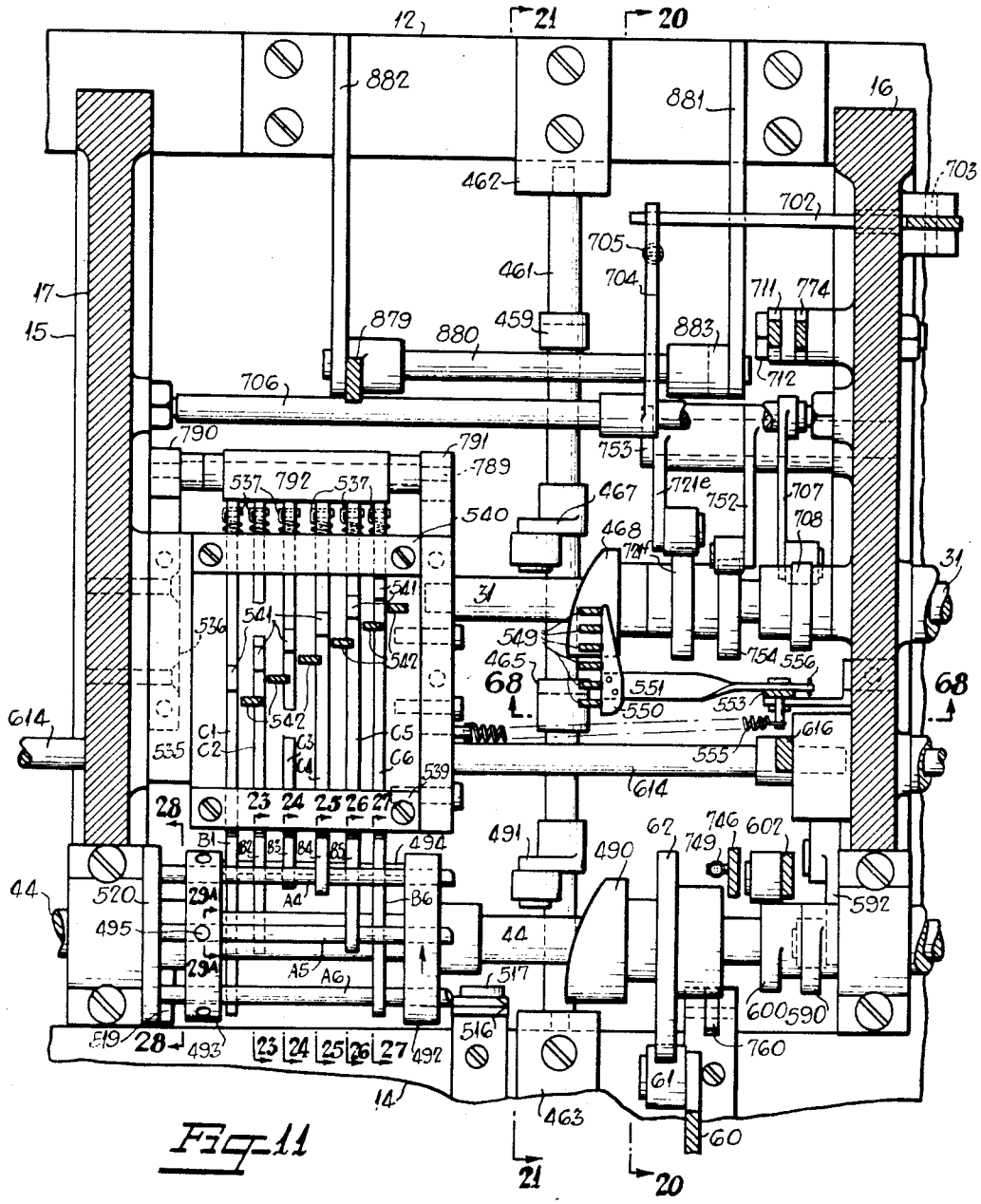
Figure 11 is a sectional plan view taken along the line 11—11 in Figure 4.
Figure 12:
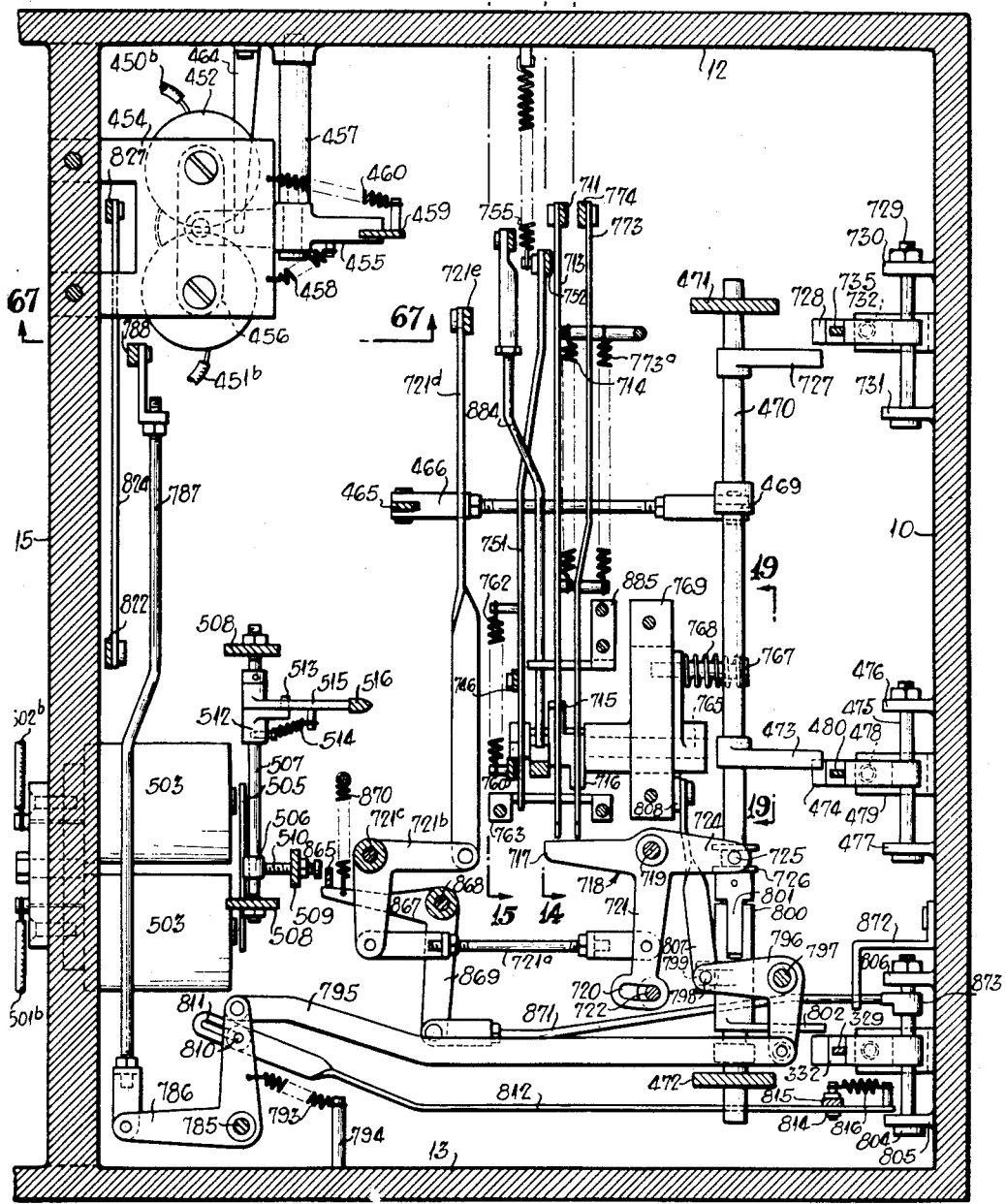
Figure 12 is a sectional plan view taken along the line 12—12 in Figure 4.

Figure 37 appears on the same sheet as Figure 1 and is transverse, vertical, sectional view taken along the line 37—37 in Figure 1, showing the scanning mechanism;

Figure 38 which appears on the same sheet as Figure 4 is a transverse vertical section taken along the line 38—38 in Figure 4 and showing the clutch tripping means on the carriage return shaft;

Figure 39 appears on the same sheet as Figure 5 and is a transverse vertical sectional view taken along the line 39—39 in Figure 4, and showing the clutch tripping mechanism operating on the automatic shift;

Figure 40 appears on the same sheet as Figure 5 and is a transverse, vertical, sectional view taken along the line 40—40 in Figure 4 showing the clutch tripping mechanism for operating on the main drive shaft;

Figure 41 is a vertical, transverse, sectional view taken along the line 41—41 in Figure 6A and showing an example of the clutch structure used along the right-hand side of Figure 6A on the automatic shift shaft, main drive shaft and carriage return shaft;

Figure 42 is transverse, sectional plan view taken along the line 42—42 in Figure 9 but showing the carriage in a different position, and showing the escapement mechanism for the carriage;

Figure 43 is a transverse, vertical, sectional view taken along the line 43—43 in Figure 42 and showing in elevation the escapement mechanism for the carriage;

Figure 44 is a longitudinal, vertical, sectional view taken along the line 44—44 in Figure 6A and showing portions of the first and second selectors and also showing parts controlled by a blot-out combination of cell controls on the control sheet;

Figure 45 is a longitudinal, vertical, sectional, detail view taken along the line 45—45 in Figure 6A and showing the cam on the carriage return shaft and also showing a lever which controls the gripping fingers for advancing the control sheet to new line position, also controlling the insertion of new copy into the apparatus;

Figure 46 is a longitudinal, vertical, sectional, detail view taken along the line 46—46 in Figure 6A and showing the cam on the carriage return shaft for operating the copy carrying feed bars to move the lower rearmost copy-carrier to lowermost front position;

Figure 47 is a longitudinal, vertical, sectional, detail view taken along line 47—47 in Figure 6A, showing the cam on the carriage return shaft and the parts moved thereby for moving the top copy-carrying bar from front to rear position where the copy or control sheet is seized and carried into the carriage and scanning mechanism;

Figure 48 is a vertical, longitudinal, sectional, detail view taken along the line 48—48 in Figure 6 showing a cam on the carriage return shaft for operating the means for relieving the grippers from the control sheet as it is moved to new line position;

Figure 49 is a vertical, longitudinal, sectional, detail view taken along the line 49—49 in Figure 6 showing a cam on the carriage return shaft for operating means for advancing the control sheet to new line position and also for advancing new copy into the machine;

Figure 50 is a longitudinal vertical sectional view taken along the line 50—50 in Figure 2, showing the upper right-hand portion of the automatic feeding mechanism for the control sheet and showing the lever which pushes the copy carrying bars downwardly after the transfer has been made from the front and inwardly into the machine;

Figure 51 is a vertical, longitudinal, sectional view taken along the line 51—51 in Figure 2 and showing a portion of the carriage mechanism and especially the means for controlling the insertion of a new control sheet into the apparatus after the previous one has been scanned;

Figure 52 is a view similar to the upper lefthand portion of Figure 51 showing the parts in a different position;

Figure 53 is a vertical, longitudinal, sectional view taken along the line 53—53 in Figure 2 and showing means cooperating with the mechanism shown in Figures 51 and 52;

Figure 54 is a vertical, longitudinal, sectional view taken along the same line as Figure 53 but showing the parts in a different position;

Figure 55 is a vertical, longitudinal, sectional view on an enlarged scale and taken along the line 55—55 in Figure 2, and showing mechanism for removing pressure from the control sheet, levers for advancing the control sheet being scanned and showing portions of means for operating automatic means for feeding the control sheet into the apparatus;

Figure 56 is a detail view, partly in section, and taken along the line 56—56 in Figure 2 and showing means for limiting the travel of the control sheet gripping means when a new control sheet is about to be inserted;

Figure 57 is a vertical, longitudinal, sectional view taken along the line 57—57 in Figure 3 through the control sheet holding and feeding mechanism;

Figure 58 is a vertical, longitudinal, sectional view taken along the line 58—58 in Figure 3, showing parts cooperating with the parts shown in Figure 57;

Figure 59 is a vertical, longitudinal, sectional view taken along the same line as Figure 58 but showing the parts in a different position;

Figure 60 is a sectional, plan view taken along the line 60—60 in Figure 57;

Figure 61 is a sectional, plan view taken along the line 61—61 in Figure 58;

Figure 62 is an isometric view of one type of a bar for elevating the copy-holding bars;

Figure 63 is an isometric view of another type of bar for elevating the copy holding bars in the control sheet feeding mechanism;

Figure 64 is an isometric view of still another type of bar for moving the copy holding bars in the copy-holding magazine;

Figure 65 is an isometric view of one of the copy-holding bars which is adapted to fit in the magazine with all cooperating portions in assembled position;

Figure 66 is an isometric view of one of the copy holding bars with the central bar withdrawn from the magazine for placing thereon a control sheet for insertion into the magazine;

Figure 67 is a transverse, vertical, sectional view taken along the line 67—67 in Figure 12 and showing the magnet which trips the various clutches in the apparatus;

Figure 68 is a transverse sectional view taken along line 68—68 in Figure 11 showing means for preventing the automatic shift shaft from being operated after a blot-out has been scanned;

Figure 69 is transverse sectional detail view of the seventh bar, 570, in the third selector showing its means of operation;

Figure 70 is a transverse sectional view showing the right hand end of bar D6 in the third selector;

Figure 71 is a wiring diagram of the circuit controlled by the photoelectric cell in the apparatus;

Figure 72 is a wiring diagram of the circuit leading from the contacts controlled by the last selector bars to the conventional distributor and receiving printer or electric typewriter, and the circuit leading from the distributor to the clutch trip magnet of the herein described mechanism;

Figure 73 is a view of a control sheet adapted to be used in this apparatus for transmitting impulses to a telegraph printer;

Figure 74 is a view showing the sequence of scanning one character;

Figure 75 is a view showing the code adapted to be used in my transmitting mechanism and also showing the characters as reproduced by the printer.

Referring more specifically to the drawings, the main frame of the machine has its side base portions designated by 10 and 11 while the rear base portion is indicated by 12 and the front portion of the frame is designated by 13. These two sides and two end portions are shown in the drawings as being made integral in one common piece of material and the front, rear, and side portions preferably have cast integral therewith a cover portion 14 which has a substantial opening in the central portion thereof to allow certain working parts of the machine to pass therethrough.

The front and rear walls 12 and 13, as well as the cover 14, have cast integral therewith a longitudinally disposed rib 15. Disposed longitudinally of the machine and secured on top of the cover portion 14 are a plurality of longitudinally disposed ribs 16, 17 and 18, which are secured to the cover 14 by any suitable means such as stud bolts 19. These ribs, 16 to 18, inclusive serve as supports for certain shafts and other features as will be described later.

Secured to the cover 14, at its extreme side edges, are the upstanding supports 20 and 21 which serve as supports for certain of the shafts, the scanning mechanism and parts of the means for feeding the control sheet to the scanning mechanism as well as parts of the control sheet magazine.

Secured to the exterior of the end wall is a bracket 22 for supporting a suitable driving means such as an electric motor 23. This electric motor has a motor shaft 24 disposed therein and on the end of which is mounted a pinion 25 which meshes with a gear 26 disposed on stud shaft 27 mounted for rotation in bearing 28 near one end and also in rib 16. This shaft 27 has also mounted thereon pinion 29 which meshes with a pinion 30 loosely mounted on automatic shift shaft 31. Shaft 31 is mounted for rotation in rib 16 as well as in the selector block which will be described later.

Mounted for endwise movement on shaft 31 is clutch face 37 which has its splined hub engaged by two prongs 38 on a collar 40 which is keyed on the end of shaft 31. A compression spring 41 surrounds both the hub of clutch face 37 and collar 40 and normally presses the clutch face 37 into engagement with the clutch face on one side of pinion 30. A collar 42 is secured on shaft 31 to limit outward movement of loose pinion 30 on shaft 31 and loosely confines it on shaft 31 between the collar 42 and rib 16. The engagement of clutch faces on pinion 30 and the clutch face 37 is controlled by mechanism to be hereinafter described.

Pinion 29 also meshes with a clutch face pinion 43 loosely mounted on main drive shaft 44. Drive shaft 44 is mounted for rotation in ribs 16, 17, and 18, and the parts thereon will be described in connection with the apparatus in conjunction with which they operate. Disposed on shaft 44 is a clutch face 45 which is similar in all respects to the mechanism shown in Figure 41 and already described.

This clutch is operated by mechanisms which will be hereafter described in conjunction with other portions of the machine. Clutch face 45 is normally moved toward clutch pinion 43 by means of a spring 45a which is similar to spring 41 just described. Clutch face pinion 43 also meshes with an idler gear 46 loosely mounted on stud shaft 47 supported by rib 16.

Idler gear 46 has integral therewith a pinion 48. This smaller idler pinion 48 meshes with a clutch face pinion 49 loosely mounted on carriage return shaft 50. Shaft 50 is mounted in upright 20, intermediate bracket 52 secured to cover plate 14, and bracket 53 likewise supported by cover plate 14. Carriage return shaft 50 has loosely mounted thereon a clutch face member 54, which is engaged by spring 54a, details of which are identical to the structure previously described in Figure 41.

*Carriage and oscillating means*

Intermediate brackets 52 and 53 have secured in spaced relation near the upper end thereof, race bars 55 and 56 which have their proximate edges grooved for the reception of balls 57 which also have movement in the grooved edges of an inner frame 58 of the carriage. Mounted for oscillation in brackets 52 and 53 is a shaft 59 (see Figures 10, 20, and 51) which has fixed thereon a lever 60, whose lower end has a roller 61 thereon adapted to follow cam 62 fixed on main drive shaft 44.

A spring perch 63 is secured to intermediate bracket 52 and a tension spring 64 is connected to one end of the spring perch and another end near the lower end of lever 60 which causes lever 60 to follow cam 62. The lever 60 serves to oscillate the carriage mechanism to be presently described.

Figure 10:
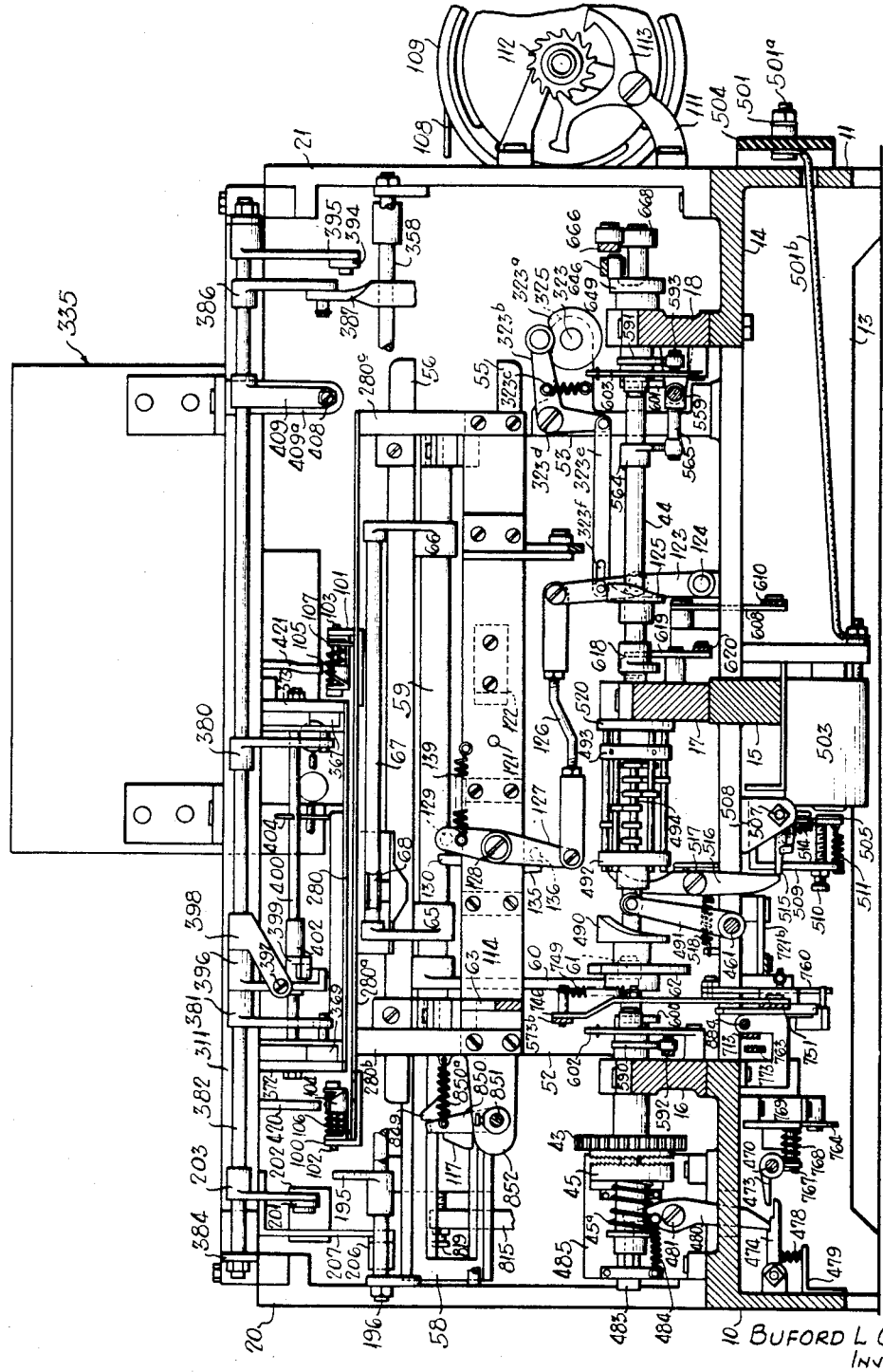
Figure 10 is a vertical sectional view taken along line 10—10 in Figure 1.

Carriage rocker shaft 59 also has two levers 65 and 66 fixedly secured thereon and projecting upwardly as shown in Figure 10, which have loosely mounted between their upper ends a shaft 67 which is engaged on opposed sides by grooved rollers 68 and 68 (Figure 51) which are mounted for rotation on a bracket 70, secured to carriage table top 71 as at 72. The carriage inner frame 58 has mounted for oscillation on one side thereof (see Figure 9), a shaft 73 which has fixed thereon levers 74 and 75 and to the upper end of these levers there is pivotally mounted as at 76 and 77 the carriage table top 71 which has been previously described.

It will be observed that shafts 59 and 73 are in the same horizontal plane whereas shaft 67 and the pivot points 76 and 77 for the carriage table top, where they penetrate the end of levers 74 and 75, are also in the same horizontal plane which insures a horizontal motion to the carriage table top 71 instead of an arcuate motion.

The cover 71 has secured thereto a bearing well 78 in which a pin 79 (Figure 9) having a pointed upper end is mounted for vertical sliding movement. This pointed upper end of the pin is adapted to penetrate a perforation in the control sheet to aline same for the scanning operation.

The lower end of pin 79 has pivotally secured thereto a link 80. The lower end of link 80 is pivotally connected to a crank 81 on the end of an oscillatable shaft 82 mounted in bearings 83 and 84 secured to the inner carriage frame 58. On the other side of the table top 71 a pin 85 is mounted having a pointed upper end which rises above the table top or cover plate 71 and is adapted to engage perforations in the control sheet for the same purpose as the pin 79.

The pin 85 is adjustably mounted in the cover 71 so that it can be adjusted to coincide with the perforations in the control sheet. This adjustment comprises a bearing well 86 in which the pin 85 is mounted (Fig. 9A). The bearing well has a flange 87 integral therewith which is surrounded by a washer 88 which is secured to the table top 71 by any suitable means such as screws 89. The table top 71 has an enlarged opening around the upper end of well 86. The flange 87 has enlarged holes therethrough which are penetrated by screws 89 threadably secured to washer 88 so that upon loosening screws 89 the bearing well 86 may be adjusted to the position and then the screws 89 tightened.

The lower end of pin 85 has pivotally connected thereto a link 90, which is pivotally connected intermediate its ends to the forward end of lever 82c fixed on shaft 82 and has an out-turned lower end adapted to be engaged by an angular member 91, fixed on the free end of lever 92 which has a roller 93 thereon adapted to ride on cam 94 on the carriage return shaft 50 (Figure 13). The other end of lever 92 is pivotally mounted as at 95 in the upper end of bracket 96.

A tension spring 97 normally causes lever 92 to follow cam 94 on the carriage return shaft so it is seen that when the carriage return shaft is operated the fingers will be withdrawn from the perforations in the control sheet while the same is stepped to new line position at which time they will again enter the new set of perforations in the control sheet. These pins 79 and 85 are caused to enter the new set of perforations by means of a tension spring 98 secured to an arm 99 on shaft 82 as will be seen in Figures 4 and 9.

The upward movement of pins 79 and 85 is limited by means of a lever 82a having a set screw 82b in the upper end thereof which is adapted to contact plate 115 on the carriage 58. Lever 82a is fixedly mounted on shaft 82 (Figures 9 and 13).

Secured to the carriage table top 71 are brackets 100 and 101 (Figure 10) which have mounted therein, above the upper surface of the carriage table top 71, pins 102 and 103 on which are pivotally mounted pressure fingers 104 and 105 which have one end thereof normally pressed downwardly against the control sheet by means of torsion springs 106 and 107. These pressure fingers have a hole in their forward ends through which the pins 79 and 85 project (Figure 9).

The carriage is normally pulled toward the left-hand side of the machine by means of a tape 108 wound on a wheel 109 which is under tension by means of winding spring 110. The wheel 109 is mounted in a bracket 111 and has a ratchet wheel 112 engaged by a double acting dog 113 so that the tension applied to tape 108 can be regulated in a well known manner.

The carriage is allowed to move to the left under pull of the mechanism just described by means of an escapement mechanism. This escapement mechanism is supported on a bar 114 which is secured to the intermediate brackets 52 and 53. Secured to the inner carriage frame 58 are two plates 115 and 116 which have studs 115a and 116a secured on the inner side thereof which project to the other side of the inner carriage frame and have secured thereon a rack bar 117. This rack bar is adapted to mesh with a pinion 118 on collar 119.

The collar 119 has integral therewith escapement wheel 120. Collar 119 with its pinion 118 and its escapement wheel 120 is mounted for rotation on a shaft 121 supported by bar 114, and the end of a bracket 122 secured to bar 114, (Figure 10).

The escapement mechanism comprises a lever 123 pivoted at its lower end as at 124 on plate cover 14, (Figures 10, 42 and 43). This lever has a roller adapted to follow a barrel cam 125 on main drive shaft 44 as shown in Figure 10. The upper end of lever 123 has pivotally secured thereto an adjustable link 126 whose other end is secured to lever 127 pivoted intermediate its ends as at 128 on bar 114. The upper end of lever 127 has a pin 129 projecting over the top edge of bar 114 and is adapted to engage a lug 130 of sliding dog 131 mounted for sliding movement in brackets 132 and 133 secured on the side of bar 114.

Also mounted for sliding movement immediately below and slightly forward of dog 131 is a dog 134 which has an ear 135 thereon also adapted to be engaged by a pin 136 in lever 127. Both dogs 131 and 134 are normally pressed to the left in Figure 43 by tension springs 137 and 138 respectively. Lever 123, (Figure 10) is caused to follow barrel cam 125 by means of tension spring 139 secured at one of its ends to lever 127 and at its other end to bar 114. It will be observed in Figure 43 that dogs 131 and 134 are of peculiar formation.

It will be observed that on account of both dogs 131 and 134 being operated by the same lever, that only one of these dogs engage the ratchet wheel for any appreciable time except at the transfer point. Dog 131 is shown engaging the ratchet wheel and upon a clock-wise oscillation of lever 127 it will be seen that due to the clearance as shown in Figure 43 between pin 129 and ear 130 that the pointed end of dog 134 will project within the path of travel of the next tooth in the ratchet wheel before pin 129 disengages dog 131 therefrom. This allows a half-tooth movement in ratchet wheel 120. Upon a reverse oscillation of lever 130 it is seen that the upper dog will have projected into the path of travel of the tooth released by the lower dog 134, again allowing the ratchet wheel to move a half-tooth. This gives the half-spacing necessary to the scanning mechanism as will be apparent when the scanning operation is described hereinafter.

It will be observed in Figures 10, 20 and 51 that the carriage can be oscillated through instrumentalities actuated by the main drive shaft 44. In Figure 10 as well as in Figure 20, it will be observed that cam 62 is followed at all times by roller 61 on lever 60 and causes oscillation of lever 60. Lever 60 being fixed to shaft 59 causes oscillation of levers 65 and 66 and this in turn causes reciprocatory motion in shaft 67 which is engaged by rollers 68 and 69 secured on the carriage mechanism as shown in Figure 51.

Shaft 73, (Figure 9) is mounted for oscillation on suitable bearings fixed on plates 115 and 76

116. The upstanding levers 74 and 75 are pivotally connected to the carriage table top 71 and therefore on account of having these two centers of oscillation the carriage table top is given a straight-line reciprocatory movement during the scanning operation. The carriage is oscillated in one direction and then escapement mechanism operates to allow movement of the carriage a distance of one-half a character transversely of the machine which allows scanning of the other half of the cell control while the carriage is returned to initial position in one complete oscillation of the carriage mechanism. The parts then assume the position as shown in Figure 20 but of course it is evident that this continuous oscillating movement is apparent during the scanning of an entire line on the control sheet.

*Control sheet feeding mechanism*

It is evident that the control sheet could be fed into the apparatus for scanning by merely placing the control sheet therein with the pins 79 and 85 engaging the first set of perforations in the marginal portions thereof but this would be quite a tedious operation and, therefore, in order to make the machine entirely automatic, there has been devised a control sheet magazine and automatic means for feeding one control sheet at a time from the control sheet magazine. This control sheet magazine and automatic feeding means is operated from the machine itself and in timed relation thereto and is controlled by the machine.

Secured to the front portion 13 of the base of the machine is a pair of end plates 140 and 141. These plates 140 and 141 are not only secured to the machine as described but also have suitable tie rods 142 and 143 which are shown broken away in Figure 3 for sake of clearness. End plates 140 and 141 have vertically disposed bars 144 and 145 centrally located on the inner surface thereof. These bars form two vertical guideways for the reception of the copy-holding members. These copy-holding members are all identical and are shown in detail in Figures 65 and 66.

Each copy-holding member comprises parallel spaced bars 146 and 147 which are secured at their ends in spaced relation to U-shaped members 148 and 149 which form a guideway 150 between said bars.

The copy holding members are adapted to have vertical, upward and downward movement in the guideways formed by bars 144 and 145. A bar 151 is adapted to be slidably mounted in the groove 150 and is confined for sliding movement by means of plates 152 and 153 secured on the upper and lower sides of bar 151 and secured so as to form a sliding fit between the plates 152 and 153 and the bars 146 and 147. Each bar 151 has brackets 154 and 155 each having pins 156 and 157 respectively therein which are adapted to penetrate a set of perforations in the control sheet for holding the same and for feeding it into the apparatus.

Each bar 151 has one or more brackets 158 secured thereto to serve as a support and guide for the control sheet as the bars are moved longitudinally at the top of the apparatus for feeding the control sheet into the apparatus. Each bar 151 has a projection 159 secured thereto so that the bar 151 can be moved to the position shown in Figure 66 by the operator engaging the projection 159.

U-shaped members 148 and 149 have projections 162 and 163 respectively which serve as guides for the copy-holding members.

The upper portion of end-plate 140 has secured to the sides thereof bars 164 and 165 and on the top end of side-plate 140 there is secured an overlapping bar 166. These bars project inwardly past the inner surface of side plate 140 to serve as guides.

In Figures 57 and 60 it is to be observed that projections 160 are disposed to the left-hand side of plates 164 and 165. Top plate 166 has a notch 167 therein so as to permit projection 160 to pass upwardly therethrough when the front upper copy carrying member is raised upwardly to transfer the copy carried thereby into the machine. When such happens the projection 162 will pass between the lower side of plate 166 and the upper ends of members 144 and 164 which serve as a guideway for this end of the car.

It will be observed that each copy-holding member on the rearward side thereof has secured a baffle plate 299 which has a couple of notches therein for allowing the pins 156 and 157 to pass therethrough when a transfer is being made. This baffle serves to hold the next succeeding copy which is held by the copy-holding members directly below and prevents removal of said control sheets from the copy-holding members while in the magazine.

End plate 141 has secured to the front edge thereof a plate 168 which projects inwardly over the inner surface of plate 141 to serve as a guideway for the other end of the copy-holding bars, (Figures 23, 58, 59 and 61). On the rear edge of plate 141 there is secured a plate 169 which projects inwardly over the inner surface of side plate 141 and serves as a guideway for the end of the copy-holding bars as the projection 161 occupies a position on the rear side of the plate 169, whereas, the projections 163 occupy a position on the front side of said plate 169.

Secured to the top of end plate 141 is an inwardly projecting plate 170 similar to plate 166 and which plate has a notch 171 therein for the purpose of permitting passage of projection 161 on the U-shaped member 149, when the front upper copy-carrying member is raised bodily for transfer to the rear tier of the copy-holding members and from which position the control sheet is transferred into the machine.

Figure 8:
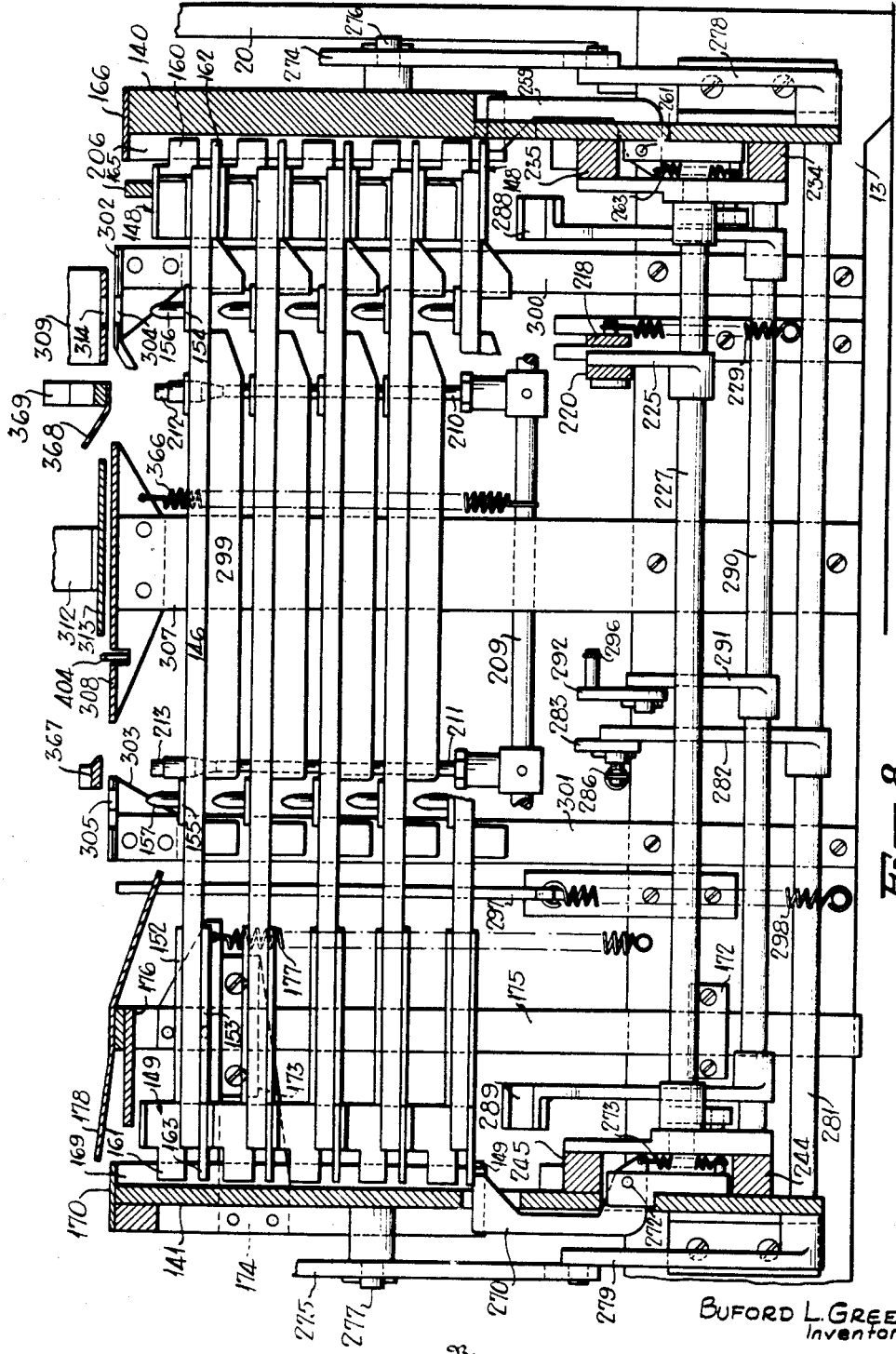
Figure 8 is an enlarged vertical sectional view taken along line 8—8 in Figure 1 through the control sheet feeding mechanism.

In order to cause the copy-holding bars to assume a definite position when not in the transfer process pressure means are employed at each side of the machine to resiliently hold the carriers in position. It will be observed in Figures 2, 8 and 58 that suitable guide-plates 172 and 173 are secured to the front portion of the base plate 13 and to projection 174 of end plate 141 respectively. Mounted for vertical sliding movement beneath these plates 172 and 173 is a sliding bar 175 which has secured on its upper end a plate 176 adapted to exert pressure at times on the topmost copy-holding member by engaging the U-shaped member 149 secured thereto. This pressure is applied by means of a tension spring 177 as will be seen in Figure 8. Figures 2 and 8 show a plate 178 secured to the topmost surface of the horizontal bent-over portion of bar 175, said plate projecting downwardly to the right-hand and upwardly to the left-hand of the bent over portion and serves as a guide for the copy which is being scanned while held in the carriage mechanism.

It is evident that were it not for this guide plate 178 the left-hand edge of the control sheet would engage bar 175, the U-shaped bracket 149, or the end plate structure 141 and associated parts.

In order to exert pressure on the tiers of copy-carrying members it will be observed in Figures 2 and 50 that a lever 206 is pivoted at one end to bracket 207 and is normally pressed downwardly by a tension spring 208 which upon elevation of the front upper copy-carrying member, exerts pressure thereon and when the front upper copy-carrying member is transferred to the top-most position of the rear tier, the lever 206 exerts pressure on both front and rear copy-carrying members to cause them to assume normal position and this pressure remains at all times on the uppermost of the front copy-carrying members. This structure cooperates with the mechanism mounted on the slide bar 175 on the left hand side of the machine.

By referring to Figures 2 and 3, it is seen that plate 178 has a projecting portion 179 which has a notch 180 in the upper edge thereof to guide a lever 181 having a projection 182 thereon for engaging a pin 183 in one leg of the bell crank lever 184 pivoted as at 185 and normally held in a counter-clockwise direction by means of a tension spring 186. The forward end of lever 181 is normally pressed downwardly by a tension spring 181a. The other leg of bell crank lever 184 has a fork formed therein adapted to engage a pin 187 on the end of lever 188 fixedly secured to a shaft 189 which penetrates sidewall 141 and is supported by said sidewall 141 and the end of the bracket 190 secured thereto, (Figure 3) to cause the bracket 190 and the sidewall 141 to serve as bearings for rod 189.

Rod 189 has secured thereto a vane 191 which projects upwardly slightly above the normal position of the upper foremost copy-holding bar.

Vane 191 has a horizontally and forwardly projecting portion 192 adapted to engage the leading edge of the control sheet held by the upper, forward copy-holding member to hold it on the copy-holding member. It will be observed in Figure 30 that on account of the upper, forward copy-holding member being in a position about to be transferred to the top-most position in the rear tier of copy-holding members that this projection 192 is released from the leading edge of the control sheet carried by the copy-holding member, so as to allow the front tier of the copy-holding members to be lifted up and allow the top-most member to be transferred to top-most position in the rearmost tier.

It will be observed by referring to Figures 30, 38, 58, and 59 that when the topmost copy-carrying member is caused to raise, the U-shaped bracket 149 will engage the plate 176 mounted on the sliding bar 175. This will also cause the plate 178 which has the projection 179 thereon to be raised upwardly carrying with it the end of lever 181. It will be seen in Figure 1 that when this lever is raised that the pin 183 on bell crank 184 will be disengaged from the projection 182 thereby allowing the bell crank to rotate a slight amount in a counter-clockwise direction under the tension of spring 186.

This counter-clockwise rotation is limited by a suitable pin 184a which projects from the side plate 141. When this rotation of bell crank 184 is effected, the lever 188 and rod 189 will be caused to rotate in a clockwise manner thereby rotating the vane 191 and the projection 192 in a clockwise direction which will allow the projection 192 to project over and above the leading edge of the next succeeding copy-carrying member and engage the leading edge of the control sheet thereby holding it in position and preventing the copy from being removed from the pin.

It will be observed in Figures 2 and 30 that a small rod 193 is resting on the top of control sheet 194 carried by the upper front copy-holding member. This rod is supported by the forward end of a lever 195 which is fixed on shaft 196 mounted between brackets supported by upstanding portions 20 and 21.

It will be seen by referring to Figure 13 that when the front tier of copy-holding members is moved upwardly for transfer of the topmost copy-holding member with its control sheet to the topmost position of the rear tier, that lever 195 will be raised upwardly, and on account of lever 195 having a projection 197 on the right hand side thereof, this projection will be engaged by the lower end of a hooked pawl 198 pivotally secured as at 199 and normally pressed rearwardly by a tension spring 200.

The purpose of rod 193 on lever 195 is to prevent removal of control sheet 194 as the front tier of copy carrying members is being elevated, as the rod 193 rests on control sheet 194 during this operation.

Lever 195 is therefore held in elevated position by the above described latching means during the scanning of the control sheet, and when the transfer has been made and the lever 195 is to be lowered onto the next succeeding control sheet and copy-carrying member, it will be seen that link 201 mounted for sliding movement in support 202 will be moved rearwardly by lever 203 fixedly secured on shaft 382 and on account of this link 201 having the peculiar curved formation in the lower surface thereof, it will allow this link 201 to drop down in the rear of pin 205 so that upon oscillation of shaft 382 in a counterclockwise direction in Figure 13, the link 201 will push the lever 198 in a counter-clockwise direction and release lever 195 so it can fall onto the topmost control sheet carried by the topmost front copy-carrying member.

When a control sheet has been scanned to its end certain mechanical elements are brought into play to cause the introduction of a new control sheet into scanning position. The introduction of the new control sheet is effected by the elevation of the front tier of the copy-holding bars, and the moving of the front upper copy-holding member to topmost position in the rear tier of the copy-holding members from whence the copy is transferred into the apparatus, by means of being engaged by friction fingers, to be later described, for moving it into scanning position where the pins 79 and 85 enter the first set of perforations in the control sheet.

The movement of the copy-holding members in the front tier upwardly and the movement of the copy-holding members in the rear tier downwardly is brought about by certain mechanisms disposed beneath the copy-holding members.

The movement of the copy-holding members is brought about not by each carriage return but upon a carriage return after the last line of the control sheet has been scanned, as will be described in connection with part 404 and associated parts.

Disposed between the end plates 20 and 21 is a shaft 209 which has fixedly mounted thereon arms 210 and 211 which have friction members 212 and 213 such as rubber members in their upper ends which are adapted to engage the lower side of the control sheet and move it from off the upper rear-most copy-holding member into the apparatus to a point where the pins 79 and 85 penetrate the first set of perforations in the control sheet. This represents the greatest swing of the arms 210 and 211 after the control sheet is moved into position for the scanning and as the control sheet is moved from line to line, the arc of swing of arms 210 and 211 is not so great.

In Figures 13 and 20 the parts are shown in position where the arms 210 and 211 are swung to their most forward position ready to engage and transfer a new control sheet to scanning position. It is only when the arms are in this position that the means for raising the copy-holding members in the front tier and lowering the copy-holding members in the rear tier and movement of the upper, forward copy-holding members to rear-most position occurs.

This is due to the fact that, it will be observed in Figure 13, shaft 209 has an arm 214 thereon with a set screw 215 therein which in the position shown is engaging one end of a bell crank lever 216 and that the other end of the bell crank lever has a pin 217 therein projecting beneath a link 218 which is pivoted intermediate the ends of a link 220 as at 219.

The link 218, as will be observed in Figure 13, at the rearmost end thereof has a notch which is adapted in the position shown to be engaged by one end of a bell crank lever 221 which is pivoted on a stud 222 and whose other end has a roller thereon adapted to be engaged by cam 223 on carriage return shaft 50.

Bell crank lever 221 is caused to follow cam 223 by means of a torsion spring 228 having one end secured to the stud 222 and its other end hooked around one end of the bell crank lever 221.

When the carriage return shaft is operated with the copy-moving fingers in the position described it is therefore apparent that bell crank lever 221 will move link 218 forwardly in the machine and will oscillate a pair of levers 224 and 225 pivotally secured at their upper ends to link 220 and fixedly secured at their lower ends to shaft 226 and 227 which are mounted for oscillation between the end plates 140 and 141.

Link 218 is caused to press at all times against the pin 217 in one end of bell crank lever 216 by means of tension spring 229. The bell crank lever 216 is limited in its clockwise movement in Figure 13 on account of its right-hand end engaging the edge of cover plate 14 when the copy moving fingers are not in fully advanced position for moving a new control sheet into the apparatus and therefore, the bell crank lever 216, under tension of spring 229 cannot interfere with normal operation of the copy moving fingers in moving the control sheet from line to line position during the scanning operation.

It will be observed in Figures 57 and 58 that shaft 226 near each end thereof and on the inside of the side plates 140 and 141 has secured thereon levers 230 and 231. Lever 230 rests beneath a pin 232 on slide 233 mounted for vertical sliding movement on the inside surface of end plate 140 by means of plates 234 and 235. Sliding bar 233 is normally moved downwardly at all times by means of a tension spring 265.

Bar 233 is shown in Figure 62 and it will be observed that its upper end which is disposed next to end plate 140 is beveled as at 236 so that when it is moved upwardly by oscillation of shaft 226 it will allow the pivoted dog 237 to pass beneath the portion 162 of the copy-carrying member, (Figure 3).

The dog 237 is pivoted as at 238 and is normally pressed inwardly to engage the ends of the copy-carrying members by means of a compression spring 239. The downward movement of levers 230 and 231 and oscillation of shafts 226 and 227 in a counter-clockwise direction is controlled by a set screw 240 secured in bracket 241.

By referring to Figure 58 it is seen that the companion front mechanism on the left-hand side of the machine is shown. There, is it seen, that lever 231 normally rests beneath pin 242 in sliding bar 243, also shown in Figure 64. This bar is mounted for vertical sliding movement between end plate 141 and the bars 244 and 245. This bar is normally pressed downwardly to cause pin 242 to engage lever 231 by means of tension spring 246.

It will be observed that the rear surface of bar 243 has cutaway portions 247 and 248 on each of its upper rearward corners to permit the bar to pass by dogs 249 and 250 when the front tier of copy-holding members is raised upwardly so that the dogs will pass beneath the projection 163 to hold the left hand end of the front tier in elevated position. These dogs 249 and 250 have cam surfaces on the lower portion of their upper projecting ends to permit the portion 163 of the copy-carrying members to push the dogs outwardly as the front tier of copy-holding members is raised. The dogs have their upper ends projecting through suitable holes in the side plate 141 and have a portion thereof disposed on the exterior of the side plate and then project through other suitable holes in the side plate 141 and are pivoted as at 251 and 252 and are normally moved to cause their upper ends to move inwardly by means of tension springs 253 and 254.

For lowering the rear tier of copy-holding members there is provided on the right-hand side of the machine a sliding member 255R which is mounted for sliding movement by plates 234 and 235 which also mount the bar 233 for sliding movement. Bar 255R is normally held in lowered position by means of a tension spring 256. The bar is shown in Figure 63 in isometric form and also in Figure 57 in assembled form. This bar has a pin 257 adapted to be engaged by lever 258 fixed on shaft 227. Upon oscillation of shaft 227 member 255R is raised upwardly and slides over the beveled ends of dogs 259 and 260 and releases the lower-most copy-holding member in the rear tier and allows the entire tier to be lowered as the member 255R is lowered and at which time of course the front tier has been elevated as a whole and the top-most member has been transferred to top-most position on the rear tier. The dogs 259 and 260 have their upper ends projecting inwardly through the end wall 140 and project through other perforations in the end wall and are pivoted at their lower ends on the inner surface of the end wall as at 261 and 262 and are normally held in engaging position by means of tension springs 263 and 264.

When the carriage return mechanism permits the introduction of a new control sheet and the transfer operation takes place while moving the front tier of copy-holding members upwardly, and lowering the rear tier of copy-holding members, the parts will assume an intermediate position as shown in Figure 59 where the top-most front copy-holding member is shown in elevated position and the rear-most tier is in normal position ready for the top-most front copy-holding member to be moved inwardly into the machine to occupy a position on top of the rear tier of copy-holding members from which position the feed fingers 210 and 211 transfer the control sheet into the apparatus for scanning.

The companion sliding bar adapted to cooperate with the other end of the rear tier of the copy-holding members is designated by 255L, it being identical in all respects to the right-hand companion rear bar already described except that it is opposite hand and its portions bear like reference characters. It is evident that it must be made opposite hand, as to the position of pins 266 for receiving tension springs 256 and 267 for normally pressing the bars 255R and 255L downwardly. Dogs 270 and 271 are identical to dogs 259 and 260 and cooperate with the mechanism on the left-hand end of the copy-holding members in the same manner as described for the dogs 259 and 260 for cooperating with the right-hand end of the copy-holding members to hold them in position except when they are to be lowered by the bars 255R and 255L.

The bar 255L has a pin 257a projecting therefrom which is adapted to be contacted by lever 258a fixed on shaft 227, (Figure 58). The operation of this lever takes place at the same time and in the same manner as lever 258 and pin 257 previously described.

The lower ends of dogs 270 and 271 are pivoted as at 272 and are normally caused to engage projections 163 of the copy carriers by means of springs 273.

When these copy-holding members have assumed the position shown in Figure 59 the next operation is to move the top-most front copy-holding member to top-most rearward position before the tier raising mechanism is lowered. This transfer of the top-most front copy-holding member to rearward position is accomplished while the parts are held in elevated position as shown in Figure 59 by means of the levers 274 and 275 which have horizontally disposed upper ends 274a and 275a which engage the projecting portions 160 and 161 on the ends of the copy-carrying assembly to transfer it to rear-most position. The levers 274 and 275 are pivoted intermediate their ends as at 276 and 277 respectively and have their lower ends forked and are engaged by pins in the upper ends of levers 278 and 279 respectively which are fixedly secured on a shaft 281 extending transversely of the machine and mounted in the end plates 140 and 141 and project slightly beyond the outer surfaces of the end plates at which point the levers 278 and 279 are secured.

By referring to Figures 8 and 47 it is seen that shaft 281 has secured thereto a lever 282 which has secured to its upper end a link 283 which is pivoted to one end of a bell crank lever 284 whose other end has a roller thereon adapted to follow a cam 285 on carriage return shaft 50 by means of a tension spring 286. This movement takes place each time the carriage return shaft is rotated but it is evident that if the front tier of the copy-carrying assemblies is not in the position shown in Figure 59 no transfer of copy-carrying assemblies will be effected because the top-most assembly will not be disposed high enough to be engaged by the projections 274a and 275a.

When the copy-holding members are moved to the position in Figure 59 ready for the front upper copy-carrying assembly to move to the top-most position in the rear tier, the parts will assume the position shown in Figure 59 and it will now be observed that levers 288 and 289 will assume the position shown by lever 289 in Figure 59 ready to move the lower-most copy-carrying assembly to the bottom of the front tier of the copy-carrying assemblies after the rear tier has been lowered.

In the lowering operation it will be observed, as has been previously described, how the front tier of copy-carrying members will be held in the position shown in Figure 59, by pawls 237, 249, and 250, and in this position it will be seen that there is some clearance between the top surface of the lowermost front copy-carrying assembly and the next succeeding one so that the lower rearmost copy-carrying assembly can be moved forward to lowermost front position. This prevents the rearmost lower copy carrying member when moved forwardly from engaging the next succeeding copy-carrying assembly disposed thereabove because the dogs are so positioned as to hold it in this clearing position.

The levers 288 and 289 are secured on a shaft 290 mounted between the end plates 140 and 141. Shaft 290 is oscillated by means of a lever 291, (Figure 46) secured to said shaft and projecting upwardly where it is pivotally secured to a link 292 which link is also pivotally secured to one end of bell crank lever 293 pivotally mounted on a stud 294 in a bracket 294a mounted on cover plate 14. The other end of bell crank lever 293 has a roller thereon adapted to contact cam 295 at all times on account of pressure of tension spring 296. This mechanical motion of moving the lowermost of the rear tier of copy-carrying assemblies forward takes place upon each rotation of the carriage return shaft but unless the control sheet is moved out of the machine and a new control sheet is moved thereinto there will be no transfer of copy-carrying assembly because the levers 288 and 289 will not engage any copy-carrying members because they will be held in elevated position.

By referring to Figures 8 and 30 it will be seen that a bell crank lever 297 is provided and has a hook on its upper end and has one leg thereof engaged by a tension spring 298 so as to engage the rearmost tier of copy-holding members to prevent their bouncing upwardly when they are engaged by the lowering means. Therefore, when these lowering means are raised to engage the lowermost of these copy-holding members as the engagement of the lowermost of this tier of rearwardly disposed copy-holding members would cause a jolt to be applied thereto and would raise these upwardly, were not this means provided for holding the uppermost ones and preventing further upward movement of the rearmost tier.

When the topmost of the forward tier of copy-holding members is moved rearwardly it pushes the upper end of bell crank lever 297 backwardly and it will be observed that the upper forward surface of this bell crank lever is beveled downwardly and forwardly so that the leading edge of the copy-holding member moved into position at the top of the rear tier of copy-holding members will push this dog backwardly against the tension of spring 298 and when the lowering means are moved to lowered position the top-most member which is moved into position is then moved downwardly and its upper surface will be engaged by the lever 297 as shown in Figure 30.

It will be observed by referring to Figure 8 that the front surface of the front portion 13 of the frame of the machine has secured thereto a pair of bars 300 and 301 which extend upwardly some distance above the copy-holding members as seen in Figure 8 or in other words to a point where the top-most front copy-holding member will be flush with the upper ends of said bars when the topmost front is raised for transfer to the rear tier. The upper ends of these members have plates 302 and 303 secured thereto which are slotted to allow the pins 156 and 157 to pass therethrough when the front topmost copy-carrying member is raised to be transferred to rearmost position.

By referring to Figure 8 it is seen that these slots 304 and 305 allow the pins 156 and 157 to move in said slots while the uppermost copy-carrying member in the forward tier is being moved to top-most position over the rear tier of copy-carrying members.

Disposed centrally between the bars 300 and 301 is another vertically disposed bar 307 which has a plate 308 secured to the upper end thereof which is in the same horizontal plane as plates 302 and 303. This guides the leading edge of the control sheet being inserted into the apparatus for scanning as the control sheet moves along the upper surface of plate 302, 303 and 308.

In order to assist in guiding the control sheet to be inserted into the carriage mechanism there is provided on the right hand-side of the control sheet a plate 309 (Figures 2, 8 and 13). It is seen that plate 309 projects upwardly and rearwardly and is secured to bar 310 mounted on top of members 20 and 21. Another bar 311 similar to bar 310 also spans the top of the machine transversely thereof, and is also secured to blocks 20 and 21, as shown in Figure 2.

The central portion of the control sheet is guided by a plate supported by arm 312 and 313 which likewise projects rearwardly and upwardly and is secured to bar 310 as is shown in Figures 2 and 51.

Plate 309 also has an elongated slot 314 therein to permit the upper end of the pin 156 to have movement therein. It will be observed that this slot 314 has its right-hand edge beveled so as to insure proper alinement of the copy as it moves into the carriage mechanism of the machine. A suitable top guide plate 280 is secured to the lower side of brackets 372 and 373 to be later described and a bottom guide 280a is supported by brackets 280b and 280c. These plates guide the control sheet through the rear of the machine after said sheet has been scanned.

In Figure 9 the carriage mechanism is shown in returned position ready for the scanning of the line. In fact in all of the views except Figures 42 and 43, the carriage and other parts associated therewith are shown in a position they will occupy when the carriage is returned.

Now let us assume that in Figure 9 that the line should be scanned by the apparatus and in which event the carriage of course would be moved to the left in Figure 9. It is observed that a plate 315 is secured to the inner carriage frame 58 and this plate 315 has a roller 316 mounted thereon. Secured to the plate 315 is a connecting rod 317 which is connected to a piston 318 in a barrel 319, the piston and barrel being a conventional dash-pot arrangement. This barrel may have a suitable hole 320 therein to serve as a leak to permit the carriage to be returned but preventing shock thereto on account of being returned too fast. This is usually an adjustable needle valve arrangement by which the speed of leaking of the air from the dash pot as the carriage is returned can be regulated.

Now if the carriage mechanism as shown in Figure 9 should be moved all the way to the left, which position it will occupy when the line has been scanned, and before the control sheet has been moved to new line position, then it is evident that the roller 316 will be in close proximity to a roller 321 mounted on cam 322 fixed on a shaft 323. The roller 321 will be in close proximity to plate 315 whereas roller 316 will be in close proximity to the cavity portion of cam 322 appearing immediately beneath roller 321. Shaft 323 is mounted for rotation in arms 324 and 325 extending from intermediate bracket 53. This shaft 323 has fixed thereon a beveled gear 326 which meshes with another bevel gear 327 on carriage return shaft 50.

*Carriage return*

It has been previously explained how carriage return shaft 50 is driven by idler clutch-faced pinion 49, (see Figure 6A) engaging clutch face 54 mounted on the shaft 50. The carriage return shaft 50 makes one complete revolution and then is automatically thrown into disconnected position from the motive power of the machine by the apparatus shown in Figure 38. Here it is seen that clutch face 54 has a beveled arm 328 which upon making a complete revolution engages the upper end of a lever 329, pivoted as at 330 and under tension of spring 331 which automatically disengages clutch face 54 from the clutch face on pinion 49.

The lever 329 being held against movement by dog 332 therefore moves clutch face 54 out of engagement with the clutch face on pinion 49. Dog 332 is normally pressed upwardly by means of a compression spring 333 resting on a bracket 334 and pressing against the lower side of dog 332. During the first half revolution of carriage return shaft 50 the carriage is moved to the position shown in Figure 9, which is return position. During the second half of rotation the circular face of cam 322 is bearing against roller 316 until the cam assumes the position shown in Figure 9. This latter half revolution insures the holding of the carriage in a fixed position while the new control sheet is being moved thereinto to be engaged by the pins 79 and 85. When the parts have been moved to the position shown in Figure 9, then the carriage assumes a position ready for the scanning of the first character at which point the dog 131 will be engaging a tooth of ratchet wheel 120 as shown in Figure 43.

While the shaft 323 is rotating and cam 322 is moving the carriage to returned position, means have been employed to prevent any accidental escapement of the carriage mechanism while it is being returned. By observing Figure 10 it is seen that shaft 323 has a cam 323a thereon which has a low place therein into which a roller on bell crank lever 323b is adapted to normally rest.

Said roller is caused to follow cam 323a by means of a tension spring 323c and said bell crank is pivoted as at 323d and has its lower end pivotally connected to a link 323e whose other end is slotted as at 323f to be penetrated by a pin 323g in lever 123 which has already been described in connection with the ratcheting mechanism.

It is therefore seen that with the parts in the position shown in Figure 10 that the ratcheting mechanism for the carriage will not be interfered with by the link 323*f* on account of slot 323*f*, but when the carriage return shaft is moved for a complete revolution, the roller on one end of bell crank 323*e* will ride out of its cavity and onto the high portion of cam 323*a* which will move the upper end of lever 323 to the right in Figure 10 or toward the left of the machine which will hold the ratcheting mechanism in an inoperative position because the roller on lever 123 is held out of contact with barrel cam 125 on main drive shaft 44 and therefore the ratcheting mechanism for the carriage cannot be operated during the return of the carriage to starting position.

*Scanning operation*

The carriage is now in position ready for the first scanning operation. Let us assume that the above described returning operation of the carriage takes place and the scanning operation for the first and subsequent characters begins. In this position the scanning beam of light is resting on cell control number 1 disposed below a character. By observing Figure 20 it is seen that when roller 61 moves into cavity 62*a* the carriage will be oscillated to cause the scanning beam to impinge on cell control number 2 in Figure 74. Further movement of the shaft 44 will cause the roller to rest in cavity 62*b* and the scanning beam will impinge upon cell control 3. While the roller 61 is travelling along portion 62*c* of cam 62 the escapement mechanism shown in Figures 42 and 43 and previously described, will be operated by a reversal of positions of the dogs 131 and 134 and the carriage will move a half space and by the time this movement has taken place roller 61 will rest in cavity 62*d* and cell number 4 will be scanned as the carriage will start rocking in a reverse direction. Further rocking movement of the carriage is caused by roller 61 occupying cavity 62*e* which will scan cell control 5 and while it is moving along the upper right-hand surface of cam 62 in Figure 20 the lower cell control number 6 will be scanned. This represents a complete cycle of scanning of a cell control and this is continued throughout the line until a blank space is scanned at which time a certain set-up in the selector mechanism to be later described, will cause the carriage return mechanism to be operated.

The scanning beam of light can assume various forms and in certain of my co-pending applications penetrates the control sheet or is prevented from penetrating on account of the cell control, but in the present instance attention is directed to Figure 9, in which a housing 335 is secured on bar 310, said housing having a partition 335*a* forming compartments 335*b* and 335*c*.

Barrel 337 has a focusing lens 338, (Figure 37) therein said barrel being mounted in partition 335*a*. Housing 335 has an opening or window 339 therein through which a beam of light emanating from source of light 340 and passing through lens 338 will be impinged on a cell control and will be absorbed if shaded or will be reflected if unshaded, or in case of being reflected it will impinge onto a photo-electric cell 341. The wiring diagram of the photo-electric cell and means controlled thereby will be later described.

Source of light 340, which in the present instance is an electric bulb, is disposed in compartment 335*c* which is enclosed in housing 335. Socket 343 holding bulb 340 is disposed on a bracket 344 within the housing and wires 345 and 346 are connected to the terminals of said socket, said wires and the wiring diagram associated therewith to be later described.

The top of compartment 335*c* has a plurality of ventilating openings 347 and the upper end of compartment 335*b* has an opening 348 which is covered by a lid 349 shown in open position in Figure 2. The opening 348 is normally closed by lid 349 but is provided so as to permit easy inspection of the functioning of the photo-electric cell 341 and to readily ascertain if cell controls on the control sheet are being properly alined with the beam of light for scanning the same. The front of the housing 335 is closed by means of a door 350 hinged as at 351 secured in closed position by any suitable means such as thumb nuts 352.

The scanning operation for the line after the carriage is returned as previously described, takes place and let us assume that this would be the next to the last line of cell controls on the control sheet. When the end of the line is reached and six blank cell controls are scanned, the carriage will be returned to starting position as previously described due to a certain set-up in the selector mechanism and controlling the carriage control mechanism which will be later described.

*Control record feed*

Now let us assume that a new control sheet is about to be inserted into the carriage mechanism. This movement is effected by the carriage return clutch being tripped and the carriage return shaft 50 beginning rotation in a counter-clockwise direction in Figure 20. It is noticed that carriage return shaft 50 has thereon a cam 353 having a cavity in one face thereof. It is seen that an arm 354 is fixed on lever 60 and has a roller in the end thereof adapted to follow cam 353 and while the carriage is being returned it is seen that the high portion of cam 353 will be holding the arm 354 and lever 60 in the position shown and therefore no oscillation of the carriage will take place due to the low places in cam 62. This stopping of oscillation of the carriage is necessary to insure proper alinement of the pins 79 and 85 with respect to the perforations in the marginal edges of the control sheet.

The means for moving the copy from off of the top rearmost copy carrying assembly comprises a cam 355, (Figure 45) mounted on carriage return shaft 50. It is seen that this cam has almost one-half thereof of a circular high side formation while the remaining portion of the cam forms a low side. This cam is adapted to be followed by a roller 356 in the lower end of lever 357 which lever is fixed onto a shaft 358 mounted for oscillation between the end plates 20 and 21. This shaft 358 has levers 360 and 361 (Figures 1 and 4) secured thereon which project forwardly and are secured at their forward ends in a pivotal manner to the upper ends of links 362 and 363. The lower ends of links 362 and 363 support shaft 209, the shaft 209 being pivotally supported in said link. Disposed on shaft 209 are the two spaced control sheet gripping arms 210 and 211 having the frictional elements 212 and 213 at the upper ends thereof. The shaft 209 projects past the links 352 and 353 which pivotally support said shaft 209 and the ends of the shaft have sliding movement in vertically disposed guides 364 and 365. The shaft 209 together with the control sheet gripping and feeding fingers carried thereby is normally pressed upwardly to engaging position with the control sheet by means of a tension spring 366 secured to shaft 209 and plate 308.

It is seen that as the carriage return shaft, as seen in Figure 45, rotates that lever 357 will, after short movement ride in to low side of cam 355 which will oscillate shaft 358, which will allow spring 366 through the links and levers previously described, to cause the roller 356 to follow cam 355, and said spring will raise the shaft 209 until the frictional elements 212 and 213 engage the lower surface of the control sheet for moving it into position where pins 79 and 85 of the carriage mechanism will engage the same, ready for scanning operation. When the fingers 210 and 211 are moved upwardly by tension spring 366 and are engaging the lower side of the control sheet they will press the upper surface of the control sheet against sliding bar 367 and also against curved plate 368, secured on the lower end of sliding bar 369 (Figures 2, 8, 20 and 30).

Bar 369 is slidably mounted in guides 370 and 371 secured to bracket 372 secured on the lower surfaces of bars 310 and 311 (Figure 20). Bar 367 is mounted for sliding movement on the lower surface of bracket 373 by means of guide plates 374 and 375. Slide bars 367 and 369 have pins 376 and 377 which are engaged by the lower forked ends of levers 380 and 381 fixedly secured on a shaft 382 mounted for oscillation between brackets 384 and 385, (Figure 2) projecting from the rear face of bar 311. Shaft 382 has fixed thereon, see Figure 55, a lever 386 which has secured thereto in a pivotal manner one end of link 387 which projects downwardly and forwardly and has its other end pivotally connected to a lever 388 fixed on shaft 389 (see also Figure 49). The shaft 389 is mounted for oscillation between wall 21 and bracket 53 projects some distance beyond bracket 53.

By referring to Figures 6, 43 and 49 it is seen that carriage return shaft 50 has a cam 390 thereon which is followed by a roller 391 in the end of a lever 392 which is fixed on shaft 389. By referring to Figure 49 it is seen that shaft 50 turns in a counterclockwise direction and therefore oscillates arm 392 in the same manner. This movement causes lever 388 to move in a clockwise direction in Figure 55. This causes the parts to assume the position shown in Figures 52 and 54, by having placed the control sheet in position for scanning and therefore allows only limited swinging movement to the copy feeding means and thus feeds the control sheet only one line at a time. The position of parts represents the position occupied by the shifting parts during the scanning of all of the lines except the last line.

Now when the control sheet is shifted to the last line on the control sheet then the control sheet no longer covers a slot 405 in table top 71 and also a slot 406 in bracket 308 and the feeling finger 404 assumes the position shown in Figure 53. This causes a positioning of the parts as shown in Figure 51 and this allows spring 407 to oscillate shaft 382 a much greater degree upon the next shift of the control sheet which movement is finally stopped by set screw 408 in arm 409 striking against a plate 409a secured on bar 311. Arm 409 is fixedly secured on the shaft 382. This places the copy moving device in its most forward position ready to be operated to a much greater degree upon the next line shift of the control sheet which operates simultaneously with the carriage return.

The position of the parts just described allows link 218 in Figure 13 to assume the position there shown which allows bell crank lever 221 to engage the end of link 218 upon the next carriage return movement. This effects a feeding of new copy to the carriage mechanism as has been previously described. When this last line has been scanned on the control sheet already in the carriage mechanism the parts as above described and positioned in their upmost throw as to paper feeding are operated and these parts engage the leading edge of the new control sheet and thus causes the position of the paper feed fingers which are engaging the leading edge of the copy already inserted, to move the new control sheet into the apparatus and the leading edge of the new control sheet will push the control sheet already scanned out of the carriage mechanism. By observing Figure 48 it is seen that carriage return shaft 50 has a cam 410 thereon which engages a roller on the free end of lever 411 which is fixed on shaft 412 said shaft being mounted for oscillation in end plate 21 and through intermediate bracket 53, see Figure 6.

By referring to Figures 1 and 55, it is seen that shaft 412 has a lever, (Figure 55) 414, fixedly secured thereon to the free end of which is pivotally connected a link 415 which projects upwardly and is connected near the top of the machine to a lever 416 fixed on shaft 417 which is mounted for oscillation in brackets 418 and 419 secured on top of end plates 20 and 21.

Shaft 417, it will be noticed in Figures 2 and 10 has secured thereon levers 420 and 421 and upon the control sheet being made ready to be shifted to new line position these levers 420 and 421 engage the fingers 104 and 105 previously described, and relieves pressure on the control sheet so that it can be moved in the carriage mechanism to the new line position, or to be expelled from the carriage mechanism when a new control sheet is being fed thereto.

The roller on the free end of lever 411 (Figure 48) is caused to follow cam 410 on carriage return shaft 50 by means of tension spring 422, (see Figure 55).

Rotation of shaft 50 as seen in Figures 49 and 55 will cause lever 388 to move in a clockwise direction which will cause lever 386 and shaft 382 to move in a counterclockwise direction. This will cause clockwise rotation of shaft 382 in Figure 20 which will cause the lower ends of levers 380 and 381 to move rearwardly in the machine and will move the control sheet assisted by the gripping friction members 212 and 213 in the upper ends of arms 210 and 211, the arms 210 and 211 being operated simultaneously by other means connected to shaft 382. Shaft 209 has fixedly secured thereto a lever 393, the upper end of which is pivotally connected to a link 394 to which link 181 is pivotally secured and which has been described.

Link 394 is pivotally secured to lever 395 which is fixed on shaft 382. It is therefore seen that cam 390 in moving the sliding bars 367 and 369 at the same time moves the copy feeding arms 210 and 211 in timed relation thereto thus gripping and moving the control sheet into position to a point where the pins 79 and 85 are allowed to enter the first set of perforations therein.

It is of course understood that during this moving of the control sheet into position that the pins 79 and 85 will be in lowered position to permit the control sheet to enter to a point so that when the pins are again raised they will enter the first set of perforations therein. This lowering operation has been described in conjunction with reference characters 91 and following.

The above described operation is what takes place when a new control sheet is moved into the carriage mechanism. While this operation is taking place the parts controlling this movement will occupy the position as shown in Figure 52. There it is seen that on shaft 382 there is a lever 396 mounted on the shaft by a set screw and is limited in its movement in one direction by means of another set screw 397 which is secured in a lever 398 fixed on shaft 382. It is there seen that the amount of oscillation of shaft 382 is limited by a dog 399 which is loosely mounted on shaft 400 which is pivotally mounted between brackets 372, and 373, (Figures 2, 20, 30 and 51).

Mounted on shaft 400 is a weight lever 402 which has a pin 403 projecting laterally therefrom adapted to rest on dog or tail member of arm 399 so that when the shaft 400 is oscillated the weight 402 will cause the dog or lever 399 to be moved with the shaft yet this construction permits manual movement of dog or lever 399 without moving shaft 400 or weight lever 402.

Shaft 400 has fixed thereon feeler arm 404 which in the position shown in Figure 54 is resting on a control sheet disposed in the carriage mechanism and being scanned. The member 404 assumes the position shown in Figure 53 during the scanning of the last line on the control sheet, which also allows the parts to assume the position shown in Figure 51.

*Means actuated by scanning*

In a conventional distributing apparatus such as shown in the patent to Rainey No. 1,311,915 of August 5, 1919, an impulse is generated which is transmitted to the transmitter which operates from the perforations in the conventional tape transmitter. This impulse in the present apparatus is employed for actuating the main drive shaft 44 for one complete revolution, through wires 450 and 451 to a magnet coil 452 as will be observed in Figure 72.

For convenience sake, an insulating panel 504 is mounted on the exterior of the left-hand end 11 of the machine and to which all of the wires of the machine are led.

Instead of the wires 450 and 451 leading directly from the distributor 453 to the magnet 452 they pass to post 450a and 451a on the panel 504 and from the other end of these posts wires 450b and 451b lead to the magnets 452. By observing Figures 12, 30 and 67, this magnet appears as a twin coil.

The distributor shown in Figure 70 is designated by reference character 453. This twin coil 452 is mounted on a suitable bracket 454 fixedly secured to the lower edge of rib 15 of the frame of the machine. When magnet 452 is energized by an impulse it actuates a latch arm 455 which has a soft iron plate 456 secured to one end thereof to aid in its operation. The arm 455 is pivotally secured on stud shaft 457 fixed on the inside surface of the rear wall 12 of the frame of the machine. Arm 455 is normally held so that its iron plate 456 is removed from the core of magnets 452 by means of a tension spring 458. This holds the arm 455 in the position shown in Figure 67 so that its other end removed from the end on which plate 456 is mounted, is held in a position to restrict movement of lever arm 459. Lever arm 459 is pulled against lever arm 455 by means of a tension spring 460. Lever arm 459 is fixedly secured on shaft 461 mounted for oscillation between brackets 462 and 463 and extends longitudinally of the machine.

The downward movement of latch arm 455 is restricted by an extended finger 464 as will appear in Figures 12, 30 and 67 and which finger is secured to the portion 12 of the frame of the machine. When the advancing impulse is transmitted by the distributor 453 to the magnet 452 (Figure 67) these magnets are energized to release lever arm 459 to allow shaft 461 to slightly rotate under influence of spring 460 as previously described.

By observing Figures 11, 12, and 21 it will be seen that shaft 461 has secured thereon a lever 465 which has pivotally secured to its lower end a link 466, which link is pivotally connected at its end to the lower end of a lever arm 469 which is fixed on a shaft 470 which is mounted for oscillation as well as endwise movement in projections 471 and 472 depending from top plate 14 of the frame.

It will be seen that shaft 470 has fixed thereon an arm 473 which upon oscillation of shaft 470 will engage an arm 474 fixed on shaft 415 mounted for oscilaltion in brackets 476 and 477 projecting from the inner surface of sidewall 10 of the machine. It will be observed in Figure 40 that arm 474 is normally pressed upwardly by means of a compression spring 478 mounted on spring perch 479. This causes the arm 474 to engage the lower end of a lever 480 passing through a hole in the top plate 14 and being pivoted as at 481. The upper end of lever 480 is adapted to be pressed against the end of a projection 482 fixed on slide 483 by means of a tension spring 484.

Slide 483 is mounted for sliding movement in plate bracket 485 by means of small strips 486 and 487. The right-hand end of slide 483 as seen in Figure 40 or the left-hand end as seen in Figure 6A has a cam face 488 projecting rearwardly therefrom which is adapted to be engaged by a projection 489 fixed on clutch face member 45. It is seen that spring 45a previously described, normally presses the clutch face member 45 into engagement with clutch face 43.

The pressure of this spring is greater than the counter-acting force of spring 484 and therefore when shaft 470 is oscillated to move dog 474 downwardly it will allow clockwise movement of arm 480 (Figure 40) under the superior strength of spring 45a and therefore when arm on the slide 483 is allowed to move under tension of spring 45a it will allow the clutch face 45 to engage clutch face 43 and on account of spring 45a overcoming the resistance of spring 484 through the projection 488 engaging cam face 489 being relieved, then spring 484 will return the lever 480 to the position shown in Figure 40 and the parts will be latched in position due to the pressure of spring 478. This will lock the slide 483 in the position in Figure 40 so that, when the shaft 44 approaches a complete revolution, the projection 489 will ride behind the projection 488 and withdraw the clutch face 45 from engagement with clutch face 43 and stop rotation of shaft 44.

During the above described rotation of shaft 44 it is seen that barrel cam 490 on shaft 44 will engage a roller on the upper end of lever 491 and will move shaft 461 to its original position and will cause the lever 459 to be in the position shown in Figure 67 at which point tension spring 75

458 will move the end of lever 455 in front of it to latch it in position.

It is thus seen that this moves lever 473 in Figure 40 in a clockwise direction and relieves pressure of lever 473 on dog 474 to allow spring 478 to latch lever 480 in the position shown in Figure 40 and the parts are then in normal position ready for the next impulse to be transmitted to start shaft 44 into another rotation for the scanning of another set of cell controls for a character.

It will be noted by referring to Figure 21 that shaft 461 has fixed thereon an upwardly projecting lever 467. This lever has mounted in the upper end thereof a suitable roller which is adapted to contact a barrel cam 468 mounted on automatic shift shaft 31. When shaft 31 rotates the high side of the cam contacts the roller on the lever 467 and latch lever 455 is caused to be latched again and the parts will assume the position as shown in Figure 67. The operation and action of shaft 31 will be described later.

*First selector*

It will be observed in Figures 6A, 10, 11 and 22 that main drive shaft 44 has secured thereon what I term a first selector. This first selector comprises spaced disks 492 and 493 fixed on drive shaft 44. These disks have seven sets of coinciding holes therein, in six of which sets of holes sliding selector rods A1, A2, A3, A4, A5, and A6 are mounted for sliding movement.

There is fixed in the seventh set of holes a rod or shaft 494. Each one of the sliding rods A1 to A6 inclusive, has fixed thereon dogs B1 to B6 inclusive which dogs at near their other end has a hole therethrough which is slidably penetrated by fixed shaft 494 so that dogs B1 to B6 inclusive have sliding movement on shaft 494. The holes in disk 493 which slidably receive the sliding selector rods A1 to A6 inclusive, are traversed by radially disposed holes 495 and as will be observed in Figure 29A. It is seen that these radial holes 495 extending to the shaft 44 and before the rods A1 to A6 inclusive are installed a compression spring 496 is deposited in each one of these radially disposed holes 495 and is compressed and confined in position by the respective sliding rods and shafts 44.

Between the outer end of each spring and its respective sliding rod, there is disposed a ball 497. By this arrngement friction is applied to the sliding rods, although allowing movement of the rods in setting up a combination as a result of impulses and through mechanism to be presently described. The springs will hold these rods in whatever position they are moved, whether it be in normal position or in selecting position. This selector is similar to the selector shown and described in my copending patent applications Ser. Nos. 517,171, and 688,753.

The first selector rods are adapted to be selectively positioned by means of the scanning mechanism comprising photo-electric cell 341 and associated parts as has previously been described and as shown in Figure 37. It has previously been stated that in scanning a character such as shown in Figure 74 that a light cell control will serve to reflect light onto the photo-electric cell whereas a shaded cell control will not reflect the light onto the photo-electric cell.

It is evident that the photo-eletric cell can be employed in two ways, that is, to actuate mechanism on the failure of reflected light to strike it from the control sheet in the instance of a colored cell control or to operate in reverse order on light being reflected onto a cell control. In the present instance the failure or reflected light to impinge upon the photo-electric cell on account of a dark cell being scanned will result in the moving of a selector rod in the first selector through the reverse arrangement is equally effective.

It is to be noted that while the carriage mechanism which has been previously described, is being oscillated in one direction that the scanning beam from source of light 340 moves successively over cell controls 1, 2 and 3 in Figure 74.

It has also been pointed out how when the carriage mechanism has been oscillated in one direction that it is allowed to move one-half letter space by the peculiar combination and dog arrangements as shown in Figures 42 and 43. When the carriage has been allowed to move a one-half space it then oscillates back to original position at which time the scanning beam traverses cell controls 4, 5 and 6, completing the scanning of that character, at which time the escapement mechanism operates to move the carriage mechanism another half space for another complete oscillation, at which time the above described operation is repeated. Now it wil lbe observed in Figures 2, 10 and 71 that wires 498 and 499 pass through photo-electric cell 341 and are connected to a conventional amplifier 500 and emanating from amplifier 500 is a circuit comprising wires 501 and 502. These wires pass to posts 501a and 502a on panel 504 and thence to magnet 503 through wires 501b and 502b and lead through twin magnets 503 mounted on rib 15 as shown in Figures 10 and 12.

When the light beam in the scanning mechanism strikes an unshaded portion in a code character there will be an impulse transmitted to twin magnets 503 and energize the same. This will draw against the cores of the magnets a soft iron bar 505 which is fixed a lever 506 secured on a shaft 507 mounted for oscillation in the ends of a U-shaped bracket 508.

An L-shaped bracket 509 is secured to the lower surface of U-shaped bracket 508 (Figure 10) and its downwardly projecting leg has a set screw 510 therein limiting outward movement of lever 506 as lever 506 and plate 505 are normally pulled away from the magnet cores by means of a tension spring 511. Secured on shaft 507 is bell crank lever 512 which has projecting from one arm thereof a lateral projection 513 and the other leg of the bell crank lever has secured thereto a tension spring 514 which has its other end secured to a lever 515, loosely secured on shaft 507. This arrangement permits the tension spring 514 to move lever 515 downwardly out of the way of the lower end of a cam lever 516 when the magnets 503 are energized.

This tension spring arrangement also serves the purpose of preventing a succeeding impulse from unlatching cam lever 516 while it is moving a selector rod. It will be observed that cam 62 has the peculiar low places 62a to 62e which allow a slight dwell of the scanning beam on each cell control. Now if one cell control is shaded and cam lever 516 is locked in position by means of lever 515 it will move a selector rod in the first selector.

It is also evident that a new cell control is being scanned while the cam lever is still in engagement with the end of a selector rod, but the scanning beam remains on the following cell control until after the first selector rod, for example, has passed the cam end of the cam lever 516. Therefore, were it not for the spring tension arrangement and if the first cell control for example, were shaded and the second cell control were unshaded, then it is evident that upon the starting of the scanning of the second cell control that lever 515 would be pulled out of the path of the end of cam lever 516 and the first selector rod would not be moved completely. Now it is evident that this tension arrangement allows following unshaded cell control to energize the magnets 503 and to exert a pull on the lever 515, but not enough to move it while cam lever 516 is engaging the selector rod it is actuating but when the moved selector rod has passed the end of the cam lever 516 the scanning beam will still be on the second cell control for example and then the lever 515 will be pulled from the path of cam lever 516 so its cam end will not move the next selector rod as it will not be locked in position. It is thus seen that if this tension spring arrangement were not present that a cell control could undo the planned purpose of the preceding cell control.

Cam lever 516 is pivotally secured intermediate its ends as at 517 and a tension spring 518 normally moves the upper end of the lever toward the selector rods A1 to 6A inclusive so that when magnets 503 are not energized by an impulse from the scanning operation the lever 515 will assume the position shown in Figure 10 and will latch the cam lever in position so that as the pin barrel or first selector is rotated the next succeeding rod which is passed thereby, will be moved by the upper end of cam lever 516. In case the magnets 503 receive an impulse from the scanning mechanism on account of the scanning beam passing over an unshaded cell control on the code character the lever 515 will be moved downwardly out of engagement with cam lever 516 and due to the frictional arrangement shown in Figure 29A and previously described the friction imparted to the sliding rod overcomes the pressure of tension spring 518 and the cam lever 516 will not move a selector rod moved past its cam end. In the drawings showing the first selector, the sliding rods and their associated parts are all shown in actuated or moved position (Figure 11) which represents a blot-out set up in the first selector.

In other words, this means that the mechanism has just finished scanning a code character in which all cell controls were shaded resulting in magnets 503 receiving no impulses during the scanning of six cell controls for the code character thus leaving the parts in latched position as shown in Figure 10 which caused the cam lever 516 to engage and move all of the sliding rods A1 to A6 inclusive to the position shown in Figure 11.

During each complete revolution of first selector certain ones of the sliding rods A1 to A6 inclusive, are selectively moved by selective impulses except upon the scanning of a blank portion on the control sheet and as the first selector rotates in the direction shown by the arrow in Figure 11, the dogs B1 to B6 inclusive, will all at one time selectively engage certain of the second selector bars to be presently described, and before a moved selector rod again reaches a position to be engaged by cam lever 516 it will pass by a cam surface 519 on cam disk 520 (Figures 28 and 29) which will move the selector rods successively back to position where they will be engaged by the end of cam lever 516. This permits the setting up of a new selection while the selection previously made is being transmitted through the second selector bars. Cam disk 520 is loosely mounted on shaft 44 and has a projection 521 having an arcuate slot 522 therein penetrated by a set screw 523 whereby the position of the cam 519 can be adjusted to cause the return of the selector rods to normal position at the proper point.

During a selection all six selector rods are passed by the end of cam lever 516 and upon the passing of the sixth selector rod the fixed rod 494 is then immediately brought opposite the end of the second selector bars to move all of them, or whichever ones corresponding to the first selector bars are selected for movement by a corresponding movement of the first selector bar.

It should be noted by observing Figures 10, 74, and 22 to 28 inclusive, that when the beam of light scans cell control number 1, as shown in Figure 74, that the selector bar A1 is about to pass beneath the upper end of cam lever 516. Likewise as the beam of light is scanning the cell controls 2 and 6 inclusive in Figure 74, the selectors A2 and A6 inclusive are about to pass beneath the upper end of cam lever 516. It is therefore seen that the first selector is driven in timed relation to the scanning means of the apparatus. The successive rotations of the first selector sets up successive combinations for transmission to the second selector.

It is evident that during a complete rotation of the first selector, that a complete character will be scanned as previously described in connection with cam 62 as shown in Figure 20.

The first selector is a rotary member and has already been described and in which the sliding rods A1 to A6 are mounted. It has also been described as to how the dogs B1 to B6 inclusive operate the second selector bars.

*Second selector*

The second selector mechanism comprises a bracket 535 which has a downturned end portion for securing the same to the center rib 15 of the framework of the machine. This bracket 535 with its downturned portion 536 is shown in Figures 11 and 22. The horizontal portion 535 has fixed parallel grooves therein in which are slidably mounted the second selector bars C1, C2, C3, C4, C5 and C6. It might here be remarked that the suffix number to the first selector bars A1 to A6 and the dogs B1 to B6 as well as to the second selector bars C1 to C6 indicate the cell control which operates upon that particular bar or dog. For example, A5 or B5 or C5 are the parts controlled by cell control 5 of a code character. The second selector bars C1 to C6 inclusive are disposed longitudinally of the machine and it will be observed that when a first selector bar is not moved by an impulse that its dog is in a vertical plane to the right from the vertical plane occupied by its associated second selector bar, but when the sliding rod in the first selector is moved by the impulse from the scanning operation it occupies the same vertical plane as the second selector bar with which it is associated and therefore pushes the second selector bar backwardly in the machine against the tension of its spring 537. Each second selector bar C1 to C6 inclusive, has a separate tension spring 537 but a like reference character is used to indicate all of the springs.

Each of these second selector bars C1 to C6 inclusive, on its lower edge and near the front portion thereof, has a downwardly projecting portion 538 to limit its backward movement in the machine.

The second selector bars C1 to C6 inclusive, are slidably confined in their respective grooves by means of straps 539 and 540. Each of the second selector bars C1 to C6 inclusive, has on its upper edge a projection 541, a like reference character being used to indicate all of said projections on all of said second selector bars but it is evident that the projection on each bar will be disposed at a different point as the projection on one bar will be disposed beneath one of the transversely disposed third selector bars to be presently described, so that each third selector bar will have a projection resting thereunder when its associated second selector bar is not actuated by the first selector.

Third selector

The third selector or D-bars comprises six bars and are mounted for sliding movement transversely of the machine, and the six D bars or third selector bars, bear reference characters D1, D2, D3, D4, D5 and D6, each of these D-bars having a projection 542 on its lower edge and disposed at a different point on each bar for cooperation with the projection 541 on its associated second selector bar.

These third selector bars are mounted for sliding movement in the three ribs 16, 17 and 18 and are confined (Figures 6 and 6A) in their sliding movement by straps 544, 545 and 546. These third selector bars D1 to D6 inclusive, are each normally moved towards the left-hand side of the machine by a tension spring 547 being secured at one end to a third selector bar and at its other end to a spring perch 548, there being a spring 547 for each of the third selector bars but a like reference character is given to all of these springs.

These springs actuate which ever of these six bars as may be permitted lateral movement by the movement of one or more of the second selector bars C1 to C6 inclusive. Each of the third selector bars D1 to D6 inclusive has a projection 549 disposed on the lower edge thereof, this projection being at the same position on all six of the third selector bars. When these third selector bars are all in re-set position and before any of them are allowed to move to the left as a result of a selection being set up, these projections 549 rest against a plate 550 which is secured on a link 551 as seen in Figures 11 and 68, which link is pivoted as at 552 on the upper end of a link 553 which is pivoted at its lower end as at 554.

The link 553 is normally pulled to the left-hand side of the machine by means of tension spring 555. In order for the plate 550 to follow the projections 549 as the third selector bars move to the left of the machine it is necessary that some means must be provided to prevent plate 550 from travelling in the arc of a circle and therefore a tension spring 556 connects link 553 and the rear end of link 551 to permit link 550 to follow projections 549.

The upper end of link 553 is forked, having a pair of projections thereon, and the purpose of this is to prevent certain of the fourth selector bars from dropping upon the scanning of a blot-out character which prevents the operation of the automatic shift to be later described.

In case of a blot-out signal being set up which will allow all six of the third selector bars to move to the left, and allow spring 555 to pull lever 553 to the left, it is not practical to have the automatic shift character to operate upon a blot-out signal being transmitted, and therefore the upper ends of link 553 will be moved beneath the two bars representing the automatic shift and prevent their being lowered to a point where they can be engaged by the striking bail to be moved to operating position. This prevents the automatic shift from operating at the sending of a blot-out impulse.

The parts in Figures 32 and 34 show the position they are in when the blot-out signal has been transmitted by the scanning apparatus. Here it is seen that the left-hand end of the third selector bars have projections 572 on the lower side thereof which rest against a plate 557 fixed on a hub 558 secured on oscillating shaft 559 disposed between projections 560 and 561. The plate 557 is normally moved towards the left-hand end of the machine by means of a tension spring 562 and also by the combined pressure of all springs 547 which have been selected and which are impelling their respective third selector bars to the left-hand side of the machine. This plate 557 is limited in its movement by a set screw 563. Movement of plate 557 along with the third selector bars to the left in the machine is controlled by a cam 564 mounted on shaft 44 which is adapted to be followed by a roller in the end of lever 565 fixed on oscillating shaft 559.

On the lower edge of each of the third selector bars D1 to D5 inclusive, is a projection 567, which is adapted to engage swinging leaf 568 pivoted on stud shaft 569. Bar D6 has no projection thereon for engagement with this leaf 568. The purpose of these projections 567 is that when any of the bars bearing the projections 567 are allowed to move to the left in the machine upon a selection being made, this will move the swinging leaf 568 which in turn will move a bar 570 of the third selector, on account of this bar having a downwardly projecting portion 571 whose length corresponds to the distance between swinging leaf 568 and plate 557. This seventh bar 570 is not actuated by impulses passing into the first selector but is actuated by bars D1 to D5 of the third selector and controls the actuation of the automatic shift mechanism to be later described.

Fourth selector

The upper edges of the third selector bars D1 to D6 inclusive have selectively positioned notches throughout their length in a manner shown in Figure 34. These notches are formed by upwardly extending projections and are so disposed as to provide the proper amount of permutations in the selecting mechanism. Adapted to cooperate with these third selector bars are a plurality of fourth selector bars 573, this reference character indicating all of the selector bars except a few special ones which will be given reference character 573 with a suffix added thereto. These special bars comprise bars such as the blot-out bar and the bars associated with the automatic shifting mechanism, said special bars to be later described.

All of these fourth selector bars 573 and the special bars corresponding in length and position to the bars 573 are mounted for sliding movement in combs 575, 576 and 577. The combs 575 are mounted in a suitable manner between ribs 16, 17 and 18. Combs 576 and 577 are mounted on each side of a bar 578 which bar has rib 579 on its upper side extending throughout its length to limit the movement of the fourth selector bars.

Mounted on the upper edges of ribs 16, 17 and 18 is a bar 580 having a hole therein for each of the four selector bars and in this hole is adapted to be mounted a compression spring 581 forcing a plunger 582 downwardly to exert pressure on the fourth selector bars to hold said bars in whatever position they may be placed as said bars have no normal position to which they tend to return.

The fourth selector bars are normally held in elevated position to allow free lateral movement of the third selector bars by means of a lifting bail 583 which is mounted on pins 584 and 585, mounted for vertical sliding movement in slide blocks 586 and 587 at each end of the machine (Figures 13, 14, 33 and 36). Tension springs 588 and 599 normally pull this lifting bail downwardly.

After the third selector bars have been selectively positioned the cams 590 and 591 will have moved to allow levers 592 and 593 to permit lowering of the pins and therefore to permit lowering of the lifting bail to allow the fourth selector bars to be lowered onto the third selector bars. This lowering movement, on account of, the set-up of the permutations in the third selector bars will allow one of the fourth selector bars to move downwardly into coinciding notches in the top of the third selector bars to a point where it will be engaged by a striking bail 594 mounted in slots 595 and 596 and is normally pulled away from engagement with the fourth selector bar by means of tension springs 598 and 599.

The striking bail is moved into an engaging position by means of cams 600 and 601 engaging levers 602 and 603 mounted on stud bolts 604 and 605, the cams 600 and 601 being fixed on main drive shaft 44.

In order to prevent a selection and actuation of a fourth selector bar during the carriage return movement, it will be noted that carriage return shaft 50 in Figure 30 has a cam 607 thereon, which is adapted to move bell crank lever 608 which is pivoted intermediate its ends as at 609, and is caused to follow cam 607 by means of tension spring 608a. This lever 608 has a link 610 secured to its other end, said link having a slot 611 therein penetrated by a pin 612 on lever 613 mounted on shaft 614 extending traversely of the machine and on which are mounted the dogs 615 and 616, so that when the high place of cam 607 is engaging the end of lever 608 the upper ends of dogs 615 and 616 will be disposed beneath the lifting bail 583 and prevent the same from being lowered and therefore preventing a selection from being passed through the fourth selector.

The link 610 has a tension spring 617 secured near the end thereof and whose other end is secured to pin 612 which allows a resilient connection between link 610 and lever 613 so that in the event that lifting bail 583 should be in lowered position when the cam 607 had its high place come into engagement with lever 608 there would be no damage done to the parts.

The striking bail 594 when operated by cams 600 and 601 to operate levers 602 and 603 moves whatever fourth selector bar that has been lowered to a rearward position in the machine.

Before any of the fourth selector bars are moved toward the rear of the machine it should be explained that immediately when the main drive shaft 44 begins to turn in the selection of a character, the actuated fourth selector bar for the previous selection will be returned to normal position before the above described striking bail operation takes place. This return movement is effected by means of a cam 618, see Figures 5 and 30, which cam engages the upper end of a lever 619 pivoted intermediate its ends as at 619a, and to the lower end of which is pivotally connected a link 620, said link extending rearwardly and being pivotally connected to the lower end of a lever 621.

A tension spring 622 normally holds the parts in the position shown in Figure 30 and causes the roller on the upper end of lever 619 to follow cam 618. Lever 621 is fixed on a shaft 623 mounted for oscillation between the two end ribs 16 and 18. This shaft 623 has mounted thereon arms 624 and 625 on the upper end of which is mounted a striking bail 626. On the other half of the shaft there are arms 628 and 629 on the upper end of which is mounted another striking bail 630.

The reason for two striking bails in the same plane is to avoid the middle rib 17 of the machine as there are no fourth selector bars positioned where this rib is positioned, but of course it is evident that the structure of the machine could be changed to eliminate the ribs and therefore have one striking bail extending entirely across the machine.

*Fifth selector*

The rear upper edges of the fourth selector bars 573 have a plurality of projections extending upwardly therefrom and forming a plurality of notches therebetween, there being a maximum of five projections on one of the bars forming four slots and the remainder of the bars have less than five projections. These projections cooperate with the fifth selector bars 635, 636, 637, 638 and 639. Mounted for sliding movement immediately above bar 637 is a sliding shaft 640, the operation of which will be later described.

The bars 635 to 639 inclusive as well as shaft 640 are mounted on the top edge of ribs 16, 17, 18, and are confined for sliding movement in said position by inverted comb-like members 641, 642 and 643.

Each of these bars 635 to 639 inclusive has a projection 644 which is engaged by one end of tension spring 644a and other end of which tension spring is secured to the top edge of comb member 642, there being a tension spring 644a for each one of the bars 635 to 639 inclusive. The purpose of this spring is to normally tend to move the bars 635 to 639 to the left-hand side of the machine or to the right in Figure 5. All of these bars 635 to 639 inclusive near their left-hand end or their right-hand end as seen in Figure 5, have a projection 645 for limiting the movement to the left of these bars. The lower edge of each of the bars 635 to 639 inclusive, is notched, there being a notch in each bar, for each one of the fourth selector bars 573, and bar 635 as shown in Figure 5 is typical as to the structure of the lower edge of all of the bars.

The lower right-hand edge of all of the bars 635 to 639 inclusive (Figure 5) has a cutaway portion forming a cavity in the end of the bars which is engaged by a lever 646 pivoted at 647 which has a tension spring 648 for causing the other end of the lever 646 to follow a barrel cam 649 secured on main drive shaft 44. In the position shown in Figures 5 and 6, the bars 635 to 639 inclusive, are shown in normal operated position as the selected ones of these bars is allowed to move to the left in Figure 6, only when the roller in the forward end of lever 646 engages the cavity in the barrel cam 649.

The lever 646 has a projection 650 near the forward inner end thereof which is adapted to engage lever 651 on shaft 652, the purpose of which will be later described in connection with the carriage return operation.

Rib 18 (Figures 5 and 7) has a projection 653 which has a plurality of vertically disposed slots therein in which is mounted a pivot shaft 654 on which is mounted for oscillation a plurality of contact levers 655 to 659 inclusive. It is to be noted in Figure 7 that contact lever 657 extends somewhat higher than the other contact levers and has a face thereon adapted to be engaged by the shaft 640 as well as by the selector bar 637.

Each of the contact levers 655 to 659 inclusive, has disposed there against one end of a compression spring 660 which is disposed in a bore in the projection 653, the tendency of said springs being to cause the upper ends of the contact levers to be moved into engagement with the bars 635 to 639 inclusive. Some method must be provided for latching the contact levers in position to open the circuit controlled thereby and which will be presently described.

Figure 7:
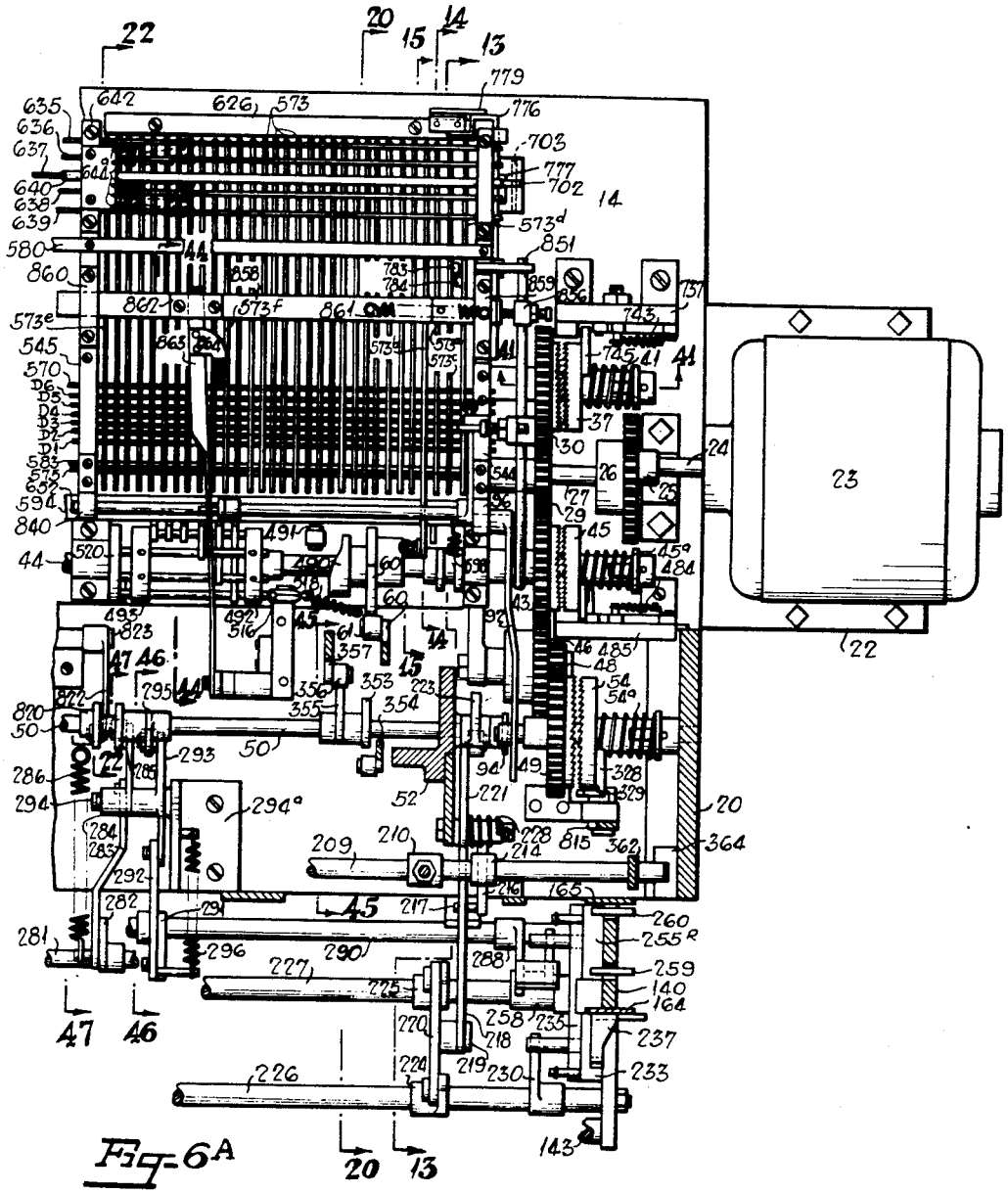
Figure 7 is an enlarged vertical sectional view taken along line 7—7 in Figure 1 and showing in section the mechanism shown at the right-hand end of Figure 5 and also showing in section the upper left-hand corner of Figure 6.

There is for each contact lever 655 to 659, a dog 661, pivoted as at 662, in a slot 663 (Figures 1 and 7) extending through the face of a bracket 664 and having its outer end normally pressed downwardly by means of a tension spring 665. The other end of each of these dogs 661 has a shoulder thereon adapted to engage the lower end of the contact latches or levers 655 to 659 inclusive, to hold them in latched position as shown in Figure 7. Figure 5 shows the above described mechanism in unlatched position.

During a revolution of the main drive shaft when one or more of the bars 655 to 659 inclusive is selected it moves the latches or levers 635 to 639 inclusive or any one of them to the position shown in Figure 7, where it is seen that tension spring 665 will automatically latch the levers or latches in the position shown in Figure 7. These latches or levers will be unlatched and caused to assume normal position on account of tension spring 660 by further movement of the main drive shaft 44 which will move the rear end of a lever 666 which passes over the inner ends of all of these latch dogs 661. This end of lever 666 is moved downwardly to release the lower ends of the contact latches 655 to 659, and allow them to move to normal position as shown in Figure 5. The lever 666 is pivoted as at 667 and has a roller in the end thereof which is caused to follow a cam 668 on main drive shaft 44 by means of a tension spring 669.

Mounted on top of block 664 is a bracket 670 which has secured thereon a bearing bar 671 having a plurality of holes therein and in each hole there is mounted a sliding pin 672, said pin being of insulating material. One end of the pin is adapted to be engaged by the latch levers 655 to 659 inclusive while the other end of these pins is adapted to engage the spring leaf contact 673 having a contact point 674 thereon away from contact point 675 on metallic bus bar 676 and thus open the circuit between the two contact points.

Metallic bus bar 676 is mounted on the outer side of bracket 670. The upper outer portion of bracket 670 has secured thereto a plurality of insulating blocks 677 between which are mounted in insulated position the upper ends of members 673 and 676. Suitable plates 678 and 679 are penetrated by screws 680a which also penetrate the insulation blocks 677 and enlarged holes in the contact members 673 and 676 to hold its parts in assembled position as shown in Figure 7. The lower end of contact member 676 is adapted to rest against an insulation bar 680 such as rubber. The upper ends of contact members 676 all connect to a common wire 681 which is led to contact post 682 on the insulated panel 504. Connected to the upper ends of contact members 673 and reading from the rear to the front, are wires 683, 684, 685, 686 and 687, said wires leading to contact post 688, 689, 690, 691 and 692 on the insulated panel 504.

In Figure 72 a schematic wiring diagram is shown with my invention wired up to a conventional distributor 453 and a printer 909. The distributor 453 is similar to that shown in the patent to Rainey No. 1,311,915 and the printer 909 is similar to that shown in patent to Krum No. 1,665,594. Leading from contacts 682, 688 to 692 inclusive, are wires 681a, 683a to 697a respectively. The other ends of these wires are connected to one side of switch 906 which controls the entire circuit to wires 905, 900 to 904 inclusive, said wires leading to distributor 453. Leading from the other side of the distributor are wires 907 and 908 thru which the impulses are transmitted in their proper order to printer 909 which reproduces the control sheet being scanned by my transmitting device. The type bars in printer 909 are identical to the type bars which produced the control sheet 194 and which are shown and described in my co-pending patent application Serial Number 712,065.

*Automatic shift*

Sliding shaft 640 has already been described as being disposed above fifth selector bar 637 for sliding movement. This shaft has a compression spring 700 mounted therearound which is confined at one end by a collar 701 and the other end thereof by inverted comb 643. This arrangement tends to normally move shaft 640 to the right hand side of the machine or to the left in Figure 5. The right-hand end of shaft 640 or the left-hand side as seen in Figure 5, is adapted to be contacted at all times by the upper end of a bell crank lever 702 which is pivotally mounted as at 703 and projects through rib 16 and is adapted to have the rearward end of a lever 704 resting thereon. Lever 704 has its free end normally moved downward by a tension spring 705 and is fixedly mounted on a shaft 706 which is mounted for oscillation between the ribs 16 and 17. Oscillating shaft 706 also fixed thereon a lever 707 which has a roller on the free end thereof adapted to follow cam 708 on automatic shift shaft 31, said roller of course being adapted to follow the cam 708 by means of tension spring 705, and is normally resting on the high side thereof, as seen in Figure 13.

The shaft 640 is provided together with other mechanism to be presently described, so that when the combination of impulses is transmitted into the first, second and third selectors which requires a shift operation in the printer to reproduce the same that a shift impulse can be sent into the printer ahead of the impulse combination for the character requiring a shift while the impulse combination is stored up in the fourth selector bars.

It will be observed that on the control sheet the letters of the alphabet do not have any shaded portion for cell control number 6. It will also be observed that all of the numerals and other characters requiring a shift do have cell control number 6 shaded. This control sheet was designed primarily for use in the means for automatically operating the character reproducing machines such as type setting machines, as shown in my co-pending application Serial Numbers 404,331 and 517,171. When this control sheet is used in the present apparatus to actuate the type bars in a telegraphic printer, it is evident that a sheet must be produced by the printer which can be taken out of the printer and introduced into mechanism for automatically operating a line casting machine such as disclosed in my said co-pending patent applications.

It is also evident that in reading the code for a numeral such as the numeral 5 that instead of this character being selected from the matrices in a line casting machine that it must be reproduced by a type bar in the printer which has another character thereon which usually is in the form of a letter of the alphabet and therefore a shift operation must be employed to shift the carriage or the basket of the printer so that the numeral will be printed by the printer.

Let as assume that in transmitting the numeral 5 that the printer on the unshift side would print the letter T, but in shift position it would print the numeral 5. Therefore the cell controls are scanned to set up the proper combination in the first, second, third, fourth and fifth selectors, but when the sixth cell control is also shaded it operates the shift mechanism of the printer through mechanism in this apparatus. In scanning this set of cell controls in which one, two, five and six appear shaded, the selector bars A1, A2, A5, and A6 would be actuated as well as second selector bars C1, C2, C5, and C6; and also D1, D2, D5 and D6.

By referring to Figures 69 and 70 it is seen that due to the movement of bar D6 in combination with bars D1, D2 and D5 that the fourth selectors, bars 573a and 573b will be allowed to drop into notches and fourth selector bars 573 will be prevented from dropping. The third and fourth bars corresponding to bars 573 but which are given special reference character 573a and 573b to fall downwardly and be lowered into the path of the striking bail, (Figure 15). Bar 573b has a cutaway portion 709 which prevents the striking bail from moving bar 573b.

It should be stated at this point that all serrations in the upper side of the right-hand end of bars in the third selector bars D1 to D5 inclusive, have been eliminated so that the selection of the fourth selector bars 573a, 573b, 573c and 573d may be controlled entirely by the bars D6 and 570, as shown in Figures 69 and 70.

It will be observed that these bars 573a, 573b, 573c and 573d have no projections on the upper edge of their rear ends and therefore do not affect the bars 535 to 539 in any manner. It is to be observed however that bar 573a has a pin 710 projecting from one side thereof (Figure 14) which is adapted to be loosely engaged by the uppermost end of a lever 711 which is pivoted intermediate its ends as at 712 on the rib 16 and its lower end is pivotally connected to a push bar 713.

A tension spring 714 normally moves push bar 713 towards the rear of the machine and therefore tends to return bar 573a to normal position after it is released by the striking bail 594.

The push bar 713 is held against one end 715 of a twin dog by means of tension spring 714. The other end of this twin dog is designated by reference character 716 and its function will presently be described. The forward end of bar 713 as will be observed in Figure 14, is restricted in vertical width and this end portion in the position shown in Figure 14 is in engagement with one end 717 of a bell crank lever 718 pivoted on stud bolt 719 secured to the lower surface of the top cover plate 14 of the frame, (Figure 12). The bell crank 718 has an arcuate slot 720 in another of its arms 721 which is loosely penetrated by a stud 722 and a compression spring 723 is disposed around said stud 722 to apply friction to bell crank 718 to hold it in whatever position to which it may be moved by the mechanism.

Bell crank 718 has another leg 724 which has a downwardly projecting pin 725 in its end which is adapted to follow a groove in grooved collar 726 fixedly secured on shaft 470. Shaft 470 is movable endwise in both directions for tripping all of the clutches for the main drive shaft 44, the carriage return shaft 50 and the automatic shift shaft 31. This shaft 470 has a lever 727 which controls the tripping of the clutch for automatic shift shaft 31 (see Figures 12 and 39). When the shaft 470 is moved endwise towards the rear of the machine and upwardly in Figure 12, it will engage arm 728 pivoted on bolt 729 disposed in projections 730 and 731 on the inside surface of sidewall 10 of the frame of the machine.

Dog 728 is normally pressed upwardly in Figure 39 by means of compression spring 732 disposed around pin 733 in bracket 734, the pin 733 terminating short of the upper end of the spring and is employed merely for supporting the spring to prevent its falling from its position as shown. Dog 728 has a shouldered cavity in the upper outer end thereof which is adapted to be engaged by the lower end of a lever 735 pivoted as at 736 on bracket 737 which bracket has slidably mounted in groove 738 a slide 739 which is confined in position to plates 740 and 741. This slide has a projecting portion 742 against which the upper end of lever 735 is adapted to press at all times on account of tension spring 743.

Slide 739 has an inturned cam-faced portion 744 which is adapted to be engaged by a projection 745 secured to clutch face 37 so that it is seen that when the parts are latched in the position shown in Figure 39 that projection 745 will ride behind projection 744 and disengage the clutch in the same manner as previously described for the other clutches, and when tripped allows one revolution of shaft 31.

It will be observed in scanning any character that if the sixth cell control is shaded in combination with other shaded cell controls that this will result in selectors A6, C6 and D6 being actuated in combination with the bars for the other shaded cell controls which will allow bar 573a to drop downwardly simultaneously with one of the fourth selector bars 573 to be engaged by the striking bail 594. This will move the lower end of lever 711 in Figures 12 and 14 forwardly in the machine and will push bar 731 forwardly which will engage arm 717 of bell crank 718 and oscillate the same in a counter clockwise direction in Figure 12 and will move shaft 470 upwardly to cause lever 727 to engage the upper surface of dog 728.

By referring to Figure 39 it is evident that upon oscillation of shaft 470 through link 466 due to the energization of magnet 452 this will release the clutch on the automatic shift shaft 31 and allow a complete revolution of the shift shaft. Shift shaft through cam 708 in Figure 13 will move lever 707 and oscillate shaft 706. This will allow spring 705 to move lever 704 downwardly to oscillate bell crank 702 in Figure 5. This will push shaft 640 to the left in the machine or to the right in Figure 5 which will move latch dog 657 by engaging the upwardly extending end thereof and will move insulating pin 672 and will open the circuit between contact plates 676 and 673 (Figure 7). This will allow impulses to pass through all of the wires 683, 684, 686, and 687, and deliver these four impulses in the proper order through the rotary switch in the conventional distributor to actuate the shift mechanism of the printer.

While the shift impulse is being transmitted the combination for the character to be next printed will be stored up in the selected fifth selector bars. During the sending of this impulse which causes shifting of the carriage mechanism of the printer, the main drive shaft 44 will be stopped for a complete revolution due to its clutch tripping member being disengaged because lever 473 will not be in contact with dog 480 to release the same. Therefore, the clutch will be held in disengaged position on the main drive shaft 44. Since bars 473a and 573b are allowed to fall together then it is evident in Figure 15 that when the forward end of bar 573b falls downwardly, link 476 will move downwardly. This link is connected to bar 573b by means of a pin 747 penetrating a slot 748 in link 746 and a tension spring 749 is connected to link 746 and to pin 747.

The lower end of link 746 is connected as at 750 to push bar 751 which is connected at its rearward end to a lever 752 which is mounted for oscillation on stud shaft 753 and its upper end has a roller thereon adapted to follow a cam 754 on automatic shift shaft 31 by reason of a tension spring 755. Push bar 751 has projecting upwardly therefrom projection 756 while from the lower edge thereof there emanates a similar projection 757.

On the left-hand side of bar 751 or on the side nearest the observer in Figures 15 and 16, there is secured a projecting plate 758 which is adapted, when bar 573b is lowered, to engage cavity 759 in dog 760 pivoted at 761. Dog 760 is adapted to be moved at all times towards the rear of the machine or to the left in Figure 15 by means of a tension spring 762 so that when bar 573b is lowered it will be latched in lowered position by dog 760 and yet the spring 749 will allow the left bail 583 to raise the bar 573b along with its companion bar while the bar 751 is in lowered and latched position. The bar 751 is mounted for sliding movement in a slotted bracket 763 secured to the lower surface of cover plate 14 of the frame.

When the shift mechanism has been operated by a revolution of shaft 31 the parts will assume the position shown in Figure 17 and be held in that position on account of a friction plate 764 secured on shaft 765 (Figure 19). Plate 764 has a slot 766 therein penetrated by a stud bolt 767 which is surrounded by a compression spring 768. Stud bolt 767 is threadably secured in block 769 secured to the lower surface of cover portion 14. The shaft 765 is rotatably mounted in block 769 and has fixed thereon double ended lever 770 (Figures 15, 16 and 18) having lateral projection 771 on its upper end and lateral projection 772 on its lower end with a pin 772a projecting from projection 772.

When bar 751 is in lowered position and is moved by cam 754, as has been described with regard to Figure 15, the projection 757 will engage projection 772 and move the parts to the position shown in Figure 17. Pin 772a will engage the lower end of dog 760 and hold in the position shown in Figure 17, so that when the bar 751 moves to the rear of the machine to normal position and dog 758 is removed from cavity 759 the parts will be held in the position shown in Figure 17 due to friction plate 764 and the cooperating compression spring 768. Bar 715 is raised to elevated position by spring 749 when it assumes normal position as shown in Figure 15.

With the parts in the position shown in Figure 17 bar 573b and link 746 will be allowed to lower and raise the forward end of bar 751 without having the latch 760 engage the plate 758. This action takes place upon the scanning of the shaded cell control 6 in combination with other shaded cell controls.

It will be observed that leg 721 (Figures 12 and 20) has pivotally secured thereto a link 721a which is secured to one end of a bell crank 721b pivoted as at 721c and having its other end connected to a link 721d. The other end of said link 721d is pivotally connected to a lever 721e pivoted on stud bolt 753 and adapted to follow a cam 721f on shift shaft 31.

When the shaft 470 is moved endwise in a shift operation to cause lever 470 to trip the clutch mechanism of the shift shaft 31, the link 721a and associated parts will be moved to cause the roller on the end of lever 721e to move in against the low place in cam 721f. When the shift shaft has completed its revolution cam 721f will have moved the parts back to normal position as shown in Figures 12 and 20.

The twin lever comprising portions 715 and 716 is secured on shaft 765. With the parts in the position as shown in Figure 17 arm 716 will be lowered and arm 715 will be raised, and will assume a reverse position to that shown in Figure 14. This will allow drive bar 713 to be lowered so that it will not contact arm 717 on bell crank 718 and will raise bar 773 so that its end will engage arm 717 of bell crank 718. This arm 773 is pivotally connected to the lower end of a lever 774 as seen in Figure 13 which is pivotally mounted on stud shaft 712. The upper end of lever 774 is forked and engages a pin 775 in the side of bar 573c. A tension spring 773a normally pulls bar 773 downwardly and toward the rear of the machine. Bar 573c will be allowed to fall downwardly at its front end by the permutation in the third selector bar when the sixth cell control is unshaded, at which time the striking bail will be allowed to move this bar with any other single bar which is selected for a character and of course this will move lever 774 and drive bar 773 and oscillate bell crank 718 to move the shaft 470 to a position where its lever 727 will engage dog 728 and unlatch the clutch mechanism for the shift shaft 31 to allow a complete rotation thereof.

It will be observed that a sliding bar 776, (Figures 4 and 6A) is mounted for sliding movement on the outside of rib 16 and is disposed between lever 702 and the rib 16. This sliding bar has a projection 777 so that when this bar is moved toward the rear of the machine it will prevent oscillation of lever 702 under tension of spring 705 because high place in cam 708 which positions the parts as shown in Figures 5, 13, and 20, will ride away from these parts and on account of the projection 776 being in the path of lever 702 then said lever 704 cannot move downwardly under tension of this spring to oscillate and move bell crank 702.

This blocking of movement of lever 702 prevents sliding movement of shaft 640 and therefore prevents a shift impulse from being transmitted to the printer, and transmits in lieu thereof an unshift impulse due to all the controls having remained closed.

When the above described operation of shaft 31 is taking place it is evident that the bar 573b and its link 746 pivoted on the end thereof will not be lowered because the bar D6 has not been allowed to move due to the letter just scanned not having the sixth cell control shaded. This will cause the bar D6 as shown in Figure 7 to remain in this position which will prevent the falling of the bars 573a and 573b, but will allow the bar 573c to fall as has just been described.

During the rotation of shaft 31 with the parts in the position shown in Figure 17 the projection 756 which is fixed on bar 751 will contact the projection 771 and cause it to move the parts back to the position shown in Figure 15, thereby bringing the position of the twin dogs having portions 715 and 716 back to the position shown in Figures 13 and 14. This will allow the bar 773 as seen in Figure 13 to pass beneath the end of arm 717 but will not actuate this arm. Bar 773 is operated when number 6 cell control is unshaded whereas the bar 713 is operated each time the number 6 cell control is shaded in combination with other shaded cell controls.

The movement of slide 776 is effected by means of the same having a laterally and inwardly projecting portion which projects around the rear edge of rib 16 and then forwardly into close proximity to the rear end of bars 573c and bar 573d (Figure 6A). It is therefore seen that when the sixth cell control is unshaded and bar 573c is allowed to drop downwardly to be moved by the striking bail that it will engage the end 778 of slide 776 and move it, thus blocking movement of lever 702, therefore, although the carriage shift shaft will be rotated a complete revolution the printer will receive an unshift impulse because all of the five contact points connected to wires 683 to 687 inclusive, will be closed and five impulses will be transmitted to the printer which is an unshift impulse and the printer carriage or type basket will be unshifted. The slide 776 is returned to normal position which is in unblocking position with relation to lever 702 by means of a projection 779 on striking bail 626 (Figures 5 and 6A) so that when the bars 573 and other bars bearing similar reference characters but with a suffix added are returned to normal position the slide will also be returned to normal non-obstructing position.

It is therefore, clear that bars 573a and 573b are allowed to be lowered and to be moved by the striking bail every time a character is scanned having the cell control 6 of the code character shaded in combination with other shaded cell controls excepting when all six cell controls are shaded which is the blot-out and will presently be described. It is also evident that each time a code character is scanned in which the number six cell control is unshaded bar 573c will be allowed to move downwardly by the permutations of the third selector bars and will be moved by the striking bail 594 and this operates the unshift impulse through the unshift mechanism as has previously been described.

The fourth selector bars 573 are in pairs, that is there are two bars having identical permutations on their upper edge which alike control a selected number of fifth selector bars 635 to 639 inclusive. Now let us assume that in the printer there is a type bar which has the letter T thereon and also the numeral five. For reproducing the letter T it will be observed that cell controls 2 and 3 are shaded, while in reproducing the numeral 5 cell controls 1, 2, 5 and 6 are shaded. It is therefore evident that upon scanning the code for T that one of the twin fourth selector bars will be moved to let the selected fifth selector bars to be moved to transmit impulses to actuate the printer in unshift position to print T. Now when the cell controls for the numeral 5 are scanned the other of the twin fourth selector bar will be moved and the same fifth selector bars will be allowed to be moved as if the cell controls for T had been scanned, but the sixth cell control will lock the selected fifth selector bars from moving to impulse sending position and rod 640 will be pushed to send the shift signal to shift the carriage of the printer and then the selected fifth selector bars will be allowed to move to impulse sending position and will deliver the same impulses to the printer as if the letter T were selected, but the carriage of the printer being shifted, the numeral 5 will be printed along with the proper cell controls to govern the selection of 5 when the record produced by the printer is placed in a mechanism for operating linecasting and like machines as disclosed in my copending applications, Serial Numbers 404,331 and 517,171.

It has already been described as to how the seventh selector bar 570 is moved each time any one of the third selector bars C1 to C5 inclusive are allowed to move by a permutation set up by impulses from a code character. It has also been stated that when third selector bar C6 moves alone that it will not move the seventh selector bar 570 because the sixth selector bar C6 has no projections similar to the projection 567 on the other bars. It has also been stated as to how the projection 571 on the seventh selector bar 570 is moved by the leaf 568 (Figures 32 and 69). Movement of this seventh selector bar 570 is necessary in order to allow bars 573a and 573b to fall downwardly because it will be noted that this bar 570 has projections 780 and 781 thereon which prevent downward movement of bars 573a and 573b unless bar 570 is moved, but this bar is moved each time a selection is made which actuates any one of third selector bars D1 to D5 inclusive.

It is also evident from Figure 70 that the selector bar D6, which is actuated by the sixth cell control being shaded, normally blocks downward movement of bars 573a, 573b and 573d but allows downward movement of bars 573c. Now when the bar D6 of the third selector bars is allowed to move upon the scanning cell control 6 being shaded, then it is seen that bar 570 will not be moved and projections 780 and 781 will prevent downward movement of bars 573a and 573b and projection 782 or D6 will block downward movement of unshift bar 573c (Figure 70) but will permit downward movement of bar 573d.

It will be observed in Figures 6A and 69 that bar 573c has a projection 783 projecting from the side thereof, and fitting immediately behind this projection is another projection 784 fixed to bar 573d so that it is evident that when bar 573d drops into a cavity after bar D6 is moved alone that actuation of bar 573d will also actuate unshift bar 573c. In other words bar 573d actuates nothing except bar 573c when all cell controls are unshaded except cell control 6.

The code character having only number 6 cell control shaded was primarily designed for operation of the shift mechanism in a line casting machine with which the control sheet used herein and reproduced in the printer actuated thereby is to be used in a linecasting machine and therefore a code consisting of only the sixth cell control shaded is employed for this purpose in the linecasting machine. As the type bar in the printer is actuated by cell control 6 being shaded then a permutation is set up to transmit an impulse to the printer to actuate the type bar in the printer to print this single cell control indicating a cap shift.

As the shift character is printed by the printer only when the carriage therein is in unshifted position then it is of course evident that some means must be provided for insuring that the carriage in the printer is in unshift position when this impulse is tranmitted thereto.

Accordingly when a code character having only cell control 6 therein shaded is transmitted to the selectors for transmission to the printer it is therefore evident that bar 573d is provided to operate the unshift bar 573c, because this bar 573c cannot operate on account of projection 782 in Figure 70; and therefore, if the carriage of the printer should be in shifted position the unshift impulse, which has heretofore been explained, is transmitted ahead of the transmission of the signal for printing the shift character in the printer.

Mounted for oscillation on stud bolt 785 is a bell crank 786 to one end of which is connected a link 787 which is connected to the lower end of lever 788 pivoted as at 789 which lever on the upper end thereof has a horizontally extending portion broad enough to engage the second selector bars C1 to C6 inclusive which will be moved by the actuation of any one of the second selector bars. Lever 788 is fixed on a shaft 789 mounted for oscillatory movement between the brackets 790 and 791 on the selector block 535.

The upper end of lever 788 has a forwardly projecting portion 792 broad enough to be engaged by any one of the second selector bars C1 to C6 which may be actuated and of course will oscillate lever 788 and move bell crank 786.

It is seen in Figure 12 that bell crank lever 786 has secured thereto one end of tension spring 793 whose other end is secured to pin 794 projecting from portion 13 of the frame. This tends to move bell crank 786 in a clockwise direction at all times. Pivotally secured to the other end of bell crank 786 is a link 795 whose other end is pivotally secured to bell crank 796 which is pivotally secured on stud bolt 797. This bell crank has projecting downwardly from the other end thereof a pin 798 which is adapted to loosely fit into a forked projection 799 projecting from splined hub 800 loosely mounted on shaft 470 and engaging a male portion of the spline 801 which is fixedly secured on the shaft 470. The splined hub 800 has projecting therefrom an arm 802 which is adapted to engage a dog 803 pivoted on bolt 804 mounted between projections 805 and 806 on portion 10 of the frame of the machine. This arm 802 engages the dog 332 to release the clutch mechanism and allow rotation of the carriage return shaft 50 when the bell crank 796 is moved in a counter clockwise direction in Figure 12.

Also mounted on pin 798 is a link 807 whose other end is pivotally secured to a bell crank dog 808 pivoted as at 809 (Figure 19) on block 769. The purpose of this dog is to prevent the carriage return clutch from being tripped when the automatic shifting mechanism is in the position shown in Figure 17. This evident because if the dog portion 808a of bell crank dog 808 is engaging the lower edge of plate 764 then tension spring 793 cannot move the bell cranks 786 and 796 to move the arm 802 into a position where it can engage dog 332 to release the clutch mechanism for starting the carriage return shaft 50 into operation.

It will be observed that bell crank lever 786 has a pin 810 therein penetrating a slot 811 in one end of link 812. This link projects transversely of the machine and, as seen in Figures 9 and 12, has a slot 813 in its other end penetrated by a pin 814 in the lower end of lever 815. Link 812 also has secured thereto one end of tension spring 816 whose other end is connected to the pin 814. The slot 811 is provided so that when bell cranks 786 and 796 are oscillated as previously described, they will not affect link 812.

A spring 816 and associated parts gives a flexible connection between link 812 and lever 815. Lever 815 is mounted intermediate its ends on a stud bolt 817 secured in bracket 818 and the upper end of lever 815 has a set screw 819 therein which is adapted to engage the end of the carriage mechanism. The lever 815 and link 812 are provided to hold the dog 802 and its associated parts in the position shown in Figure 12 when the carriage is returned to begin the scanning of a new line so as to automatically place the parts in position so that the scanning of six unshaded cell controls will not result in the carriage return shaft being operated because in practice the scanning mechanism begins one space ahead of the beginning of the line because extra spacing characters are sometimes inserted at the beginning of the line and by this arrangement it prevents the carriage from being returned to the beginning of the line upon scanning six unshaded cell controls, whereas, if there is a carriage return code character at the beginning of the line it allows the transmission of this code character to actuate selecting mechanism for transmission to the printer.

In the event of six blank cell controls being scanned such as occur at the end of a line of code characters, not at the beginning of the line, then it is apparent that the second selector bars as seen in Figure 22, will not be actuated as there shown, but will be moved to the right in Figure 22 until their springs 537 cause their downwardly projecting rear legs to rest against the plate 535. This will allow spring 793 in Figure 12 to oscillate bell crank 786 in a clockwise direction on account of the plate 792 moving in under tension of spring 793 with the selector bars C1 to C6 inclusive. When this movement takes place it is evident that bell crank 796 likewise will be oscillated which will move lever 802 into the path of dog 332 and upon the next impulse being sent out from the distributor mechanism energization of magnets 452 will allow spring 460 to oscillate shaft 470 as has previously been described and this will result in the carriage return clutch and clutch for shaft 44 being tripped to allow a complete revolution of the carriage return shaft 50 to return the carriage to starting position.

While the six blank cell controls are being scanned at the beginning of a line, it has been explained that the carriage tripping mechanism on the machine appearing in the drawings, is blocked out so that it cannot be operated. This scanning of the six blank cell controls does not actuate any of the first, second or third selector bars but they remain in their normal position, and in this position the third selector bars have a plurality of coinciding slots so as to permit one of the bars 573 to drop down in the path of the striking bail to set up a combination in the fifth selector bars whereby certain impulses are transmitted to the printer for causing the carriage return mechanism of the printer to operate. I have provided certain mechanisms associated with the printer but not herein shown and described, whereby, when the carriage mechanism of the printer is returned previously to the beginning of the scanning of a new line, on my mechanism herein shown and described, the carriage return mechanism of the printer will be automatically latched out of operation until one or more escapements have been transmitted to the carriage mechanism of the printer to cause it to cooperate with the movements of the carriage mechanism of the machine herein shown and described.

In conventional printers heretofore employed it has been necessary to send a set of carriage return impulses and to immediately follow this set of impulses with another set of impulses to move the carriage to new line position; that is, to move the platen on the carriage in the printer to new line position. I have dispensed with this necessity of two sets of impulses for returning the carriage of the printer to beginning point and then another set of impulses for moving the platen therein to new line position and accomplish this with one set of impulses; however, to operate the conventional printers without changing their mechanism, I have provided means for sending the impulse necessary to cause the platen to advance to new line position.

During the carriage return movement and while the carriage return shaft 50 is being operated, it is seen in Figure 22 that carriage return shaft 50 has a cam 820 fixed thereon having a low place 821 therein. This cam is adapted to be followed by a roller on one end of a lever 822 which is mounted for oscillation on stud 823 and the lower end of this lever has pivotally secured thereto a link 824 which at its other end has a slot 825 therein penetrated by a pin 826 on the lower end of lever 827.

Lever 827 is pivoted on stud 828 mounted on central rib 17. The upper end of lever 827 is forked and engages a pin 830 projecting from one side of fourth selector bar 573e, (Figure 6A) this bar being broken away but being of the same length as the other bars 573, but there is never any time in which a row of notches coincide beneath this bar therefore, it is never lowered for engagement with the striking bail 594.

It is therefore seen that when the roller on the upper end of lever 822 falls into cavity 821 in cam 820 on account of tension spring 831 that it moves the bar 573e to a position where it will form a permutation with the fifth selector bars 635 to 639 inclusive, and will send an impulse to the printer for effecting the movement of the platen therein to new line position. This bar will then be returned by striking bail 626 in the usual manner. The mechanism just described is for the conventional printer, not equipped with my special feature of means for combining the two sets of impulses of carriage return and moving to new line position in one set of impulses. In the conventional printer there are usually three sets of impulses, employed in returning the carriage and in line feed or moving the line to new line position, and to allow the carriage in the printer sufficient time to reach starting position.

In order to have the herein shown and described machine consume these three sets of impulses, that is, on account of the fact that the distributor associated with the printing mechanism will return three different impulses to the herein shown and described apparatus just as if these three impulses were operating on a perforated tape transmitter, and since I use one set of impulses for returning the carriage to starting position and another set of impulses for moving the platen in the carriage to new line position, it is evident that some set of impulses must be transmitted by my mechanism in order to coordinate with the printer and to keep in timed relation thereto. I have already described the sets of impulses transmitted for the carriage return of the printer and for moving the platen therein to new line position. The third set of impulses is transmitted by my apparatus in the same manner as the first two sets, that is, by the third successive revolution of the main drive shaft 44.

The gearing of my apparatus is such that these three revolutions of the main drive shaft 44 take place while one complete revolution is made of the carriage return shaft 50. The third set of impulses which must be sent by my apparatus to properly cooperate with the printer, is also controlled by the carriage return shaft. This third set of impulses transmitted by my apparatus to the printer consists of a blot-out impulse which has no effect whatever on the printer other than operating the unshift mechanism and of course as the printer is in unshift position it will not affect the printer in any manner.

The special blot-out impulse just referred to, is caused to be transmitted by mechanism comprising a cam 832 fixed on carriage return shaft 50 and it will be noted that this cam has a low place 833 therein (Figure 31). The cam is adapted to be followed by roller in one end of a lever 834 which is pivotally mounted intermediate its ends as at 835 and has a tension spring 836 which causes the roller in said lever to follow said cam. The other end of said lever is adapted to project beneath a pin 837 in the end of a lever 838 fixed on shaft 652. It is thus seen that when roller in the end of lever 834 falls into low place 833 of cam 832 that shaft 652 will be slightly rotated, and will be latched in this moved position, by means to be presently described.

Shaft 652 is mounted for oscillation in bracket 96 and in bearings 840 and 841. This bracket and the bearings are disposed on ribs 16, 17 and 18 respectively. By the time the cavity 833 in Figure 31 has reached the roller on end of lever 834, the carriage will have been returned completely. Shaft 652 has an arm 842 (Figures 4, 6A and 13) which is adapted to be latched in lowered position when the shaft is oscillated upon roller in the end of lever 834 entering low place 833 in cam 832.

The latch 843 which latches arm 842 in lowered position is mounted in bracket 844 as at 845 and is normally held in latching position by means of a tension spring 846 secured to an outwardly projecting leg 847 of the lever 843 and to the bracket 844 which supports the latch. The shaft 652 is adapted to be returned to original position by means of a tension spring 848 secured to arm 842 at one end and to the bracket 844 at the other end. With the parts latched in position as described, it is to be noted that arm 651 secured on shaft 652 (see Figures 1, 6 and 32) will be moved in front of projection 650 on lever 646 and will prevent the roller in the forward end thereof from following the barrel cam 649 and therefore will hold all five of the fifth selector bars 635 to 639 inclusive, in inoperative position; therefore, all contact points leading to the distributor will remain in closed position, thus delivering a blot-out signal to the receiving printer.

The above described blot-out impulses delivered by the fifth selector takes place during the scanning of the first character or first space appearing immediately in front of the beginning of a line but does not arise from a scanning operation.

It will be observed that while the carriage is in this position (Figures 4, 10 and 42) that a projection 849 on the rack bar 117 of the carriage mechanism will engage the upper horizontal portion of a lever 850 secured on a shaft 851 to oscillate said shaft against tension of spring 850a. This shaft is mounted in a projection 852 on intermediate bracket 52 and also in a bracket 853. Shaft 851 has an arm 854 fixed thereon which has a set screw 855 therein and as the carriage moves away from lever 850, will cause the set screw to move against the upper end of latch 843, therefore retracting its lower end from latching position and will allow the lever 842 to move upwardly under tension of spring 848 and to allow shaft 652 to return to original position.

Shaft 851 has a lever 856 secured thereto which projects downwardly and has a set screw 857 therein which is adapted to engage one end of a sliding bar 858 mounted in slides 859 and 860 on the upper end of ribs 16 and 17. This push bar is normally pulled towards the right-hand side of the machine by means of a tension spring 851 (Figure 6A) being secured to a pin in the push bar and having its other end secured to bracket 859.

The sliding bar 858 has a plate 862 on the upper surface thereof forming a slide for a link 863 which is mounted for sliding movement between plates 862 and bar 858. (Figures 6A, 22, and 44.) This link has a plate 864 secured thereon which projects laterally and has a cavity appearing between its tip end and the link 863. The link 863 projects forwardly in the machine and is pivotally connected to the upper end of a lever 865 pivoted as at 866 and having its lower end projecting through cover portion 14, and adapted to engage portion 867 of a bell crank which is pivoted as at 868 and has its other end indicated by reference character 869. The bell crank is caused to move in a clockwise direction in Figure 12 by means of a tension spring 870.

The leg 869 of the bell crank has a link 871 secured thereto whose other end slidably penetrates a bracket 872 secured on portion 10 of the frame of the machine and is adapted to contact a lever 873 fixed on bolt 804 (Figure 4) which has previously been described as being mounted between projections 805 and 806, said bolt having the dog 332 thereon for controlling the carriage return clutch.

The link 863 is adapted to be moved by bar 573f. This bar is similar to the other bars bearing reference character 573 except for the special features added thereto. It is to be observed that this bar 573f has an upwardly projecting finger 874 secured thereon which is adapted to contact the high portion or tip end of plate 864, secured on link 863 when the carriage is in returned position, and when the bar 573f is moved by the striking bail 594. When the carriage is not in returned position it is evident that the finger 874 will enter the cavity in plate 864 adjacent the link 863 and therefore will not move link 863, because the spring 861 will have moved the bar 858 towards the right of the machine and the link 863 being slidably confined to bar 858 the link will have been moved to a point where the finger 874 will not engage the high position of plate 864.

It is therefore evident that when the link 858 is moved towards the left in the machine and the striking bail 594 engages bar 573f that lug 874 will engage the high position of plate 864 and will move the link 863 rearwardly in the machine which will move the bell crank composed of portions 867 and 869 in a counterclockwise direction in Figure 44 and cause a tripping of the carriage return mechanism because of the releasing of the clutch on the end thereof to drive the carriage return shaft for a complete revolution.

The above described operation takes place when the first character in the line of copy on the control record has all cell controls shaded. It is evident that if a line of copy on the control record is incorrect, that by blotting out the first character and scanning the same as above described, it will cause the carriage to return to original position and move the control record to new line position without the loss of time in passing over the remainder of the line which has the blot-out signal at the beginning thereof.

It will be observed in Figure 44 that shaft 652 has a lever 875 secured thereon which has a pin 876 projecting into an elongated slot 877 in link 863. This lever 875, by oscillation of shaft 652, performs the same function as previously described in connection with the mechanism in Figure 31 by causing the lever 651 to be moved in front of projection 650 to prevent lever 646 from following barrel cam 649 (Figure 32) and therefore holds all five of the fifth selector bars against operation and causes all five of the contact points leading to the distributor to remain in closed position which advancing the copy prevents the carriage on the printer from advancing the copy to new line position therein.

It has already been stated that the blot-out combination of impulses when transmitted from the herein described and shown mechanism to the printer operates the unshift mechanism of the printer carriage. It has already been described as to how cell control number 6 operates the automatic shift when used in combination with other cell controls. It has already been described as to how bar 573a is allowed to fall when sixth cell control is shaded in combination with other shaded cell controls. It has already been fully described that the mechanism shown in Figure 68 moves to the left of the machine when all of the third selector bars D1 to D6 inclusive, are allowed to move to the left in the machine.

It is observed that the upper end of lever 553 has a pair of projections 553a and 553b thereon so that it is seen that when all of the third selector bars D1 to D6 inclusive are allowed to move to the left as a result of set-ups from the impulses from the cell controls to transmit the blot-out signal that this lever 553 moves therewith and therefore the projections 553a and 553b block downward movement of bars 573a and 573b.

Thus by blocking the downwardly movement of bar 573a the impulse for the automatic shift is prevented from being transmitted to the printer. Likewise, projection 553b prevents downward movement of bar 573b and as these two bars 573a and 573b cooperate in transmitting the automatic shift impulse for the carriage mechanism of the printer, it is thus seen that this impulse is prevented from being transmitted.

It has previously been described as to how the parts are positioned as shown in Figure 17 when the shift impulse has been transmitted to the printer. In case a blot-out impulse is sent immediately after a shift impulse and immediately before another character which is to be printed with the carriage in shift position mechanism must be operated from bar 573f to move the parts from this position they occupy in Figure 17 to the position shown in Figure 15.

It will be observed in Figures 11, 15 and 22 that bar 573f has a pin 878 projecting from one side thereof, which upon movement of bar 573f by striking bail 594, will move a lever 879 fixed on shaft 880 mounted in brackets 881 and 882. This shaft 880 has secured thereon a downwardly projecting lever 883 which has connected thereto the rear end of link 884 which projects forwardly in the machine and is supported for sliding movement near its free end in a bracket 885.

Now when an impulse has been transmitted for operating the shift mechanism of the printer the parts will occupy the position shown in Figure 17 and the printer carriage or type basket stands in shift position. The blot-out impulse is transmitted from the herein described mechanism to the printer which impulse will unshift the printer when bar 573f is moved by striking bail 594. This movement will slightly rotate shaft 880 which will cause the front end of link 884 to engage the upper portion of lever 770 and will return the parts in the herein described mechanism to unshift position as they will occupy in Figure 15.

It is thus seen that I have provided a transmitter for the control and actuation of the conventional telegraphic printer through the conventional distributor by means of a printed control record and scanning the same by light sensitive means; that there has been provided means whereby the carriage basket mechanism of the printer is automatically shifted without the necessity of scanning a separate code character on the control record, and that the carriage basket mechanism is automatically moved to unshift position if the succeeding character to be selected is to be printed on the unshift side of the carriage, without the scanning of a separate code character for this unshift operation.

It is also seen that means have been provided whereby a plurality of control records can be supplied to the machine and these control records can be fed one at a time to the scanning mechanism, also additional control records can be supplied to the machine while it is in operation, thus permitting uninterrupted operation.

It is also seen that means have been provided whereby in controlling the operation of telegraphic printers a control record has been provided and scanning means therefor, whereby when the first character in a line on the control record is blotted out the record is automatically moved to new line position, and also when a character or characters in a line is blotted out the scanning means will pass thereover without in any manner affecting the printer.

It is also seen that means have been provided whereby both the carriage mechanisms of the scanning means and the printer can be automatically returned to new line position without the necessity of placing a special code character on the control record.

It is also seen that means have been provided whereby a carriage shift code can be embodied in a code character for selecting a type bar in the printer for actuation, which shift can be sent ahead of the impulses for the character to shift the carriage basket of the printer while the impulses for the character are stored in the mechanism.

In the drawings and specifications there has been set forth a preferred embodiment of the invention, and although specific terms are employed, they are used in a generic and descriptive sense only, and not for purposes of limitation, the scope of the invention being set forth in the appended claims.

I claim:

1. Apparatus for transmitting electrical impulses for actuation of a character reproducing machine having shift and unshift mechanisms, a control record having control areas thereon, and each area having a plurality of sections, some sections differing from the others in their controlling properties, means for scanning the sections, means controlled by said scanning operation to actuate the character reproducing machine, means controlled by the scanning means upon the scanning of an area having a predetermined one of its sections alone exercising control over the scanning means for reproducing a character in the character reproducing machine, and means controlled by the scanning means upon the scanning of an area having said predetermined section and at least one other section jointly exercising control over the scanning means for actuating the shift mechanism of the character reproducing machine and then transmitting impulses to cause the reproducing machine to print a character.

2. Apparatus for transmitting electrical impulses for actuation of a character reproducing machine having shift and unshift mechanisms, a control record having control areas thereon, and each area having a plurality of sections, some sections differing from the others in their controlling properties, means for scanning the sections, means controlled by said scanning operations to actuate the character reproducing machine, means controlled by one of the said sections for transmitting a plurality of shift impulses ahead of the character impulses called for by the selection already made by scanning the control areas of which said space is a part, depending upon the control properties of said space.

3. Apparatus for transmitting electrical impulses to a character reproducing machine for actuating the same comprising a control record having lines of code matter thereon and each code comprising a plurality of cell controls some differing from the others in their light affecting properties, a carriage mechanism for holding the control record, light sensitive means for scanning the control record line for line, a plurality of selectors controlled by a scanning operation to actuate the character reproducing machine, means for returning the carriage mechanism to a position where it will begin the scanning of a new line when a preceding line has been scanned, means controlled by the position of the carriage at the beginning of a line to cause a code character having all cell controls shaded to actuate the carriage return mechanism.

4. Apparatus for transmitting electrical impulses to a character reproducing machine for actuating the same comprising a control record having lines of code matter thereon, and each code comprising a plurality of cell controls some differing from the others in their light affecting properties, a carriage mechanism for holding the control record, light sensitive means for scanning the control record line for line, a plurality of selectors controlled by a scanning operation to actuate the character reproducing machine, means for returning the carriage mechanism to a position where it will begin the scanning of a new line when a preceding line has been scanned, a shift mechanism for said machine and means controlled by the selectors to cause a code character having all portions shaded to be ineffective for actuation of the shift mechanism.

5. Apparatus for transmitting electrical impulses to a character reproducing machine for actuating the same, comprising a control record, a carriage mechanism for holding the control record, means for scanning the control record, a selector mechanism comprising a plurality of selectors controlled by said control record, means for returning the carriage mechanism to begin the scanning of a new line on the control record when the preceding line on the control record has been scanned, and means controlled by an absence of controls on an area on the control record for actuating the selector mechanism for rendering the carriage return mechanism operative.

6. Apparatus for transmitting electrical impulses to a character reproducing machine for actuating the same, comprising a control record, a carriage mechanism for holding the control record, means for scanning the control record, a selector mechanism comprising a plurality of selectors controlled by said control record, means for returning the carriage mechanism to begin the scanning of a new line on the control record when the preceding line on the control record has been scanned, means controlled by the selector mechanism for rendering the carriage return mechanism operative, and means for rendering one of the selectors inoperative while the carriage return mechanism is in operation.

7. Apparatus for transmitting electrical impulses to a character reproducing machine for actuating the same, comprising a control record, a carriage mechanism for holding the control record, means for scanning the control record, a selector mechanism comprising a plurality of selectors controlled by said control record, means for returning the carriage mechanism to begin the scanning of a new line on the control record when the preceding line on the control record has been scanned, means controlled by the selector mechanism for rendering the carriage return mechanism operative, and means for rendering a portion of one of the selectors inoperative while the carriage return mechanism is in operation.

8. Apparatus for transmitting electrical impulses to a character reproducing machine for actuating the same, comprising a control record, a carriage mechanism for holding the control record, means for scanning the control record, a selector mechanism comprising a plurality of selectors controlled by said control record, means for returning the carriage mechanism to begin the scanning of a new line on the control record when the preceding line on the control record has been scanned, means controlled by the selector mechanism for rendering the carriage return mechanism operative, and means controlled by the position of the carriage when disposed within a given distance from returned position for preventing a set of impulses designed to effect a carriage return from becoming effective.

9. Apparatus for transmitting electrical impulses to a character reproducing machine to actuate the same comprising a control record, means for scanning the control record, a selecting mechanism controlled by the scanning means, means controlled by the selecting mechanism for transmitting sets of impulses to the said machine to actuate the same, automatic means independent of the control record for sending a set of impulses to said machine, and means controlled by the control record for determining whether said last set of impulses shall be shift or unshift impulses.

10. Apparatus for transmitting electrical impulses to a character reproducing machine to actuate the same comprising a control record, means for scanning the control record, selective mechanism comprising a plurality of selectors controlled by the control record, means controlled by the last of said selectors for transmitting electrical impulses and means for locking the last selector against operation until the preceding selector controlling the last selector has been actuated.

11. Means for controlling and operating a character reproducing machine, comprising a control record having control code thereon, some of said code comprising a plurality of controls for a character to be selected, means for scanning said code controls, a shift mechanism, and means controlled by one of the controls in a code for moving the shift mechanism and automatic means for transmitting a set of unshift impulses for returning the shift mechanism to normal position before the control record selects the next character in said reproducing machine.

12. Means for actuating character bearing members in character reproducing machines comprising a control record, means controlled by the control record for transmitting a plurality of impulses to the character reproducing machine for some of the character bearing members to be actuated, said character reproducing machine having a shift mechanism, means controlled by the control record for transmitting a set of shift impulses to the said character reproducing machine and automatic means for sending a set of unshift impulses for returning the shift mechanism of the character reproducing machine to unshift position before the control record is scanned for the selection of another character.

13. Apparatus for transmitting electrical impulses to a character reproducing machine to actuate the same comprising a control record having control areas thereon and each control area being divided into a plurality of sections differing from each other in their light affecting properties, light sensitive means for scanning the control areas, a shift mechanism for the character reproducing machine, an unshift mechanism for the character reproducing machine, one of said sections when shaded in combination with at least one other shaded section serving to actuate the shift mechanism for said machine and when unshaded serving to actuate the unshift mechanism of said machine.

14. Apparatus for transmitting electrical impulses to a character reproducing machine to actuate the same comprising a control record having control areas thereon and each control area being in several sections, some of the sections differing from the other sections in their light affecting properties, light sensitive means for scanning the control areas, a shift mechanism for the character reproducing means, an unshift mechanism for the character reproducing means, one of said sections when shaded in combination with at least one other shaded section serving to select a character and to actuate the shift mechanism in advance of the reproduction of a character.

15. Apparatus for transmitting electrical impulses to a character reproducing machine to actuate the same comprising a control record having control areas thereon and each control area being in several sections, some of the sections differing from the other sections in their light affecting properties, light sensitive means for scanning the control areas, a shift mechanism for the character reproducing means, an unshift mechanism for the character reproducing means, one of said sections when unshaded in combination with at least one other shaded section serving to select a character and to actuate the unshift mechanism in advance of reproduction of the selected character.

16. Apparatus for transmitting electrical impulses to a character reproducing machine to actuate the same comprising a control record having control areas thereon and each control area being in several sections, some of the sections differing from the other sections in their light affecting properties, light sensitive means for scanning the control areas, a shift mechanism for the character reproducing means, an unshift mechanism for the character reproducing means, one of said sections when shaded in combination with at least one other shaded section and another unshaded section serving to actuate the shift mechanism to shift position.

17. Apparatus for transmitting electrical impulses to a character reproducing machine to actuate the same comprising a control record having control areas thereon for controlling actuation of the machine and each control area being divided into a plurality of sections, means for scanning the sections of a control area, means controlled by the scanning of a control area for actuating the character reproducing machine, said machine having shift and unshift mechanism, and means controlled by one of said sections in cooperation with another section for actuating said shift mechanism and where acting alone serving to actuate the unshift mechanism.

18. Apparatus for transmitting electrical impulses to a character reproducing machine to actuate same, comprising a control record having control areas thereon and each control area being divided into a plurality of sections differing some from the others in their controlling characteristics, means for scanning the control areas, a shift mechanism for the character reproducing machine, an unshift mechanism for said machine, means controlled by the scanning of a control area having a predetermined one of its sections in combination with another section endowed with one controlling characteristic for actuating the shift mechanism and means controlled by the scanning of a control area having said predetermined area endowed with another characteristic for actuating the unshift mechanism.

19. Apparatus for transmitting electrical impulses to a character reproducing machine comprising a carriage mechanism, a control sheet having code characters thereon for the characters to be reproduced, means for holding the control sheet in the carriage mechanism, means for oscillating the carriage mechanism, light-sensitive means for scanning a code character on the control sheet during oscillation of the carriage mechanism, means operable by the absence of a code at the end of a line of code for returning the carriage to the beginning of a new line of code characters, a plurality of selectors controlled by the scanning of the code, means for locking the last selector while the carriage return means are operating, and means operable by the scanning of the next code for unlocking the last selector.

20. Apparatus for transmitting electrical impulses to a character reproducing machine to actuate the same comprising a plurality of control records, means for scanning a control record, means for holding a plurality of other control records in position to be fed one at a time into scanning position, automatic means for feeding a new control record from the holding means into the scanning means after the preceding control record has been scanned, and means controlled by the position of the control record being scanned for preventing the introduction of a new record until the preceding control record has been completely scanned.

21. Selecting mechanism for controlling the type bars in a telegraphic typewriter comprising a plurality of selectors, a control record, means for scanning the control record, means controlled by the scanning means for transmitting impulses to the first of said selectors to control the other selectors, the selector preceding and controlling the last selector having pairs of selector bars therein for controlling each of the type bars in the typewriting machine, said control record having control areas thereon to be scanned by the scanning means, each of said areas having a plurality of spaces, one of said spaces controlling the shift and unshift mechanism of the typewriter, and also in conjunction with other spaces controlling the selection of characters.

22. Means for scanning a control record for actuating character reproducing machines, comprising means for receiving the control record, means for scanning the control record, means for holding a plurality of control records, and means for feeding one record at a time from the holding means into the scanning means.

23. Means for scanning a control record for actuating character reproducing machines, comprising means for receiving the control record, means for scanning the control record, means for holding a plurality of control records, and means automatically operable by the position of the control record for moving a new record from the holding means into scanning position.

24. Means for scanning a control record for actuating character reproducing machines, comprising means for receiving the control record, means for scanning the control record, means for holding a plurality of control records, means for feeding one record at a time from the holding means into the scanning means, and means for rendering the feeding means inoperable while the record in the scanning means is being scanned.

25. Means for transmitting impulses for the selective actuation of character bearing members in a character reproducing machine, comprising a control record having printed cell controls thereon, a photo-electric cell, means for causing relative movement between the said record and said cell, a first selector controlled by the scanning operation, a second selector controlled by the first selector, a third selector controlled by the second selector, a fourth selector controlled by the third selector, and a fifth selector controlled by the fourth selector.

26. Means for transmitting impulses for the selective actuation of character bearing members in a character reproducing machine, comprising a control record having printed cell controls thereon, a photo-electric cell, means for causing relative movement between the said record and said cell, a first selector controlled by the scanning operation, a second selector controlled by the first selector, a third selector controlled by the second selector, a fourth selector controlled by the third selector, a fifth selector controlled by the fourth selector, a plurality of circuits for transmission of impulses to the character reproducing machine, and means operable by said fifth selector for selectively opening some of said circuits.

27. Means for actuating a telegraphic printer comprising a printed control record, light sensitive means for scanning said control record, a selector actuated by said scanning means, means controlled by the selector for delivering a set of impulses to said printer to actuate a type bar, and means controlled by the scanning operation for a character for sending a shift impulse ahead of the other impulses to shift the carriage or basket of the printer before the impulses for the character are sent.

28. Apparatus for transmitting impulses to a character reproducing machine comprising a carriage mechanism, a plurality of control sheets, means for scanning a control sheet one line at a time, means for holding said plurality of control sheets comprising rear and front tiers of sheet carrying members, means for lowering the sheet carrying members in the rear tier and elevating the sheet carrying members in the front tier and moving the topmost front sheet carrying member to topmost position on the rear tier and moving the control sheet carried by the last-mentioned carrying member into scanning position, and means actuable by the absence of a sheet at a point in the scanning means for moving all of the carrying members.

29. Apparatus for transmitting electrical impulses to a character reproducing machine comprising a plurality of front copy-carrying members, a plurality of rear copy-carrying members, means on each copy carrying-member for holding a control sheet, means for scanning a control sheet, and automatic means for moving a control sheet from the topmost rear copy-carrying member into the scanning means upon completion of scanning a control sheet in the scanning means.

30. Apparatus for transmitting electrical impulses to a character reproducing machine for actuation of the same, comprising a carriage mechanism, a control record, scanning means for the control record, means in the carriage mechanism for holding the control record and causing relative movement between the control record and the scanning means to thereby cause transmission of electric impulses to the character reproducing machine, means for stepping the control record from line to line in the carriage mechanism, means for holding a plurality of control records and feeding one at a time into the carriage mechanism, and means controlled by the absence of a control record at a point in the carriage mechanism for automatically moving a new control record into the carriage mechanism.

31. Apparatus for transmitting electrical impulses to character reproducing machines for actuation of the same comprising a plurality of separated control records, means for scanning the control records, impulse sending means controlled by the scanning means, means for introducing a new control record into scanning position upon the scanning of a control record, and means controlled by the position of the control record already scanned for actuating the means for introducing a new control record into the apparatus.

32. Means for actuating character reproducing machines comprising a control record having control areas thereon, means for scanning a control area for actuation of the character reproducing machine, a first selector controlled by the scanning means, a second selector controlled by the first selector, a third selector controlled by the second selector, a fourth selector controlled by the third selector, a fifth selector controlled by the fourth selector, and means controlled by the fifth selector for selectively actuating the character reproducing machine.

33. Means for actuating character reproducing machines comprising a control record having control areas thereon, means for scanning a control area for actuation of the character reproducing machine, a first selector controlled by the scanning means, a second selector controlled by the first selector, a third selector controlled by the second selector, a fourth selector controlled by the third selector, a fifth selector controlled by the fourth selector, impulse transmitting means controlled by the fifth selector, and means controlled by said impulses for actuating said character reproducing machine.

34. Means for actuating character reproducing machines comprising a control record having control areas thereon, means for scanning a control area for actuation of the character reproducing machine, a first selector controlled by the scanning means, a second selector controlled by the first selector, a third selector controlled by the second selector, a fourth selector controlled by the third selector, a fifth selector controlled by the fourth selector, a plurality of circuits controlling the reproducing machine, and means operable by the actuated fifth selector bars for opening said circuits.

35. Means for actuating character reproducing machines comprising a control record having control areas thereon, means for scanning a control area for actuation of the character reproducing machine, a first selector controlled by the scanning means, a second selector controlled by the first selector, a third selector controlled by the second selector, a fourth selector controlled by the third selector, a fifth selector controlled by the fourth selector, means controlled by the fifth selector bars for transmitting a set of impulses to the character reproducing machine for actuation of the same, and means controlled by a control area for locking the selected fifth selector bars against operation and while so locked, transmitting an impulse ahead to the character reproducing machine of the impulses represented by the fifth selector bars.

36. Means for actuating character reproducing machines comprising a control record, having control areas thereon, means for scanning a control area for actuation of the character reproducing machine, a first selector controlled by the scanning means, a second selector controlled by the first selector, a third selector controlled by the second selector, a fourth selector controlled by the third selector, a fifth selector controlled by the fourth selector, means controlled by the fifth selector bars for transmitting a set of impulses to the character reproducing machine for actuation of said machine, and means controlled by a control area for locking the selected fifth selector bars against operation and while so locked, transmitting an impulse ahead of the impulses represented by the fifth selector bars to the character reproducing machines, and means operable by the scanning of another control area for unlocking the fifth selector bars for transmission to the character reproducing machines of the impulses called for by said fifth selector bars.

37. Apparatus for transmitting electrical impulses to a character reproducing machine to actuate the same comprising a control record, means for scanning the control record, a plurality of selectors controlled by the scanning mechanism, means controlled by the selectors for transmitting electrical impulses to the character reproducing machine, means controlled by a scanning operation to transmit a shift impulse to the said machine, means for locking the last-named means in shift impulse sending position, and automatic means operable during the succeeding scanning operation for selection of an unshift character for unlocking the shift impulse transmitting means and moving it to a position where an unshift impulse will be transmitted to the character reproducing machine.

38. Apparatus for transmitting electrical impulses to a character reproducing machine to actuate the same comprising a control record, means for scanning the control record, a plurality of selectors controlled by the scanning mechanism, means controlled by the selectors for transmitting electrical impulses to the character reproducing machine, means controlled by a scanning operation to transmit a shift impulse to the said machine, means for locking the last-named means in shift impulse sending position, automatic means operable during the succeeding scanning operation for selection of an unshift character for unlocking the shift impulse transmitting means and moving it to a position where an unshift impulse will be transmitted to the character reproducing machine, and a main drive shaft for the apparatus and means for rendering said shaft inoperable while shift and unshift impulses are being transmitted.

39. Apparatus for transmitting electrical impulses to a character reproducing machine to actuate the same comprising a control record, means for scanning the control record, a plurality of selectors controlled by the scanning mechanism, means controlled by the selectors for transmitting electrical impulses to the character reproducing machine, means controlled by a scanning operation to transmit a shift impulse to the said machine, means for locking the last-named means in shift impulse sending position, automatic means operable during the succeeding scanning operation for selection of an unshift character for unlocking the shift impulse transmitting means and moving it to a position where an unshift impulse will be transmitted to the character reproducing machine, and means for rendering the scanning means inoperable while the shift and unshift impulses are being transmitted.

40. Selective mechanism for controlling character reproducing machines comprising a plurality of selectors, means controlled by the last of the selectors for sending impulses and means for locking the last selector against operation until the preceding selector controlling the last selector has been actuated.

41. A selector mechanism for controlling a character reproducing machine comprising a plurality of selectors, means for locking the last of the selectors against operation until the immediately preceding selector which controls the last selector has been actuated.

42. In combination, a telegraphic typewriter having type bars and a carriage mechanism, a scanning mechanism also equipped with a carriage mechanism, means in the scanning mechanism for feeding a control record to the carriage mechanism of the scanning mechanism, a photo-electric cell for successively scanning the cell controls of a character disposed in the scanning mechanism, means operable by the scanning of a blank set of cell controls at the end of a line for moving the carriage mechanism of the scanning mechanism to new line position, returning the carriage mechanism and also performing a like operation on the carriage mechanism of the typewriter.

43. In a machine for controlling a telegraphic typewriter for printing, a control record having code symbols thereon representing characters to be printed by the typewriting machine, some of said code symbols being in the form of two parallel lines of cell controls and light sensitive means for successively scanning said cell controls.

44. Means for automatically actuating a telegraphic typewriter comprising a control record, a plurality of coded control areas on said record there being a plurality of cell controls for the areas controlling some of the type bars to be actuated in the typewriting machine, photo-electric cell scanning means driven in timed relation to the mechanism of the typewriting machine for causing the photo-electric cell mechanism to progressively scan the cell controls for a character, and means controlled by cell controls for automatically actuating the type bars in said typewriting machine.

45. A device for automatically selecting character bearing members in a typewriting machine comprising a control record having code indicia thereon for each character to be selected and arranged in transverse lines on said record, means associated with a typewriting machine to be operated for receiving said control record, said typewriting machine having a carriage mechanism, light sensitive means, means for exposing the code indicia on the control record to the light sensitive means and to a source of light, means for causing the control record to move with relation to the source of light and the light sensitive means to successively pass the code indicia of an entire line on said control sheet past said light source and light sensitive means, means responsive to the light sensitive means for actuating the character bearing members in sequence in said typewriting machine, and means responsive to the light sensitive means when a complete line of code indicia has been scanned thereby for moving the control record to new line position and at the same time transmitting the impulses to the typewriting machine to move its carriage mechanism to new line position.

46. Means for preparing a control sheet which is a duplicate of the first control sheet comprising an impulse-operated typewriter, a first control sheet having thereon a plurality of parallel lines of code indicia, single means for scanning said indicia, means for moving the control sheet to successively present to the single means the indicia of a single line, means rendered active by the scanning of a portion of said sheet for actuating the type bars in said typewriter to reproduce the character represented by the code indicia on the first control sheet, means rendered active by the scanning of a portion of the said first sheet occurring at the end of the line for moving the first control sheet to present to the single means a new line of indicia and means operable by the scanning of a portion of said first control sheet occurring at the end of a line for moving the second control sheet in the typewriter to new line position.

47. Means associated with a telegraphic typewriting machine for automatically actuating the type bars therein comprising a control record having printed code indicia for each character desired to be actuated in the typewriting machine, some of said code indicia comprising a plurality of photo-electric cell controls, means for successively scanning said cell controls for each character, means operable by the scanning means for automatically scanning said cell controls for each character, and means operable by the scanning means for automatically actuating the selected type bar in the said typewriting machine.

48. Means for automatically actuating a telegraphic typewriter having type bars which comprises a printed record having thereon a legible copy with printed code matter associated with, but separate from each character on said copy, means associated with a typewriting machine into which the sheet is adapted to be placed and means in said machine for successively scanning the characters thereon by means of a photo-electric cell mechanism to automatically actuate the type bars in said typewriting machine.

49. Means for operating a telegraphic typewriting machine through electrical impulses, said typewriting machine having a plurality of type bars, comprising a control record having code portions for selections of each character, means for successively scanning the areas of the code for each character, a switch comprising a plurality of contact points normally in closed position and means controlled by said control record for selectively opening some of said contacts.

50. A control record for controlling telegraphic typewriting machines and the like and having code characters, means for scanning said code characters, each of said code characters comprising two parallel lines of symbols and means whereby the scanning means is caused to move over one line of symbols in one direction and then to return over the other line of symbols to scan both lines to select a type bar for actuation in said typewriting machine.

51. Means for controlling a character reproducing machine comprising a control record for releasing the type characters, a photo-electric cell for successively scanning said control record, a source of light and means for focusing the light on the control record, means for causing relative movement between the control record and the photo-electric cell to successively expose portions of the control record to said photo-electric cell, and means controlled by said cell for selectively operating said characters.

52. Means for controlling a telegraphic typewriting machine having individual type bars comprising a control record, a photo-electric cell for successively scanning the control record, a carriage mechanism for holding the control record, means for moving the carriage with relation to said cell, a source of light and means for focusing said source of light on the said control record, and means operable by the photo-electric cell for selectively actuating the type bars in said typewriter.

BUFORD L. GREEN.